us007581090B2

(12) United States Patent
Miyake et al.

(10) Patent No.: US 7,581,090 B2
(45) Date of Patent: Aug. 25, 2009

(54) INTERRUPT CONTROL APPARATUS AND METHOD

(75) Inventors: Hideo Miyake, Kawasaki (JP); Atsuhiro Suga, Kawasaki (JP); Yasuki Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 10/692,800

(22) Filed: Oct. 27, 2003

(65) Prior Publication Data

US 2004/0088462 A1 May 6, 2004

(51) Int. Cl.
*G06F 9/00* (2006.01)
(52) U.S. Cl. ...................... 712/244; 717/129
(58) Field of Classification Search ............... 717/129; 712/244
See application file for complete search history.

(56) References Cited

U.S. PATENT DOCUMENTS

| 4,860,195 | A | | 8/1989 | Krauskopf |
| 4,881,228 | A | | 11/1989 | Shouda |
| 5,165,027 | A | * | 11/1992 | Krauskopf ............... 711/206 |
| 5,440,747 | A | | 8/1995 | Kuichi |
| 5,533,192 | A | | 7/1996 | Hawley et al. |
| 5,615,371 | A | | 3/1997 | Iuchi |
| 5,701,494 | A | | 12/1997 | Satoh |
| 5,717,851 | A | | 2/1998 | Yishay et al. |
| 5,732,210 | A | | 3/1998 | Buzbee |
| 5,740,413 | A | * | 4/1998 | Alpert et al. ............... 712/227 |
| 5,745,770 | A | | 4/1998 | Thangadurai et al. |
| 5,764,989 | A | | 6/1998 | Gustafsson et al. |
| 6,161,199 | A | | 12/2000 | Szebo et al. |
| 6,249,881 | B1 | | 6/2001 | Porten et al. |
| 6,336,184 | B1 | | 1/2002 | Burke et al. |
| 6,480,818 | B1 | * | 11/2002 | Alverson et al. ............... 703/26 |
| 6,567,933 | B1 | | 5/2003 | Swoboda et al. |

FOREIGN PATENT DOCUMENTS

EP 0 702 297 A1 3/1996

OTHER PUBLICATIONS

Korean Office Action dated Jul. 18, 2006 issued in the Korean Patent Application No. 10-2000-0063082 which corresponds to the present pending US patent application (2 pages).

* cited by examiner

*Primary Examiner*—Alford W Kindred
*Assistant Examiner*—Benjamin P Geib
(74) *Attorney, Agent, or Firm*—Staas & Halsey LLP

(57) ABSTRACT

When a normal interrupt occurs, data of processor operation before the normal interrupt are held in a normal return address register (452), a normal previous state register (453), and a normal factor register (454). When a break-interrupt occurs, data of processor operation before the break-interrupt is held in another break return address register (455). Hence, a break-interrupt can occur even within an interrupt inhibition period by a normal interrupt. Besides, when a break-interrupt occurs, the break-interrupt state is set in a flag register (456). By referring to the flag register (456) in executing an interrupt return instruction, the operation data before the break-interrupt or before the normal interrupt can accurately be restored.

21 Claims, 58 Drawing Sheets

FIG. 5
PRIOR ART

|    | VALID | ADDRESS | INSTRUCTION |
|----|-------|---------|-------------|
| #0 |       |         |             |
| #1 |       |         |             |
| ⋮  | ⋮     | ⋮       | ⋮           |
| #n |       |         |             |

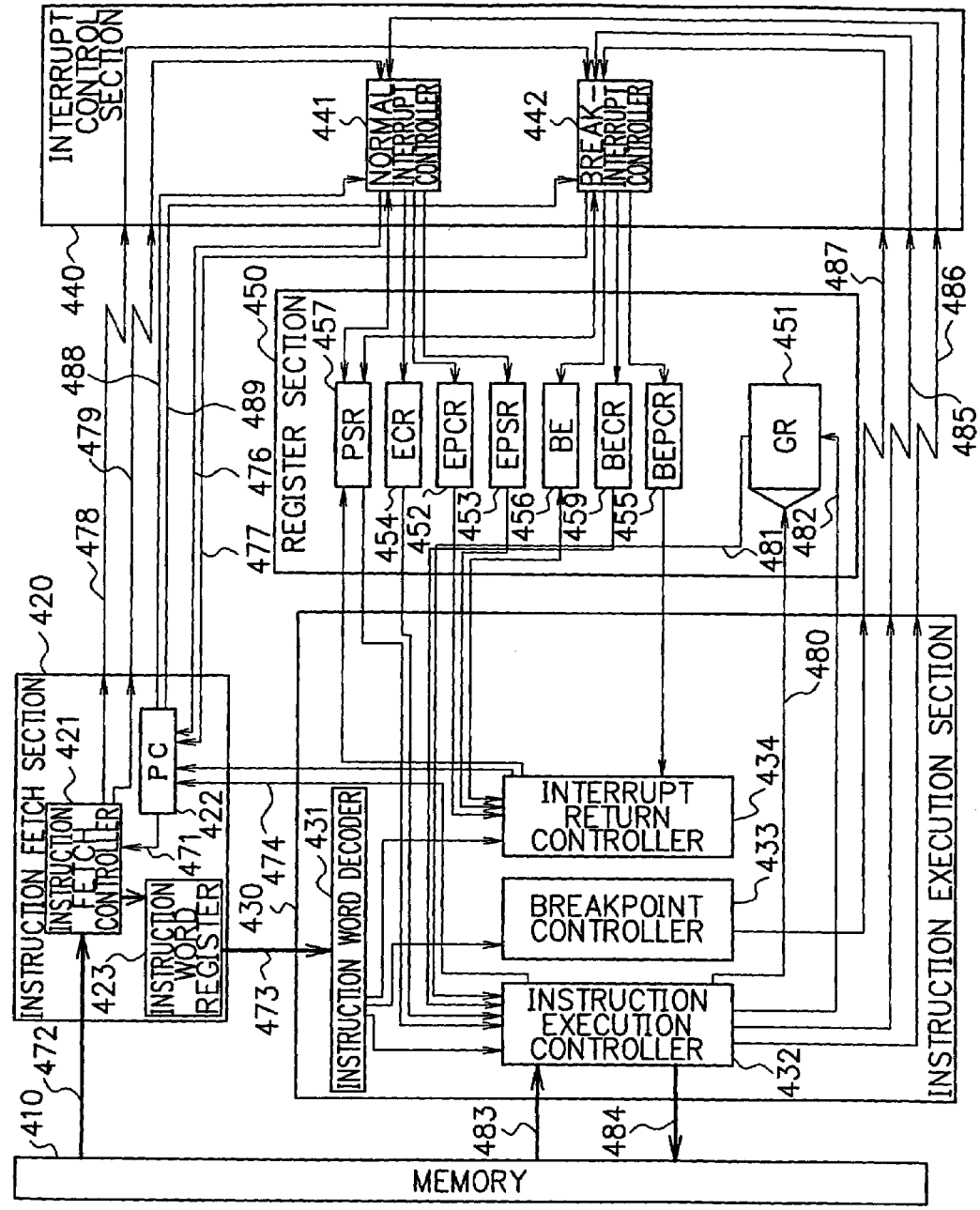
F I G. 10

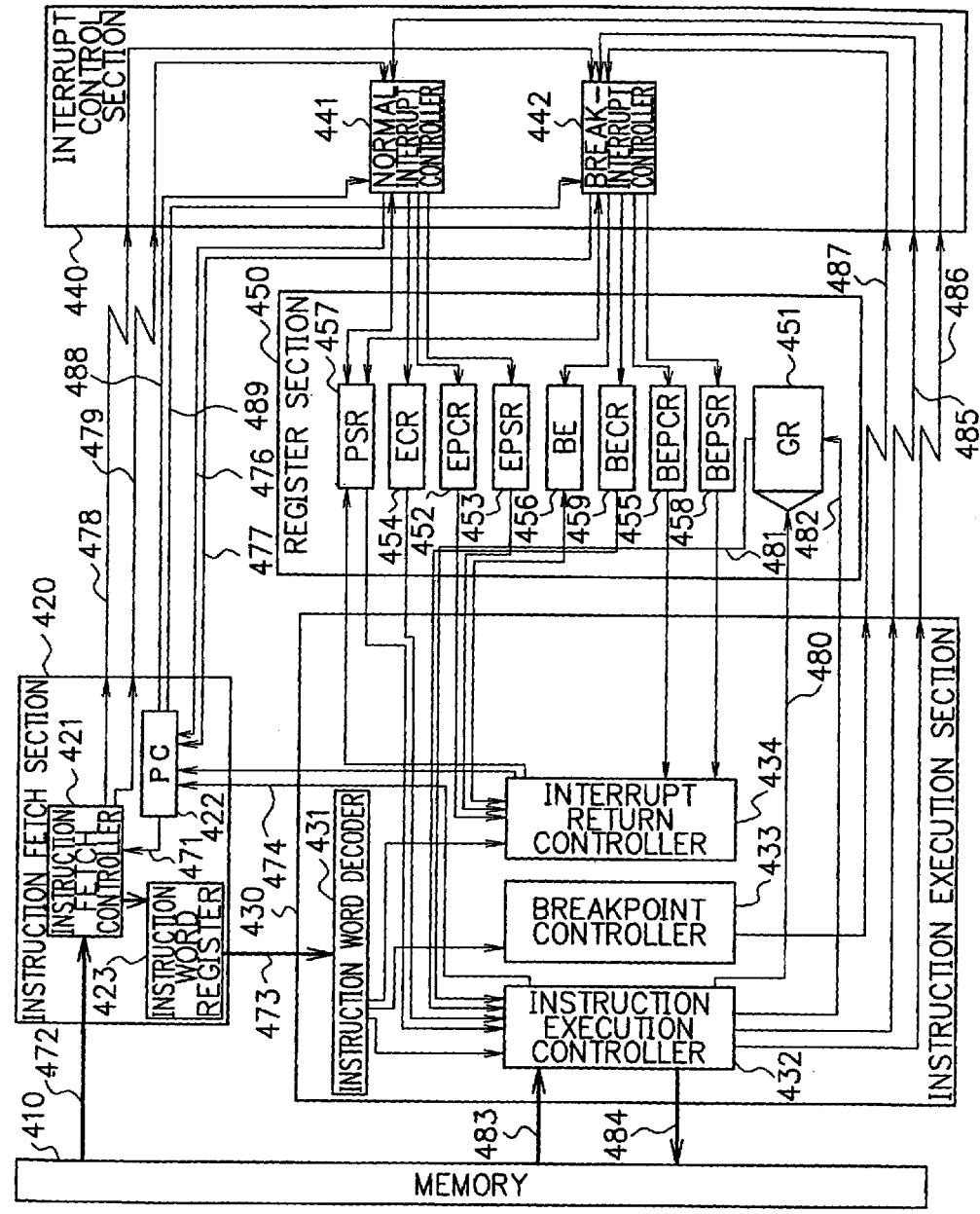
F I G. 11

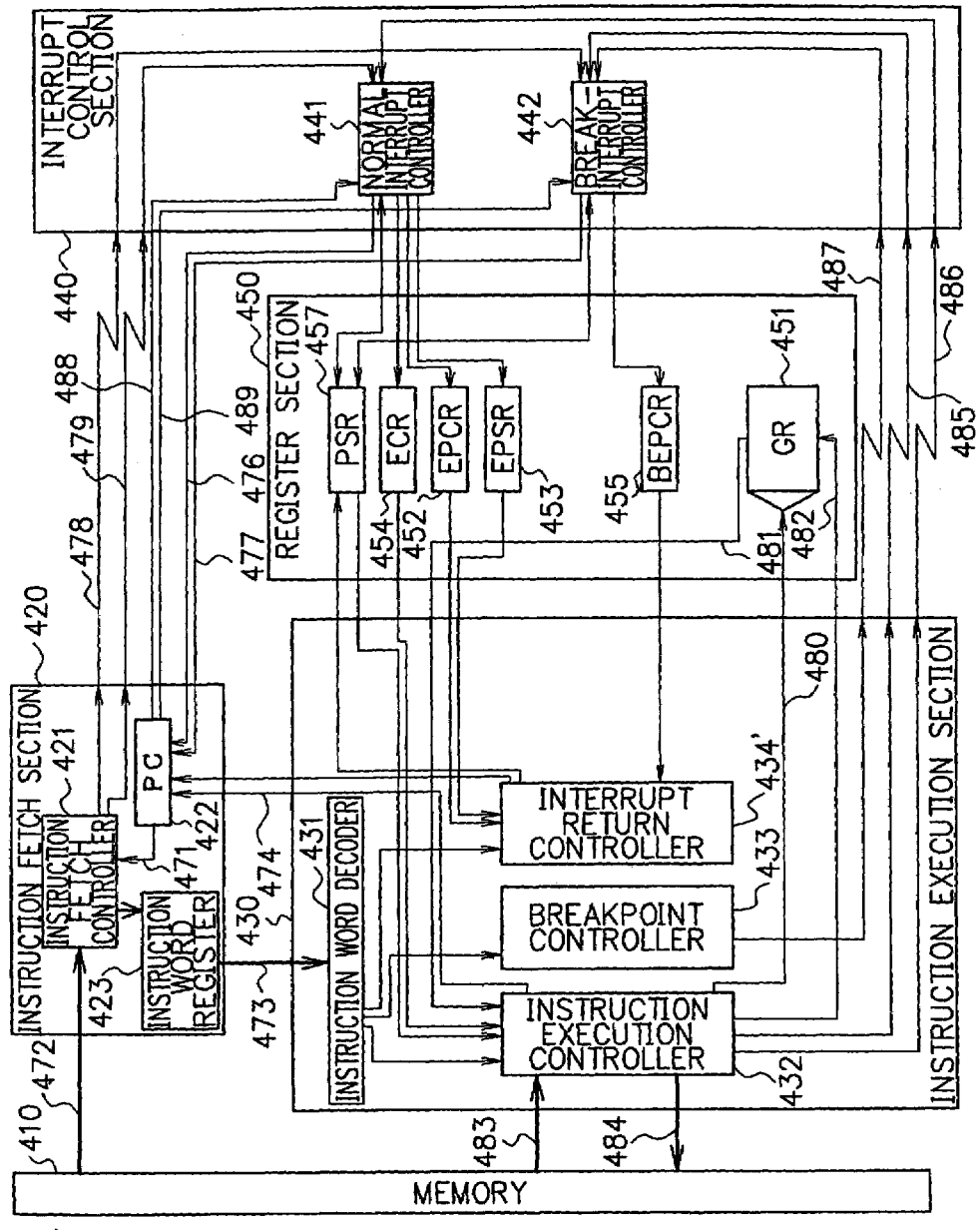
F I G. 12

F I G. 13
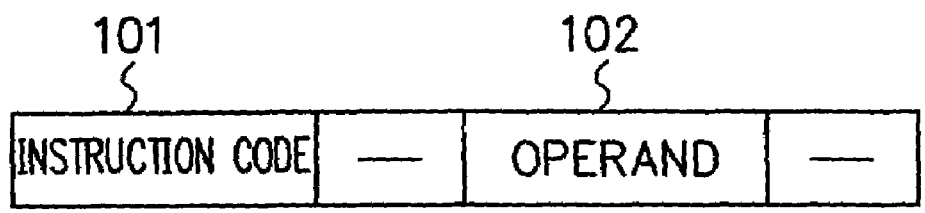

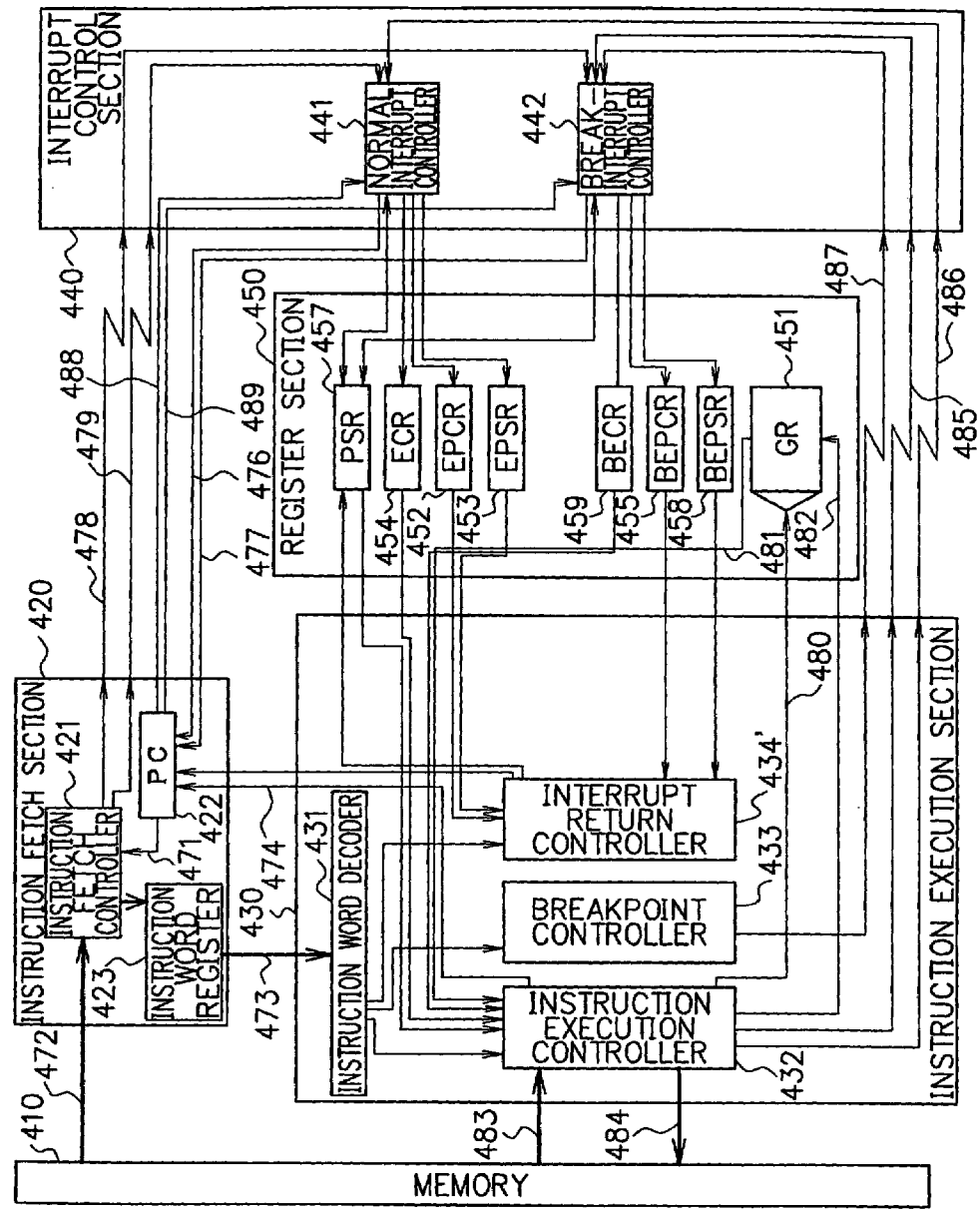
F I G. 16

F I G. 20
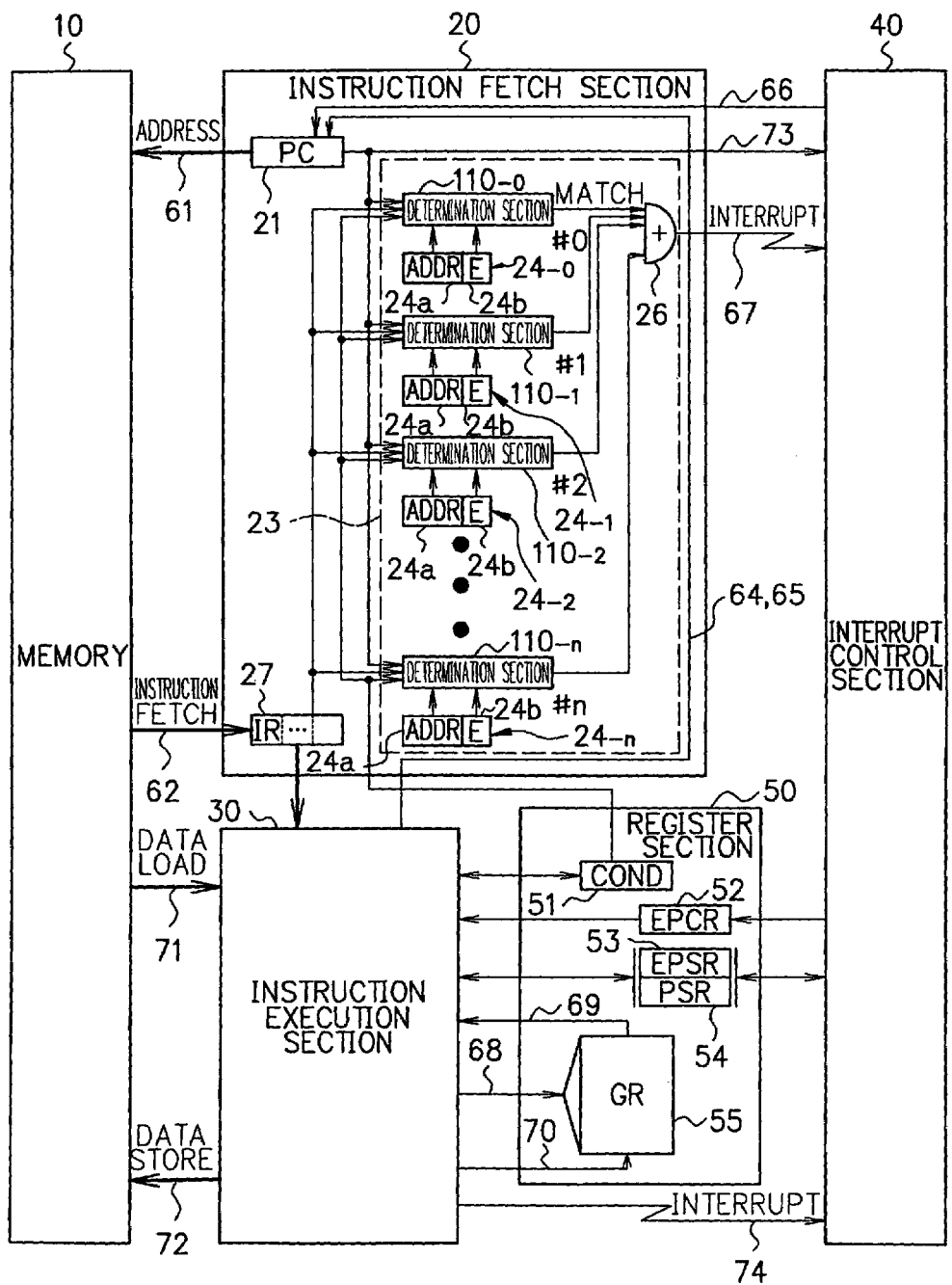

F I G. 21
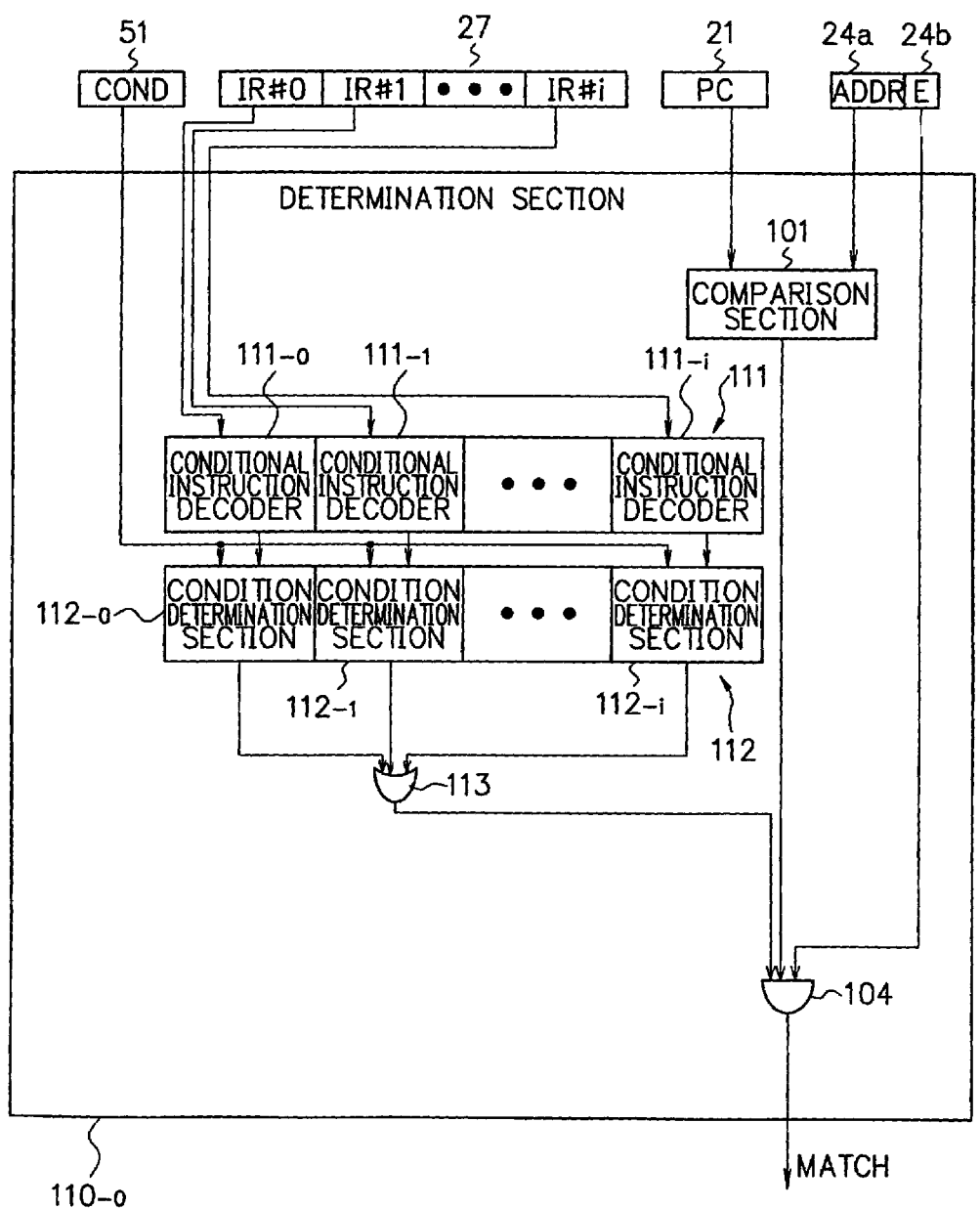

F I G. 25
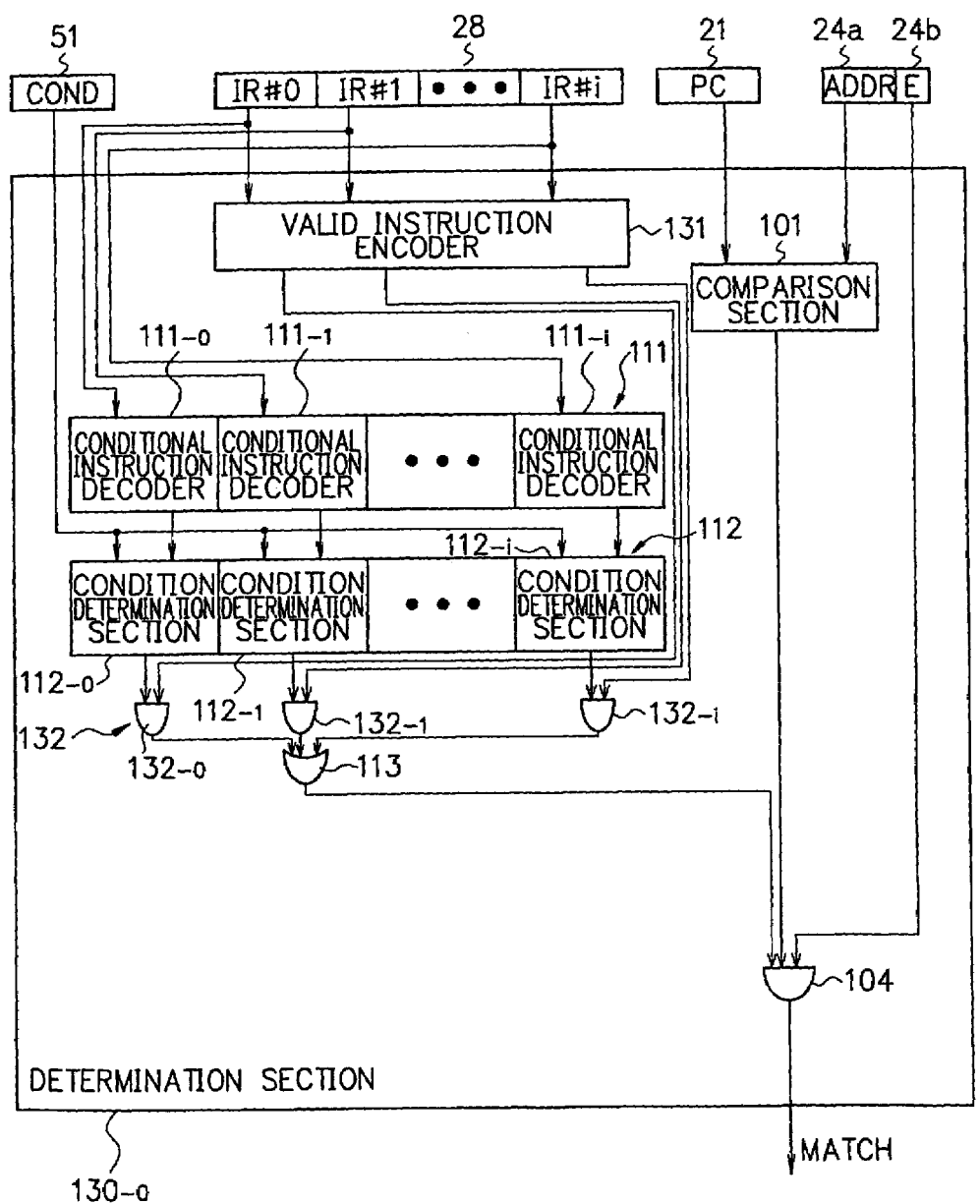

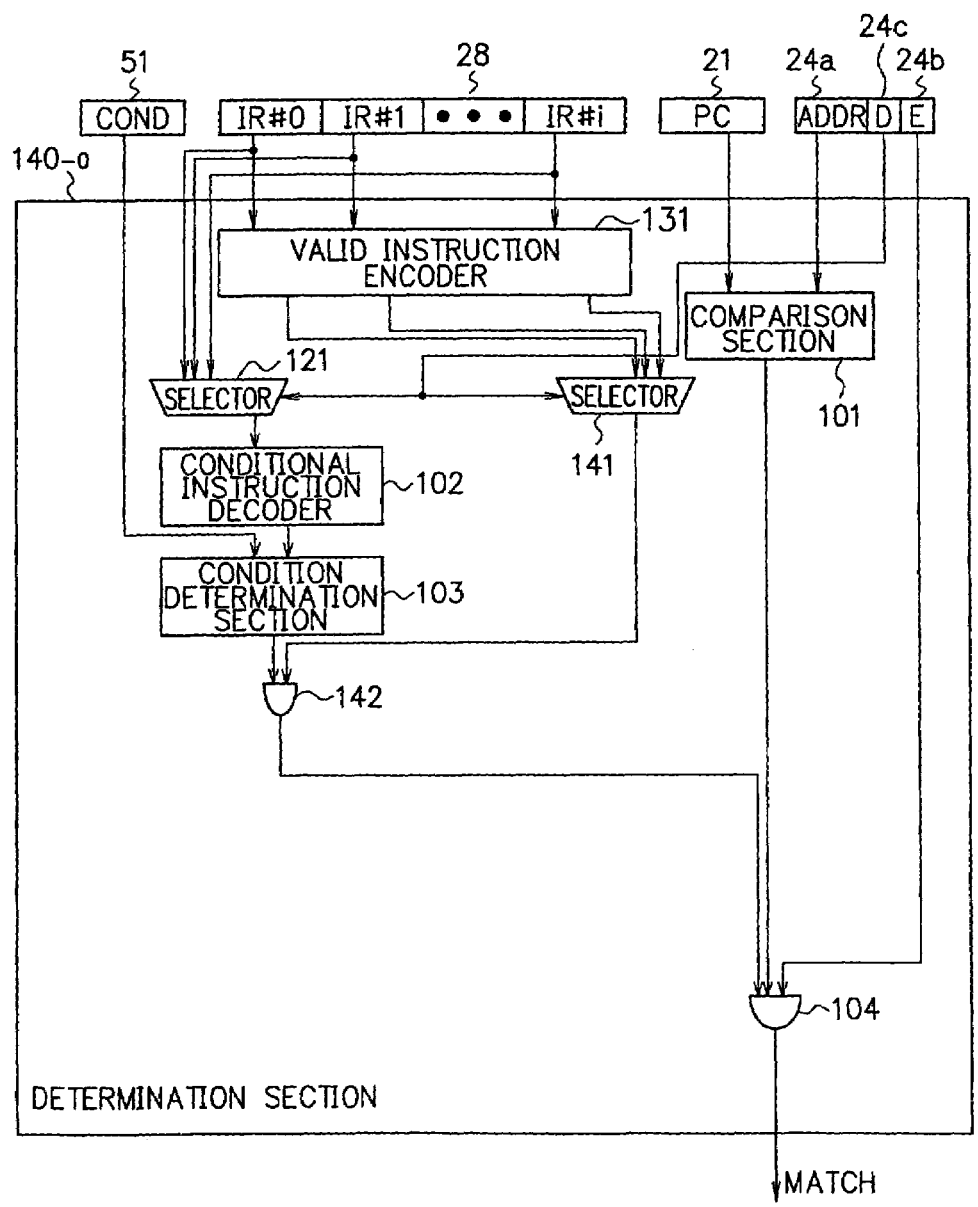
F I G. 27

F I G. 29
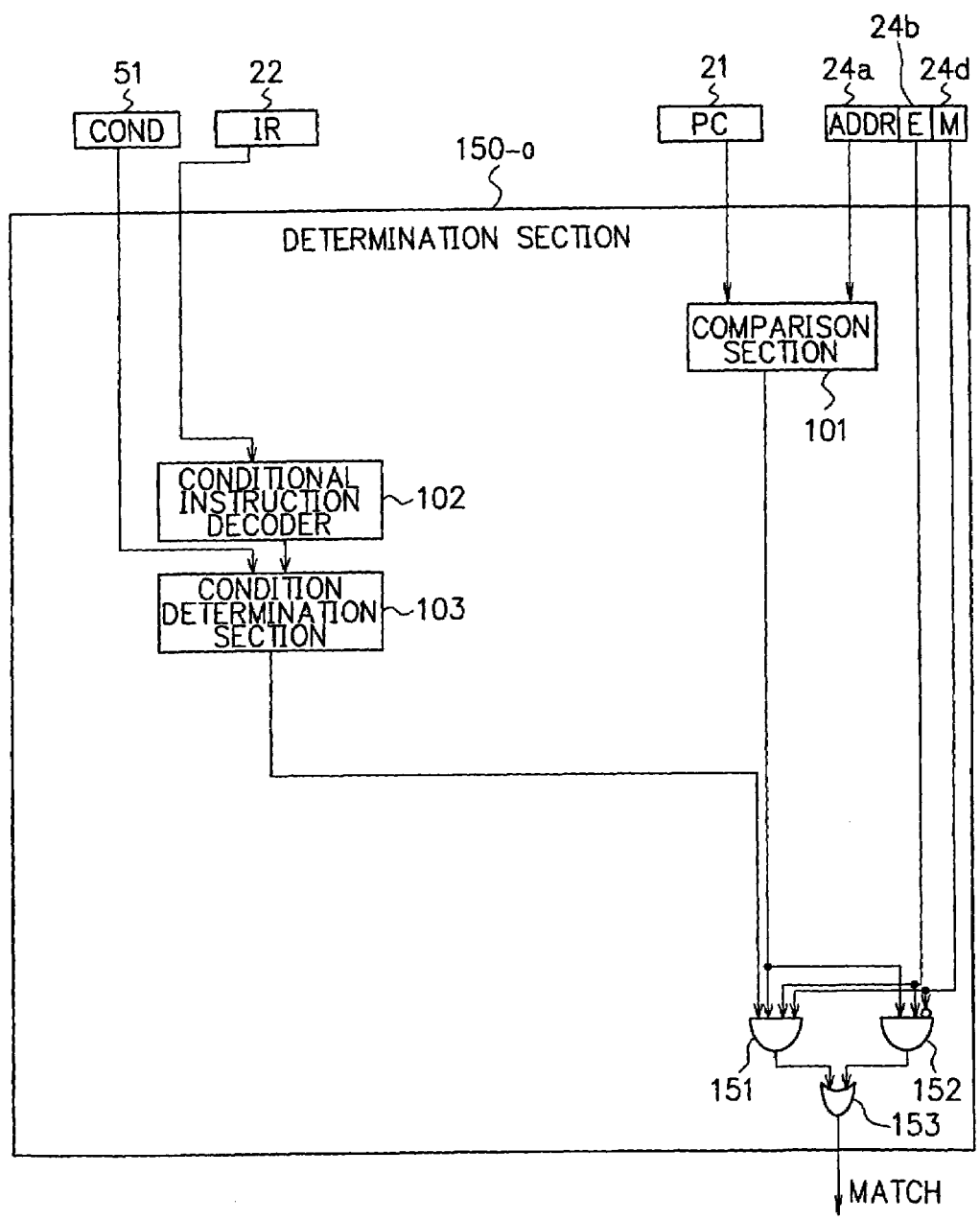

F I G. 34
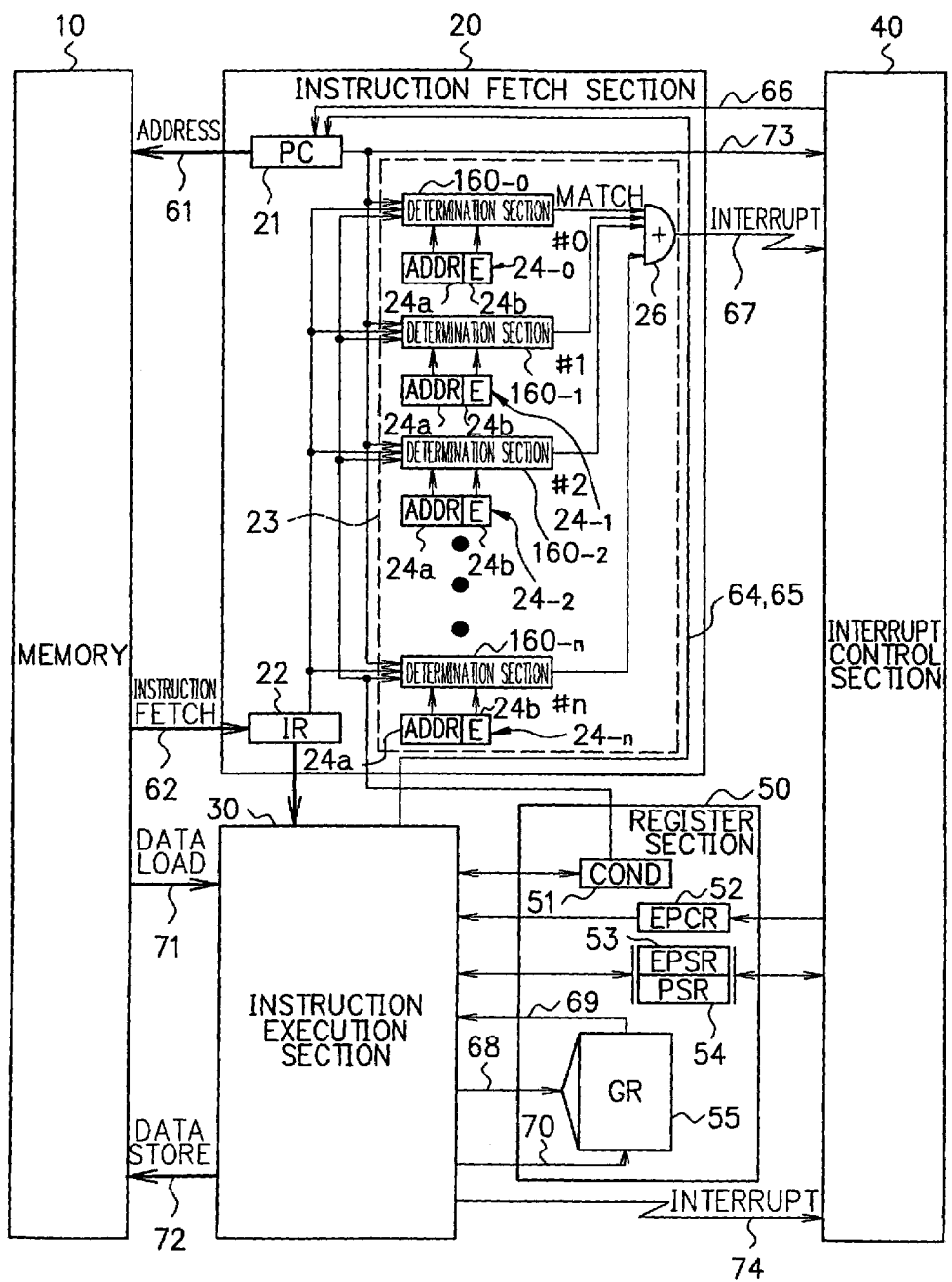

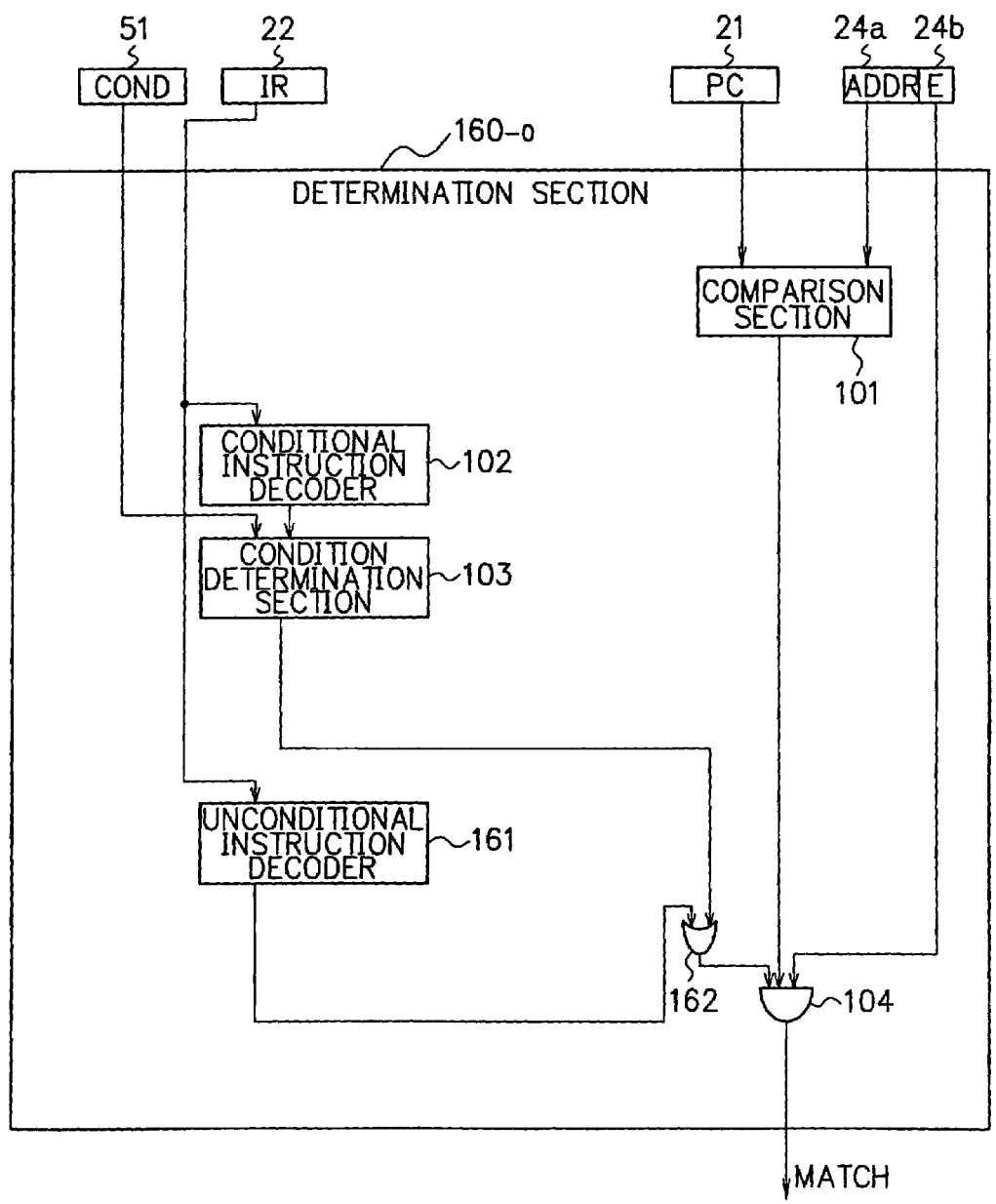
F I G. 35

F I G. 40
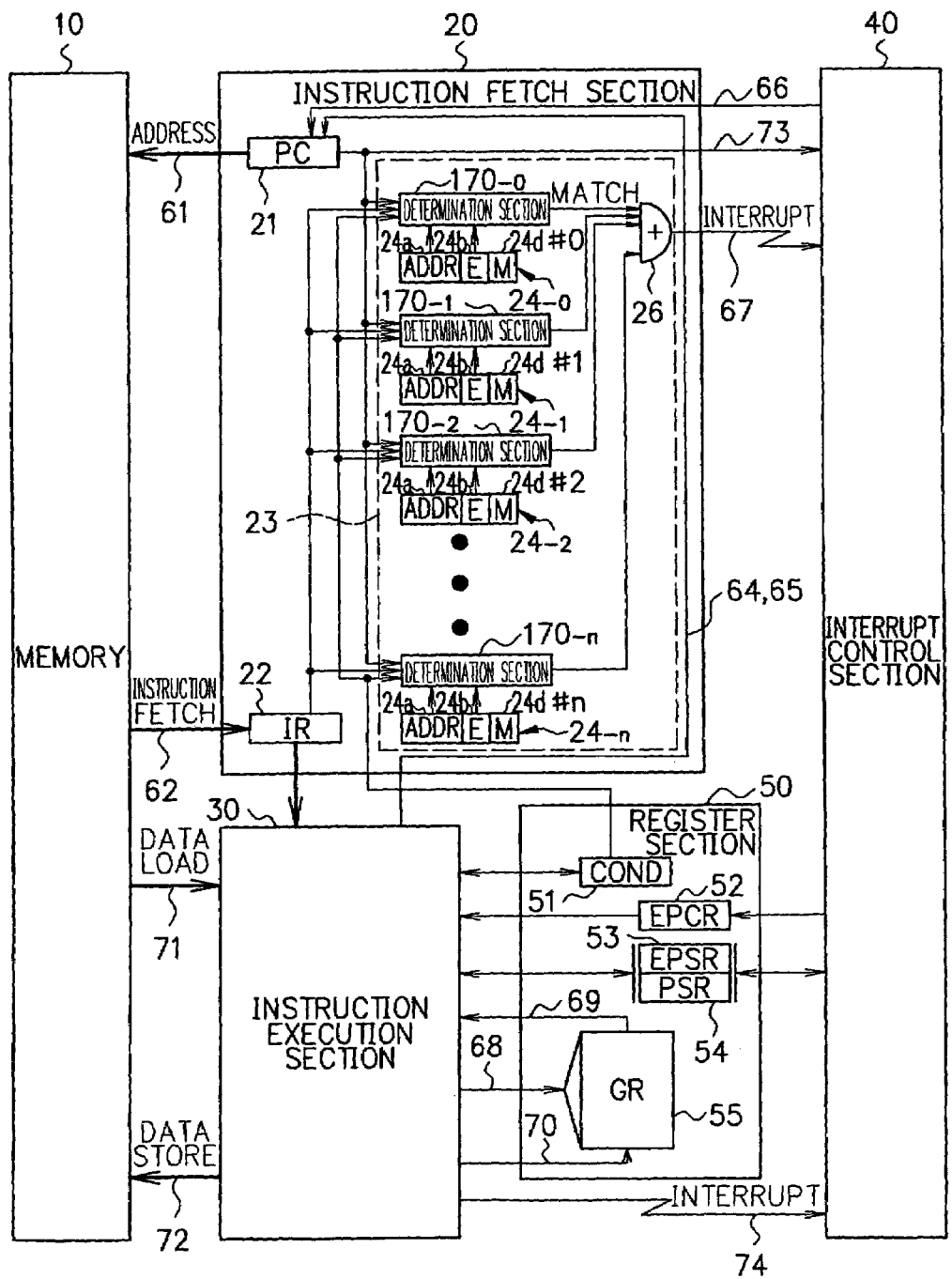

F I G. 42
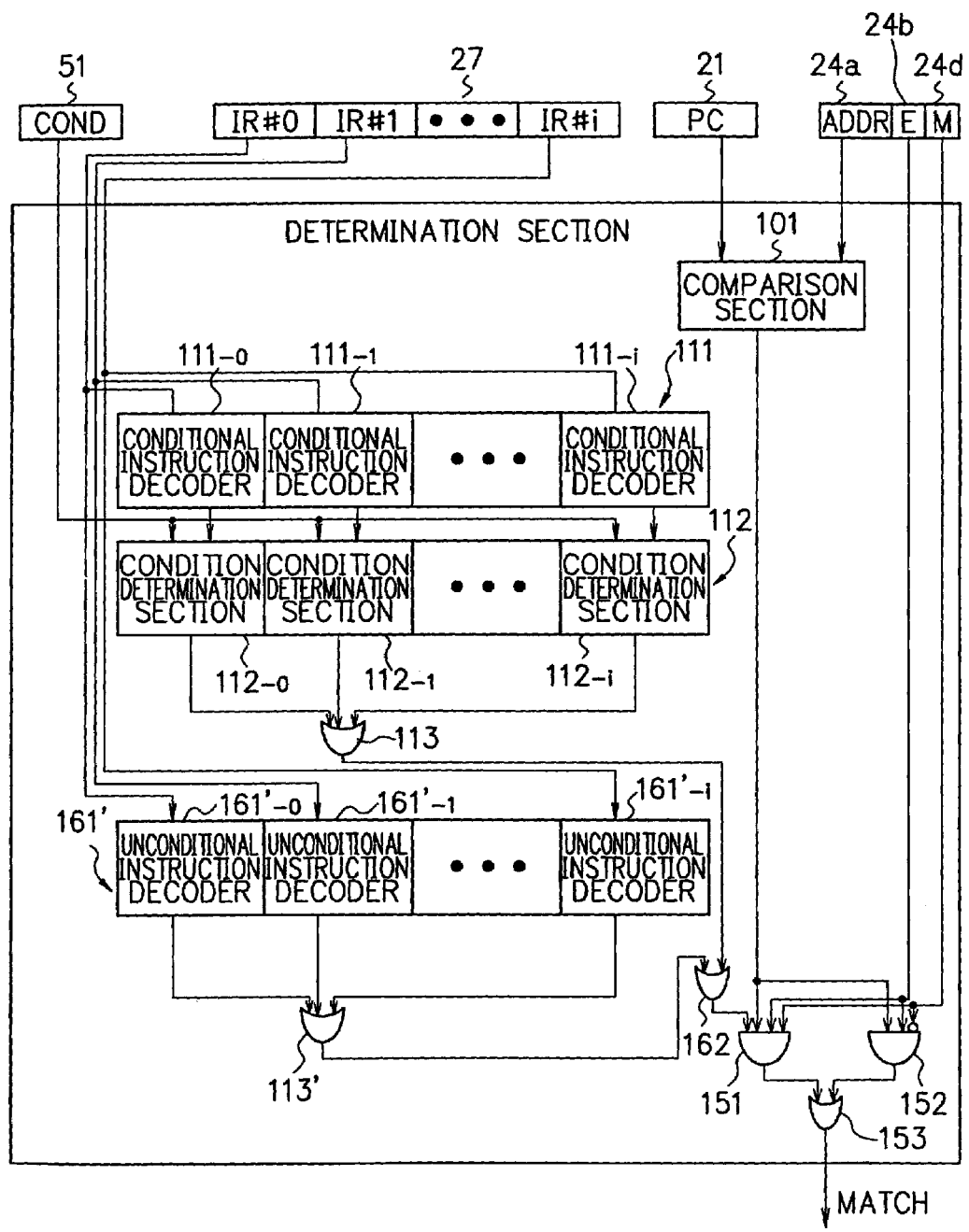

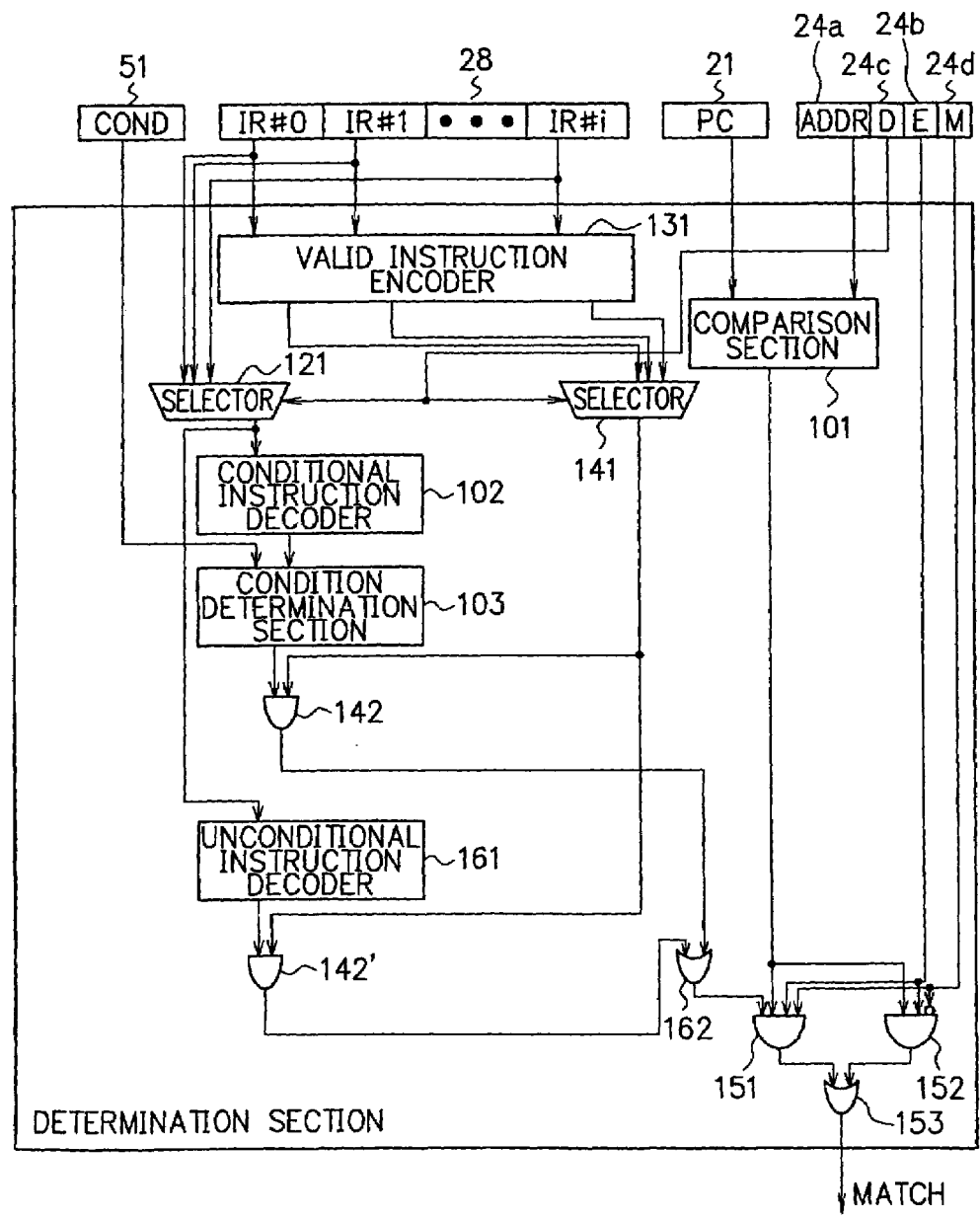
F I G. 45

F I G. 48

|    | VALID | ADDRESS |
|----|-------|---------|
| #0 |       |         |
| #1 |       |         |
| ⋮  | ⋮     | ⋮       |
| #n |       |         |

F I G. 51

|    | VALID | ADDRESS | DISP |
|----|-------|---------|------|
| #0 |       |         |      |
| #1 |       |         |      |
| :  | :     | :       | :    |
| :  | :     | :       | :    |
| #n |       |         |      |

FIG. 55

| | VALID | ADDRESS | MODE |
|---|---|---|---|
| #0 | | | |
| #1 | | | |
| ⋮ | ⋮ | ⋮ | ⋮ |
| #n | | | |

FIG. 56

| | VALID | ADDRESS | DISP | MODE |
|---|---|---|---|---|
| #0 | | | | |
| #1 | | | | |
| ⋮ | ⋮ | ⋮ | ⋮ | ⋮ |
| #n | | | | |

FIG. 59

|    | VALID | ADDRESS | DISP | INSTRUCTION |
|----|-------|---------|------|-------------|
| #0 |       |         |      |             |
| #1 |       |         |      |             |
| ⋮  | ⋮     | ⋮       | ⋮    | ⋮           |
| #n |       |         |      |             |

FIG. 60

|    | VALID | ADDRESS | MODE | INSTRUCTION |
|----|-------|---------|------|-------------|
| #0 |       |         |      |             |
| #1 |       |         |      |             |
| ⋮  | ⋮     | ⋮       | ⋮    | ⋮           |
| #n |       |         |      |             |

FIG. 61

|    | VALID | ADDRESS | DISP | MODE | INSTRUCTION |
|----|-------|---------|------|------|-------------|
| #0 |       |         |      |      |             |
| #1 |       |         |      |      |             |
| ⋮  | ⋮     | ⋮       | ⋮    | ⋮    | ⋮           |
| #n |       |         |      |      |             |

INTERRUPT CONTROL APPARATUS AND METHOD

BACKGROUND OF THE INVENTION

1. Field of the Invention

The present invention relates to interrupt control apparatus and methods, particularly to interrupt control apparatus having a break-interrupt function of interrupting execution of a program in a so-called debugger, i.e., a system for supporting debug of a program.

2. Description of the Related Art

Conventionally, high-performance processors have been used in the fields of supercomputers, general-purpose computers, and workstations. In addition, recently, high-performance processors are also used in the field of built-in devices because the required processing capability increases. Such a processor has an interrupt processing function. When an interrupt occurs, the processor performs interrupt processing in accordance with an instruction of an interrupt handler, which is an interrupt processing program.

When a processor is used in the field of supercomputers, general-purpose computers, or workstations, the interrupt handler is generally provided as part of the system program.

Contrastingly when a processor is used in the field of built-in devices, the user often generates his own interrupt handler as part of an application program. Hence, when this interrupt handler is generated, not only the application program but also the interrupt handler itself is subjected to debug.

A processor has various interrupt functions such as an instruction breakpoint, a data breakpoint, a software breakpoint, and step execution as effective functions of supporting debug of a program. Interrupts by the instruction breakpoint, data breakpoint, software breakpoint, and step execution will be totally called a "break-interrupt", and an interrupt other than the break-interrupt will be called a "normal interrupt", thereby discriminating them from each other.

An interrupt by an instruction breakpoint occurs when the address (instruction break address) of an instruction to be interrupted is set in a register, and the instruction break address set in this register matches the instruction address of an actually executed instruction. An interrupt by a data breakpoint occurs when the address (data break address) of data to be interrupted is set in a register, and the data break address set in this register matches the address of data accessed in accordance with a load instruction or store instruction.

An interrupt by a software breakpoint occurs when a breakpoint instruction for generating an interrupt is inserted to an arbitrary position in a program, and the breakpoint instruction is executed when the program is being sequentially executed in accordance with the progress of a program counter. An interrupt by step execution occurs every time one instruction of a program is executed.

By using the above-described break-interrupt function, execution of a program is interrupted to confirm repeatedly calculation results stored in a register or memory, thereby debugging the program.

FIG. 1 is a representation showing an example of state transition when a processor interrupt occurs.

Referring to FIG. 1, reference numeral 301 denotes a user state (normal operative state without any interrupt) of the processor; and 302 denotes a supervisor state (privilege instruction execution state by an interrupt) of the processor. When the processor is processing a normal application, the state of the processor is the user state 301. When an interrupt 303, i.e., a break-interrupt or normal interrupt occurs in the user state 301, the processor transits to the supervisor state 302. When an interrupt return instruction 304 is executed in this supervisor state 302, the processor returns to the user state 301.

FIG. 2 is a representation showing another example of state transition when a processor interrupt occurs.

Referring to FIG. 2, reference numeral 311 denotes a user state of the processor; and 312, 313, and 314 denote supervisor states of the processor. When the processor is processing a normal application, the state of the processor is the user state 311. When an interrupt 315, i.e., a break-interrupt or normal interrupt occurs in the user state 311, the processor transits to the supervisor state 312.

When an interrupt return instruction 316 is executed in the supervisor state 312, the processor returns to the user state 311. However, when an interrupt 317, i.e., a break-interrupt or normal interrupt occurs in the supervisor state 312 before execution of the interrupt return instruction 316, the processor transits to another supervisor state 313. When an interrupt return instruction 318 is executed in the supervisor state 313, the processor returns to the previous supervisor state 312.

Interrupt processing control will be described below with reference to FIG. 2 by exemplifying processor state transition: user state 311→supervisor state 312→user state 311 due to an interrupt.

When the interrupt 315, i.e., a break-interrupt or normal interrupt occurs in the user state 311, the processor writes, in a register, information on program counter value, processor state, and factor of the interrupt at the time of interrupt, thereby saving the processor operation information before the interrupt. The processor transits to the supervisor state 312 and shifts processing from the application program to an interrupt handler.

Immediately after the shift to processing of the interrupt handler, i.e., immediately after the interrupt processing, rewrite in the register in which the program counter value, the processor state, and the factor of the interrupt are written is inhibited, thereby inhibiting a new interrupt. When the interrupt processing progresses to some extent, rewrite in the register in which the program counter value, the processor state, and the factor of the interrupt are written is permitted, thereby permitting a new interrupt (e.g., the interrupt 317).

When processing of the interrupt handler is almost ended, and the interrupt return instruction 316 is executed in the supervisor state 312, the processor returns to the user state 311 before the interrupt. At this time, the processor operation information before the interrupt is restored on the basis of the information on program counter value and processor state which are written in the register before the interrupt, thereby returning the processor to the user state 311 before the interrupt.

Immediately before this interrupt return as well, write in the register is inhibited, thereby inhibiting a new interrupt. When interrupt return of the processor is ended, rewrite in the register in which the program counter value, the processor state, and the factor of the interrupt are written is permitted, thereby permitting a new interrupt.

As described above, in the conventional interrupt control apparatus, when an interrupt occurs, a write in the register used to write the processor operation information is inhibited immediately after the interrupt operation and immediately before interrupt return. For this reason, interrupt inhibition periods when a new interrupt is inhibited are present immediately after the interrupt operation and immediately before interrupt return. In addition, the processor writes the processing operation information before the interrupt in the same register without discriminating a break-interrupt from a normal interrupt. Hence, immediately after a normal interrupt occurs or immediately before its return, no break-interrupt can occur because of the presence of interrupt inhibition periods. For this reason, the interrupt handler cannot be completely debugged.

Many conventional debug support systems have a break-interrupt function of interrupting execution of a program to verify the operation of the program. The break-interrupt function occasionally stops execution of a program at an arbitrary position designated in advance in the program to be debugged. This function is effective for program debug processing and incorporated in many debug support systems.

This break-interrupt function can be implemented by various schemes including a breakpoint function of stopping execution of a program at a predetermined instruction. To use this function, the user designates in advance an instruction at which execution is to be stopped and then starts the program to be debugged. Thus, the program to be debugged stops its execution with the designated instruction. The user can check or change the value of a register or memory at the time of stop, as needed. After that, execution of the program can be resumed from the time of stop.

To implement this breakpoint function, for example, an instruction breakpoint or software breakpoint can be used.

An interrupt by an instruction breakpoint occurs when the address (instruction break address) of an instruction to be interrupted is set in a register, and the instruction break address set in this register matches the instruction address of an actually executed instruction.

More specifically, for this instruction break, a breakpoint register for holding the address of an instruction at which execution is to be stopped is prepared as hardware. When the instruction designated by this register is detected during normal processing of an application program, a normal interrupt occurs, the control is shifted to the debug support program through an interrupt processing program such as a so-called interrupt handler, and the user is notified of it. After that, when debug by the user is completed, and resumption of the original program is instructed, the control is returned to the original application program.

An interrupt by a software breakpoint occurs when an instruction designated at an arbitrary position in a program is replaced with an instruction for generating an interrupt, and the instruction for generating an interrupt is executed while the program is sequentially executed in accordance with the progress of the program counter. As the instruction for generating an interrupt, a dedicated instruction called a breakpoint instruction may be prepared.

More specifically, when an instruction for generating an interrupt is detected during normal processing of an application program, a break-interrupt occurs, the control is shifted to the debug support program through an interrupt processing program such as a so-called interrupt handler, and the user is notified of it. After that, when debug by the user is completed, and resumption of the original program is instructed, execution of the replaced original instruction is simulated, and then, the control is returned to the original application program.

The scheme using an instruction breakpoint has the following characteristic features.

The program to be debugged need not be changed.

Execution of the instruction need not be simulated.

The number of settable breakpoints is substantially limited because of limitations on hardware such as a register.

As a characteristic feature of the scheme using a software breakpoint, a number of breakpoints can be set in a program.

FIG. 3 is a block diagram showing a conventional construction for implementing the instruction break scheme by a hardware mechanism.

Referring to FIG. 3, reference numeral 10 denotes a memory which stores programs including an application and an interrupt handler; 20 denotes an instruction fetch section; 30 denotes an instruction execution section; 40 denotes an interrupt control section; and 50 denotes a register section.

The instruction fetch section 20 comprises a program counter (PC) 21 for indicating the address of an instruction word to be read out from the memory 10, an instruction register (IR) 22 for holding the instruction word read out from the memory 10, and an instruction break detection section 23. The instruction fetch section 20 reads out an instruction word 62 from the memory 10 on the basis of an instruction address 61 indicated by the program counter 21 and writes/holds the read-out instruction word 62 in the instruction register 22. The instruction fetch section 20 also supplies an instruction word 63 held in the instruction register 22 to the instruction execution section 30.

When an instruction address 64 of a branch destination or an instruction address 65 for return from the interrupt state is supplied from the instruction execution section 30, or when an instruction address 66 of the interrupt handler is supplied from the interrupt control section 40, the instruction fetch section 20 writes the received instruction address in the program counter 21. Otherwise, the value of the program counter 21 is incremented by one sequentially to read out the next instruction word.

The instruction break detection section 23 comprises breakpoint registers $24_{-0}$ to $24_{-n}$, determination sections $25_{-0}$ to $25_{-n}$, provided in accordance with the registers, respectively, and an OR circuit 26 for ORing determination results from the determination sections $25_{-0}$ to $25_{-n}$.

Each of the breakpoint registers $24_{-0}$ to $24_{-n}$ has an address register 24a for holding the address of a breakpoint at which execution is to be stopped, and a flag register 24b representing whether the instruction break operation is valid. The flag register 24b having a value "1" means an instruction break operation valid state, and the flag register 24b having a value "0" means an instruction break operation invalid state.

Each of the determination sections $25_{-0}$ to $25_{-n}$ determines whether the generation condition for an instruction break held in the corresponding one of the breakpoint registers $24_{-0}$ to $24_{-n}$ is satisfied. More specifically, each of the determination sections $25_{-0}$ to $25_{-n}$ compares the instruction break address held in the address register 24a of the corresponding one of the breakpoint registers $24_{-0}$ to $24_{-n}$ with the current execution address supplied from the program counter 21, thereby determining whether the two addresses match.

If the two addresses match, and the value of the flag register 24b is "1", it is determined that the instruction break generation condition is satisfied. On the other hand, if the two addresses do not match, or the value of the flag register 24b is "0" though the two addresses match, it is determined that the instruction break generation condition is not satisfied. The determination sections $25_{-0}$ to $25_{-n}$ supply determination signals representing the determination results to the OR circuit 26.

The OR circuit 26 performs OR operation to the determination signals supplied from all the determination sections $25_{-0}$ to $25_{-n}$. When the instruction break generation condition is satisfied for at least one determination section, the OR circuit 26 detects a break-interrupt by an instruction breakpoint and notifies the interrupt control section 40 of the break-interrupt using an interrupt notification signal 67.

The instruction execution section 30 executes processing such as calculation, branch, data load/store, or return from the interrupt state in accordance with the instruction of the instruction word 63 supplied from the instruction fetch section 20. For example, if the supplied instruction is a calculation instruction, the instruction execution section 30 executes calculation on the basis of a data value 69 read out from a general-purpose register (GR) 55 in the register section 50, which is designated by a register address 68, and writes a data value 70 obtained by this calculation in the general-purpose register 55 designated by the register address 68.

If the supplied instruction is a branch instruction, and the branch condition is satisfied, the instruction execution section 30 supplies the instruction address 64 of the branch destination to the instruction fetch section 20. If the supplied instruction is a load instruction, the instruction execution section 30 obtains the effective address on the memory 10 from the data value 69 read out from the general-purpose register 55 designated by the register address 68, reads out read data 71 from an area of the memory 10, which corresponds to the effective address, and writes the read-out data in the general-purpose register 55 designated by the register address 68.

When the supplied instruction is a store instruction, the instruction execution section 30 obtains the effective address on the memory 10 from the data value 69 read out from the general-purpose register 55 designated by the register address 68, and writes the data value 69 read out from the general-purpose register 55 designated by the register address 68 in an area of the memory 10, which corresponds to the effective address.

When the supplied instruction is an instruction for return from the interrupt state, the instruction execution section 30 executes the return operation from the interrupt state. More specifically, on the basis of operation information before the interrupt, which is held in each register of the register section 50, processing of restoring the operation information before the interrupt is executed.

In this case, the value of a previous state register (EPSR) 53 is written in a present state register (PSR) 54, and simultaneously, the value of a return address register (EPCR) 52 is read out, and the read-out return address is supplied to the instruction fetch section 20 as the branch destination address 65.

When an interrupt due to an error such as division by zero or data overflow is detected in executing a calculation instruction by the instruction execution section 30, the instruction execution section 30 notifies the interrupt control section 40 of the interrupt using an interrupt notification signal 74. The interrupt due to an error is called a normal interrupt and discriminated from a break-interrupt by an instruction break or software break.

When receiving the interrupt notification signal 67 for a break-interrupt from the instruction fetch section 20, or the interrupt notification signal 74 for a normal interrupt from the instruction execution section 30, the interrupt control section 40 controls the instruction fetch section 20 and the register section 50 to execute the shift operation to the interrupt state.

More specifically, when receiving the interrupt notification signal 67 or 74, the interrupt control section 40 reads out an instruction address 73 at the time of interrupt from the program counter 21 of the instruction fetch section 20 and writes the instruction address 73 in the return address register 52 of the register section 50. The start address 66 of the interrupt handler corresponding to the interrupt that has occurred is supplied to the instruction fetch section 20 and set in the program counter 21. The interrupt control section 40 also writes the processor state before the interrupt in the previous state register 53 and writes, in the present state register 54, the processor state that has transited in accordance with the interrupt.

The register section 50 has a condition register 51 in addition to the above-described return address register 52, previous state register 53, present state register 54, and general-purpose register 55. This condition register 51 holds a condition code that is referred to when the instruction execution section 30 executes a conditional instruction, which is supplied from the instruction fetch section 20. A conditional instruction means an instruction for which it is determined first whether a designated condition is satisfied, and only when the condition is satisfied, designated processing such as data transfer or calculation is executed.

The return address register 52 holds the original instruction address (the value 73 of the program counter 21 at the time of interrupt) to which the processor will return from the interrupt state. The previous state register 53 holds the processor state (normal user state without any interrupt or supervisor state that has transited in accordance with the interrupt) before the interrupt. The present state register 54 holds the present processor state.

The state transition of the processor will be briefly described.

When the processor is processing a normal application program, the processor state is the user state. When an interrupt occurs in this user state, the processor transits to the supervisor state. When an interrupt return instruction is executed in this supervisor state, the processor returns to the user state.

On the other hand, if another interrupt occurs before the interrupt return instruction is executed in the supervisor state, the processor transits from the current supervisor state to the next supervisor state. When the interrupt return instruction is executed in this new supervisor state, the processor returns to the previous supervisor state.

The operation of the processor shown in FIG. 3 will be described next. When the processor is in the user state, the instruction fetch section 20 reads out the instruction word 62 from the memory 10 on the basis of the instruction address 61 indicated by the program counter 21, and writes/holds the read-out instruction word in the instruction register 22. The instruction fetch section 20 also supplies the instruction word 63 held in the instruction register 22 to the instruction execution section 30.

The instruction execution section 30 decodes the instruction word 63 supplied from the instruction fetch section 20 and executes processing of the supplied instruction in accordance with the decoding result. If no break-interrupt or normal interrupt occurs in this user state, the processor repeats the above operation.

However, when the instruction fetch section 20 detects a break-interrupt, the instruction fetch section 20 notifies the interrupt control section 40 of the break-interrupt using the interrupt notification signal 67. When the instruction execution section 30 detects a normal interrupt, the instruction execution section 30 notifies the interrupt control section 40 of the normal interrupt using the interrupt notification signal 74.

When receiving the interrupt notification from the instruction fetch section 20 or instruction execution section 30, the interrupt control section 40 controls the instruction fetch section 20 and register section 50 to perform processing as follows.

First, the interrupt control section 40 reads out the currently indicated instruction address 73 from the program counter 21 and writes the read-out instruction address 73 in the return address register 52.

The interrupt control section 40 also reads out the processor state (user state) before the interrupt from the present state register 54, writes the read-out processor state in the previous state register 53 and, also writes, in the present state register 54, the processor state that has transited in accordance with the interrupt. Thus, the processor transits from the user state to the supervisor state. The interrupt control section 40 also supplies the start address 66 of the interrupt handler corresponding to the interrupt to the instruction fetch section 20 and sets the address value in the program counter 21.

The processor which has transited to the supervisor state reads out the instruction word 62 of the interrupt handler to the instruction fetch section 20 in accordance with the start address 66 of the interrupt handler, which is set in the program counter 21, temporarily holds the read-out instruction word in the instruction register 22, and then supplies the instruction word to the instruction execution section 30.

The instruction execution section 30 decodes the supplied instruction word 63 and executes processing in accordance with the decoding result. At this time, the instruction execution section 30 repeats the operation of executing the instruction word 63 sequentially supplied toward the end address of the interrupt handler. When processing of the interrupt handler corresponding to the interrupt is ended, the processor executes the interrupt return instruction.

When receiving the interrupt return instruction, the instruction execution section 30 reads out the value of the previous state register 53 and writes the value in the present state register 54. Thus, the processor transits from the supervisor state to the user state. The instruction execution section 30 also reads out the original instruction address to which the processor will return from the interrupt state from the return address register 52, supplies the instruction address to the instruction fetch section 20 as the branch destination address 65, and sets the instruction address in the program counter 21.

On the basis of the original instruction address 61 set in the program counter 21, the instruction fetch section 20 reads out the instruction word 62 for the normal operation from the memory 10, temporarily holds the instruction word 62 in the instruction register 22, and then supplies the instruction word to the instruction execution section 30. The instruction execution section 30 executes processing of the remaining part of the application program corresponding to the normal operation.

To set execution of a break-interrupt by an instruction break, for an entry of interest in entries #0 to #n corresponding to the breakpoint registers $24_{-0}$ to $24_{-n}$ in the instruction break detection section 23, the target address of a breakpoint is written in the address register 24a, and the value "1" representing the instruction break operation valid state is written in the flag register 24b.

To cancel execution of the break-interrupt by an instruction break, for an entry of interest in the entries #0 to #n corresponding to the breakpoint registers $24_{-0}$ to $24_{-n}$, in the instruction break detection section 23, the value "0" representing the instruction break operation invalid state is written in the flag register 24b.

FIG. 4 is a block diagram showing a conventional construction for implementing the software break scheme by a breakpoint instruction.

In FIG. 4, the same reference numerals as in FIG. 3 denote the same functional parts as in FIG. 3, respectively, and a detailed description thereof will be omitted.

Referring to FIG. 4, when detecting a normal interrupt due to an instruction address conversion error or the like, an instruction fetch section 20 notifies an interrupt control section 40 of the normal interrupt using an interrupt notification signal 81.

When a breakpoint instruction is supplied in executing an instruction supplied from the instruction fetch section 20 by an instruction execution section 30, the instruction execution section 30 notifies the interrupt control section 40 of the software break-interrupt using an interrupt notification signal 82.

Figure 5:
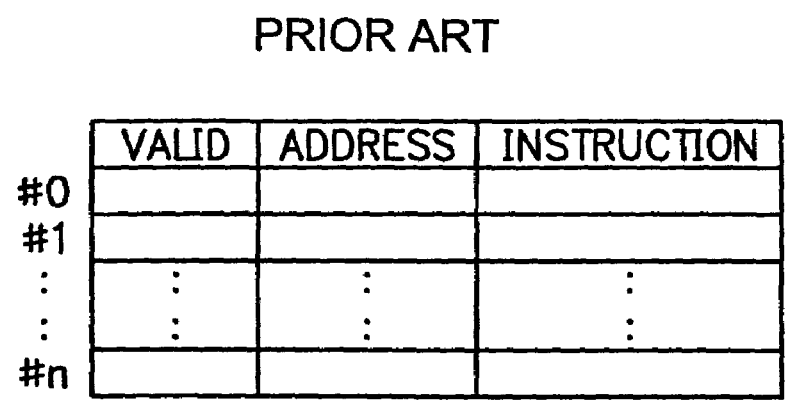

FIG. 5 is a representation showing the construction of a breakpoint table held by the instruction execution section 30 in the software break scheme.

Referring to FIG. 5, a column "VALID" represents whether the breakpoint operation is valid. A value "1" means a breakpoint operation valid state while a value "0" means a breakpoint operation invalid state.

A column "ADDRESS" holds the target address of a breakpoint at which execution is to be stopped. A column "INSTRUCTION" holds a breakpoint target instruction word. The breakpoint target instruction word is replaced with a breakpoint instruction for generating a break-interrupt. For this reason, in canceling the breakpoint operation, restoration is done using the data of the breakpoint target instruction word held in the column "INSTRUCTION".

To set execution of a break-interrupt by a breakpoint instruction, for an entry of interest in entries #0 to #n of the breakpoint table shown in FIG. 5, an instruction address representing a breakpoint is written in the column "ADDRESS", a breakpoint target instruction word is written in the column "INSTRUCTION", and the value "1" representing the breakpoint operation valid state is written in the column "VALID". In addition, the breakpoint target instruction word is replaced with a breakpoint instruction for generating a break-interrupt.

Contrastingly, to cancel execution of the break-interrupt by a breakpoint instruction, for an entry of interest in the entries #0 to #n of the breakpoint table shown in FIG. 5, the breakpoint target instruction word written in the column "INSTRUCTION" is read out and replaced with a breakpoint instruction. In addition, for the entry of interest, the value "0" representing the breakpoint operation invalid state is written in the column "VALID".

Recent processors are required to make the branch instruction use frequency low in order to improve the processing performance. For this purpose, techniques including a conditional instruction or predicated execution have been proposed ("HPL PlayDoh Architecture Specification ver. 1.0, "Vinod Kathail Etc HPL 93-80 February 1994," Incorporating Guarded Execution into Existing Instruction Set" D. N. Pnevmatikatos PDH Paper Wisconsin Univ. 1996, and "The Benefit of Predicated Execution for Software Pipelining" N.J. Warter etc. IIICSS-26 Conference Proceedings January 1993 Vol. 1, pp. 497-606).

However, in the conventional interrupt scheme using an instruction break, as shown in FIG. 3, a break-interrupt always occurs when the instruction break generation condition set in each of the breakpoint registers $24_{-0}$ to $24_{-n}$ of the instruction break detection section 23 is satisfied. For this reason, in debugging a program containing a conditional instruction, execution of the program is interrupted when the instruction break generation condition is satisfied while the condition of the conditional instruction is not satisfied.

In the conventional interrupt scheme using a breakpoint instruction, as shown in FIG. 4, a break-interrupt always occurs when a breakpoint instruction that has been replaced in advance is supplied. For this reason, in debugging a program containing a conditional instruction, execution of the program is interrupted when the breakpoint instruction is supplied while the condition of the conditional instruction is not satisfied.

SUMMARY OF THE INVENTION

It is the first object of the present invention to generate a break-interrupt even within the interrupt inhibition period.

It is the second object of the present invention to control generation of a break-interrupt in debugging a program containing a conditional instruction depending on whether the condition of the conditional instruction is satisfied.

In order to achieve the first object, according to the present invention, there is provided an interrupt control apparatus having a function of normal interrupt and a function of break-interrupt, comprising a first information holding section for holding, at the time of a normal interrupt, operation information of a processor before the interrupt, a second information holding section for holding, at the time of a break-interrupt, operation information of the processor before the break-interrupt, a return operation specifying section for specifying whether or not a return operation from a normal interrupt state or a return operation from a break-interrupt state is to be performed in returning from an interrupt operation, and an interrupt return section for re-setting operation information held in the first information holding section or operation information held in the second information holding section in accordance with operation contents specified by the return operation specifying section, and thereby returning a state of the processor from an interrupt operation state to a state before the interrupt.

According to the present invention, there is also provided an interrupt control method, comprising the steps of, when a normal interrupt occurs, holding operation information of a processor before the normal interrupt in a first information holding section, when a break-interrupt occurs, holding operation information of the processor before the break-interrupt in a second information holding section different from the first information holding section and setting a flag for showing whether or not the break-interrupt state is set, to the break-interrupt state, and in returning the processor from the interrupt state to a state before the interrupt, selecting and restoring one of operation information in the first information holding section and operation information in the second information holding section in accordance with a value of the flag.

According to the present invention having the above construction, when a break-interrupt occurs, processor operation information before the break-interrupt is saved in a holding section dedicated to the break-interrupt independently of that for a normal interrupt. In returning from the break-interrupt, the processor operation information before the break-interrupt is restored from the holding section dedicated to the break-interrupt. Thus, the operation information before a normal interrupt, which is required for returning from the normal interrupt state is not overwritten by the operation information saved at the time of break-interrupt. Hence, a break-interrupt can occur even within an interrupt inhibition period by a normal interrupt.

More specifically, according to the present invention, the processor operation information at the time of break-interrupt can be held even within interrupt inhibition periods immediately after the normal interrupt operation and immediately before interrupt return, so a break-interrupt can occur even within the interrupt inhibition period. Hence, when an interrupt handler is generated as part of an application, the interrupt handler can be completely debugged.

For example, only an instruction address is held as the processor operation information before a break-interrupt, which is to be held when a break-interrupt occurs, the return operation from the break-interrupt state can be executed with minimum necessary operation information.

Additionally, according to the present invention, in returning from an interrupt state, it can be specified whether the operation is a return operation from a break-interrupt state or normal interrupt state by referring to a flag representing whether the break-interrupt state is set. For this reason, even for a break-interrupt that has occurred within the interrupt inhibition period by a normal interrupt, the processor operation information before the break-interrupt can be accurately restored, and a break-interrupt can occur even within the interrupt inhibition period by the normal interrupt.

According to another characteristic feature of the present invention, in returning from the interrupt state, it can be specified in accordance with the contents of an interrupt return instruction whether the operation is a return operation from a break-interrupt state or normal interrupt state. For this reason, even for a break-interrupt that has occurred in the normal interrupt state, the processor operation information before the break-interrupt can be accurately restored without preparing the flag representing whether the break-interrupt state is set. Hence, a break-interrupt can be generated using a small hardware resource.

In order to achieve the second object, according to the present invention, there is provided an interrupt control apparatus applied to a data processing system having a function of executing a conditional instruction, comprising a break detection section for detecting a breakpoint set at an arbitrary position of an instruction sequence, a condition determination section for determining whether or not a condition of the conditional instruction is satisfied, and a control section for controlling a break-interrupt on the basis of a breakpoint detection result from the break detection section and a determination result from the condition determination section.

More specifically, the apparatus comprises an instruction break detection section for detecting an instruction break in accordance with whether or not an instruction corresponding to an instruction address representing a breakpoint, which is set in a register, is read out, and outputting a detection signal representing a detection result, a condition determination section for determining whether or not a condition of the read-out conditional instruction is satisfied and outputting a determination signal representing a determination result, and a logical operation section for performing AND operation to the detection signal output from the instruction break detection section and the determination signal output from the condition determination section and sending a break-interrupt notification in accordance with an AND operation result.

According to another aspect of the present invention, there is provided an interrupt control apparatus applied to a data processing system having a function of executing a conditional instruction, comprising an instruction break detection section for detecting an instruction break in accordance with whether or not an instruction corresponding to an instruction address representing a breakpoint, which is set in a register, is read out, and sending a break-interrupt notification in accordance with a detection result, and a control section for, in an interrupt handler activated in accordance with the break-interrupt notification supplied from the instruction break detection section, determining whether or not a condition of the conditional instruction is satisfied and controlling break-interrupt processing in accordance with a determination result.

According to still another aspect of the present invention, there is provided an interrupt control apparatus applied to a data processing system having a function of executing a conditional instruction, comprising a software break detection section for detecting a software break in accordance with whether a breakpoint instruction replaced at an arbitrary position of an instruction sequence is executed and sending a break-interrupt notification in accordance with a detection result, and a control section for, in an interrupt handler activated in accordance with the break-interrupt notification supplied from the software break detection section, determining whether or not a condition of the conditional instruction is satisfied and controlling break-interrupt processing in accordance with a determination result.

According to the present invention, there is also provided an interrupt control method of controlling a break-interrupt in a data processing system having a function of executing a conditional instruction, comprising the steps of detecting a breakpoint set at an arbitrary position of an instruction sequence, determining whether or not a condition of the conditional instruction is satisfied, and controlling the break-interrupt on the basis of a detection result of the breakpoint and a determination result of the conditional instruction.

According to the present invention having the above construction, a break-interrupt can be controlled not only on the basis of the detection result of a breakpoint such as an instruction break or software break but also, when the supplied instruction is a conditional instruction, on the basis of the determination result of the condition.

Hence, in debugging a program including a conditional instruction, when the condition of the conditional instruction is satisfied, program execution is interrupted. When the condition of the conditional instruction is not satisfied, an interrupt of the program execution can be inhibited.

BRIEF DESCRIPTION OF THE DRAWINGS

FIG. 5 is a representation showing the construction of a breakpoint table used in the software break scheme;

FIG. 10 is a block diagram showing the construction of an interrupt control apparatus according to the third embodiment of the present invention;

FIG. 11 is a block diagram showing the construction of an interrupt control apparatus according to the fourth embodiment of the present invention;

FIG. 12 is a block diagram showing the construction of an interrupt control apparatus according to the fifth embodiment of the present invention;

FIG. 13 is a representation showing the instruction form of an interrupt return instruction used in the fifth embodiment and also the following sixth to ninth embodiments of the present invention;

FIG. 16 is a block diagram showing the construction of an interrupt control apparatus according to the eighth embodiment of the present invention;

FIG. 20 is a block diagram showing the construction of a data processing system (processor) according to the 11th embodiment of the present invention for implementing an instruction break scheme by a hardware mechanism;

FIG. 21 is a block diagram showing the construction of a determination section according to the 11th embodiment;

FIG. 25 is a block diagram showing the construction of a determination section according to the 13th embodiment;

FIG. 27 is a block diagram showing the construction of a determination section according to the 14th embodiment;

FIG. 29 is a block diagram showing the first construction of a determination section according to the 15th embodiment;

FIG. 34 is a block diagram showing the construction of a data processing system (processor) according to the 16th embodiment of the present invention for implementing an instruction break scheme by a hardware mechanism;

FIG. 35 is a block diagram showing the first construction of a determination section according to the 16th embodiment;

FIG. 40 is a block diagram showing the construction of a data processing system (processor) according to the 17th embodiment of the present invention for implementing an instruction break scheme by a hardware mechanism;

FIG. 42 is a block diagram showing the second construction of the determination section according to the 17th embodiment;

FIG. 45 is a block diagram showing the fifth construction of the determination section according to the 17th embodiment;

FIG. 48 is a representation showing the first example of construction of a breakpoint table used in the 18th embodiment;

FIG. 51 is a representation showing the second example of construction of the breakpoint table used in the 18th embodiment;

FIG. 55 is a representation showing the first example of construction of a breakpoint table used in the 19th embodiment;

FIG. 56 is a representation showing the second example of construction of the breakpoint table used in the 19th embodiment;

FIG. 59 is a representation showing the first example of construction of a breakpoint table used in the 22nd embodiment of the present invention;

FIG. 60 is a representation showing the second example of construction of the breakpoint table used in the 22nd embodiment; and FIG. 61 is a representation showing the third example of construction of the breakpoint table used in the 22nd embodiment.

DETAILED DESCRIPTION OF THE PREFERRED EMBODIMENTS

Hereinafter, embodiments of the present invention will be described with reference to drawings.

First Embodiment

Figure 6:
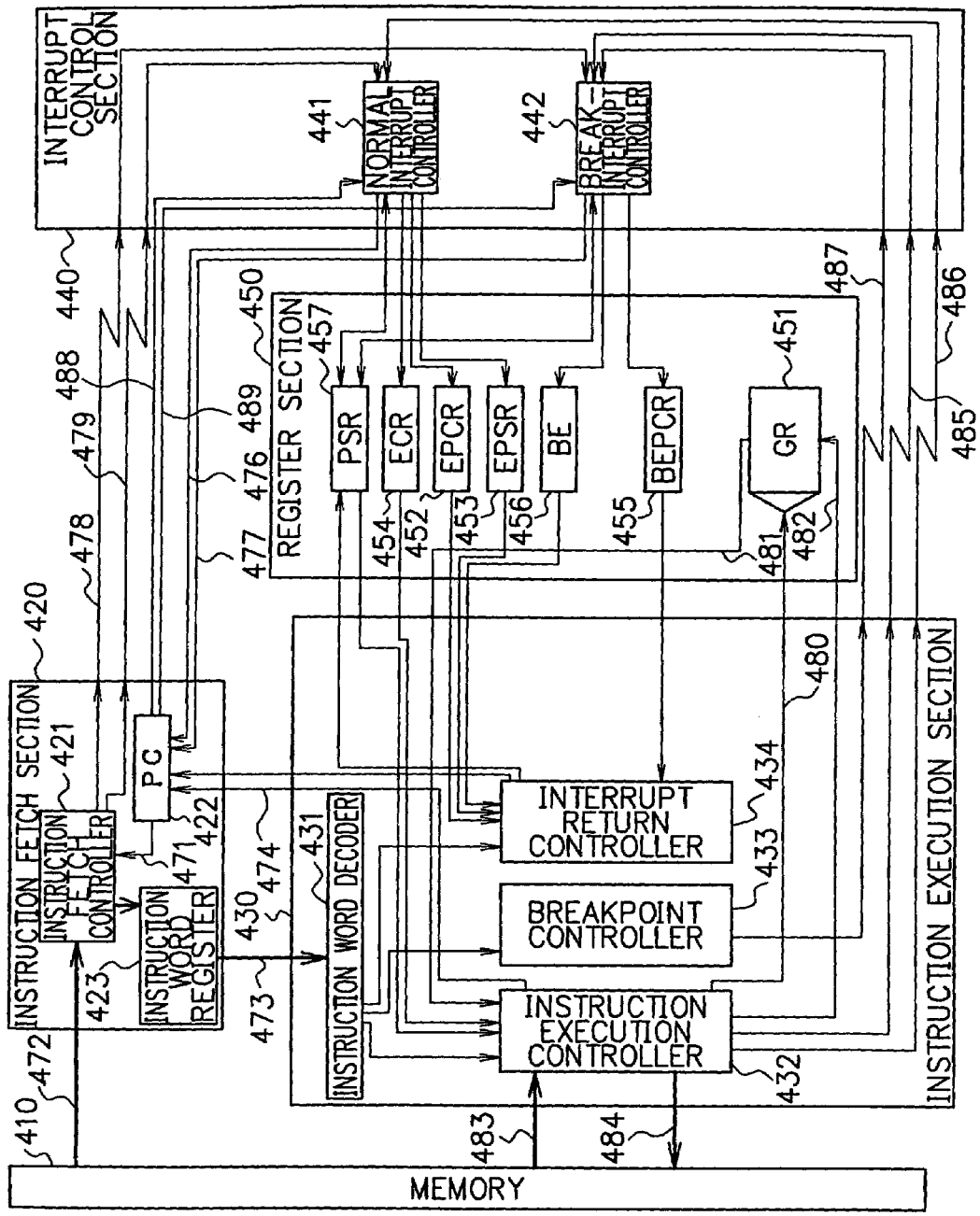
FIG. 6 is a block diagram showing the construction of an interrupt control apparatus according to the first embodiment of the present invention.

FIG. 6 is a block diagram showing the construction of an interrupt control apparatus according to the first embodiment of the present invention.

Referring to FIG. 6, reference numeral 410 denotes a memory which stores programs including an application and interrupt handler; 420 denotes an instruction fetch section; 430 denotes an instruction execution section; 440 denotes an interrupt control section; and 450 denotes a register section.

The instruction fetch section 420 comprises an instruction fetch controller 421, a program counter 422, and an instruction word register 423. The instruction fetch controller 421 reads out an instruction word 472 from the memory 410 on the basis of an instruction address 471 indicated by the program counter 422 and writes/holds the read-out instruction word in the instruction register 423. The instruction fetch section 420 also supplies an instruction word 473 held in the instruction register 423 to the instruction execution section 430.

When an instruction address 474 of a branch destination or an instruction address 475 for return from the interrupt state is supplied from the instruction execution section 430, or when an instruction address 476 of a normal interrupt handler or an instruction address 477 of a break-interrupt handler is supplied from the interrupt control section 440, the instruction fetch section 420 writes the supplied instruction address in the program counter 422. Otherwise, the value of the program counter 21 is incremented by one to read out the next instruction word sequentially.

When a break-interrupt by an instruction breakpoint or step execution is detected in reading out the instruction word 472 from the memory 410, the instruction fetch controller 421 notifies the interrupt control section 440 of the break-interrupt using a break-interrupt notification signal 478. When a normal interrupt due to an instruction address conversion error or the like is detected, the instruction fetch controller 421 notifies the interrupt control section 440 of the normal interrupt using a normal interrupt notification signal 479.

The instruction execution section 430 comprises an instruction word decoder 431, an instruction execution controller 432, a breakpoint controller 433, and an interrupt return controller 434. The instruction word decoder 431 decodes the instruction word 473 supplied from the instruction fetch section 420.

If the supplied instruction word 473 is an instruction word for generating a break-interrupt by a software breakpoint, a break-interrupt generation instruction is supplied to the breakpoint controller 433. If the supplied instruction word 473 is an instruction word for returning the processor from the interrupt state, an interrupt return instruction is supplied to the interrupt return controller 434. If the supplied instruction word 473 is an instruction word of another type, the decoded instruction is supplied to the instruction execution controller 432.

The instruction execution controller 432 executes processing such as calculation, branch, or data load/store in accordance with the instruction supplied from the instruction word decoder 431. For example, if the supplied instruction is a calculation instruction, the instruction execution controller 432 executes calculation on the basis of a data value 481 read out from a general-purpose register (GR) 451 in the register section 450, which is designated by a register address 480, and writes a data value 482 obtained by this calculation in the general-purpose register 451 designated by the register address 480.

If the supplied instruction is a branch instruction, and the branch condition is satisfied, the instruction execution controller 432 supplies the instruction address 474 of the branch destination to the instruction fetch section 420. If the supplied instruction is a load instruction or a store instruction, the instruction execution controller 432 obtains the effective address on the memory 410 from the data value 481 read out from the general-purpose register 451 designated by the register address 480, and reads out read data 483 or writes write data 484 from/in an area of the memory 410, which corresponds to the effective address.

When detecting a break-interrupt by a data breakpoint, the instruction execution controller 432 notifies the interrupt control section 440 of the break-interrupt using a break-interrupt notification signal 485. When a normal interrupt due to an error such as division by zero or data overflow is detected in executing a calculation instruction, the instruction execution controller 432 notifies the interrupt control section 440 of the normal interrupt using a normal interrupt notification signal 486.

In accordance with the break-interrupt generation instruction supplied from the instruction word decoder 431, the breakpoint controller 433 notifies the interrupt control section 440 of the break-interrupt using a break-interrupt notification signal 487.

The interrupt return controller 434 executes a return operation from the interrupt state in accordance with the interrupt return instruction supplied from the instruction word decoder 431. At this time, the interrupt return controller 434 specifies, on the basis of pieces of operation information before the interrupt, which are held by registers in the register section 450, whether the operation is a return operation from a normal interrupt state or break-interrupt state, and restores the operation information before the interrupt.

The interrupt control section 440 comprises a normal interrupt controller 441 and break-interrupt controller 442. When receiving the normal interrupt notification signal 479 from the instruction fetch section 420 or the normal interrupt notification signal 486 from the instruction execution section 430, the normal interrupt controller 441 controls the instruction fetch section 420 and register section 450 to execute a shift operation to the normal interrupt state.

When receiving the normal interrupt notification signal 479 or 486, the normal interrupt controller 441 reads out an instruction address 488 at the time of normal interrupt from the instruction fetch section 420, supplies a start address 476 of the normal interrupt handler to the instruction fetch section 420, and sets the address in the program counter 422. The normal interrupt controller 441 also writes received pieces of information on the normal interrupt, e.g., pieces of information on the instruction address at the time of normal interrupt in registers in the register section 450.

When receiving the break-interrupt notification signal 478 from the instruction fetch section 420 or one of the break-interrupt notification signals 485 and 487 from the instruction execution section 430, the break-interrupt controller 442 controls the instruction fetch section 420 and register section 450 to execute a shift operation to the break-interrupt state.

When receiving the break-interrupt notification signal 478, 485, or 487, the break-interrupt controller 442 loads an instruction address 489 at the time of break-interrupt from the instruction fetch section 420, supplies the start address 477 of the break-interrupt handler to the instruction fetch section 420, and sets the address in the program counter 422. The break-interrupt controller 442 also writes received pieces of information on the break-interrupt, e.g., pieces of information on the instruction address at the time of break-interrupt in registers in the register section 450.

The register section 450 includes the general-purpose register 451 for holding data to be used for calculation or the like by the instruction execution section 430, and registers 452 to 457 for holding data to be used for interrupt control (to be described below). The registers 452 to 457 for interrupt control will be described below.

The normal return address register (EPCR) 452 holds the original instruction address (the value 488 of the program counter 422 at the time of normal interrupt) to which the processor will return from the normal interrupt state. The normal previous state register (EPSR) 453 holds the processor state before the normal interrupt (normal user state or supervisor state). The normal factor register (ECR) 454 holds the factor of a normal interrupt. The values of these registers 452 to 454 are set at the time of normal interrupt. The normal return address register 452, normal previous state register 453, and normal factor register 454 constitute the first information holding section of the present invention.

The break return address register (BEPCR) 455 holds the original instruction address (the value 489 of the program counter 422 at the time of break-interrupt) to which the processor will return from the break-interrupt state. The value of this register is set at the time of break-interrupt. This break return address register 455 constitutes the second information holding section of the present invention. The instruction address set in the normal return address register 452 or break return address register 455 is supplied to the instruction fetch section 420 as the return address 475 in returning from the interrupt operation, and the address value is set in the program counter 422.

The flag register (BE) 456 represents whether a break-interrupt state is set. The value "0" indicates a non-break-interrupt state, and the value "1" indicates a break-interrupt state. The initial value of the flag register 456 is "0". When a break-interrupt occurs, the value transits from "0" to "1". In returning from the break-interrupt state, the value transits from "1" to "0". The flag register 456 constitutes the return operation specifying section of the present invention.

The present state register (PSR) 457 holds the current processor state.

Figure 7:
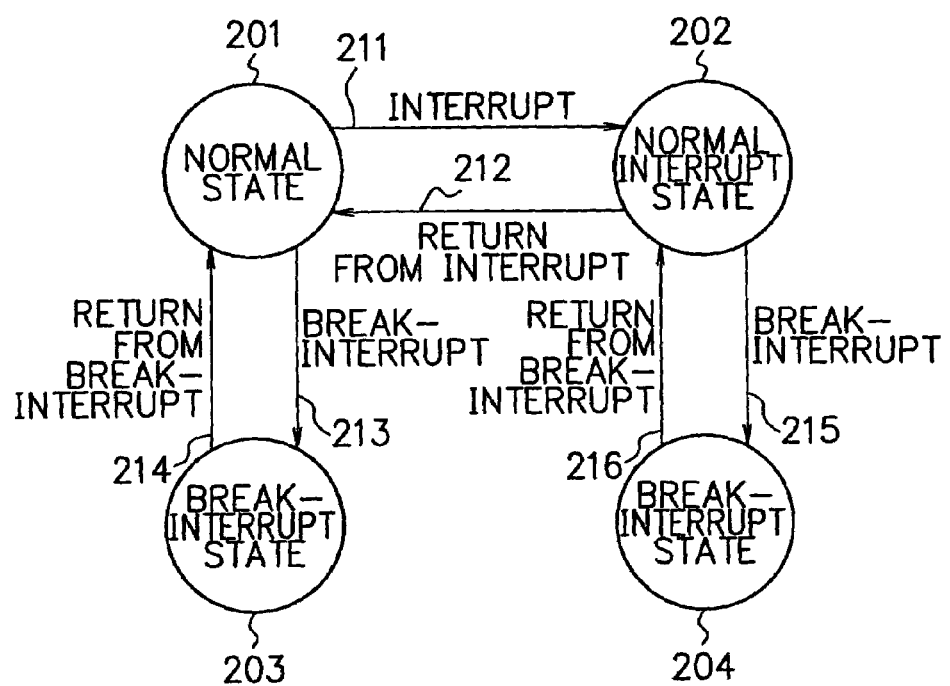
FIG. 7 is a representation showing an example of state transition of a processor in the interrupt control apparatus according to the first embodiment.

FIG. 7 is a representation showing an example of state transition of the processor in the first embodiment.

Referring to FIG. 7, reference numeral 201 denotes a user state (to be referred to as a normal state hereinafter) without a normal interrupt or a break-interrupt; 202 denotes a supervisor state (to be referred to as a normal interrupt state hereinafter) without any break-interrupt; and 203 and 204 denote supervisor states (to be referred to as a break-interrupt state hereinafter) having a break-interrupt. When the processor is processing a normal application, the processor state is the normal state 201.

When a normal interrupt 211 occurs in the normal state 201, the processor transits to the normal interrupt state 202. When a normal interrupt return instruction 212 is executed in this normal interrupt state 202, the processor returns to the normal state 201. When a break-interrupt 213 or 215 occurs in the normal state 201 or normal interrupt state 202, the processor transits to the break-interrupt state 203 or 204. When a break-interrupt return instruction 214 or 216 is executed in the break-interrupt state 203 or 204, the processor returns to the normal state 201 or normal interrupt state 202 as the state before the break-interrupt.

Figure 8:
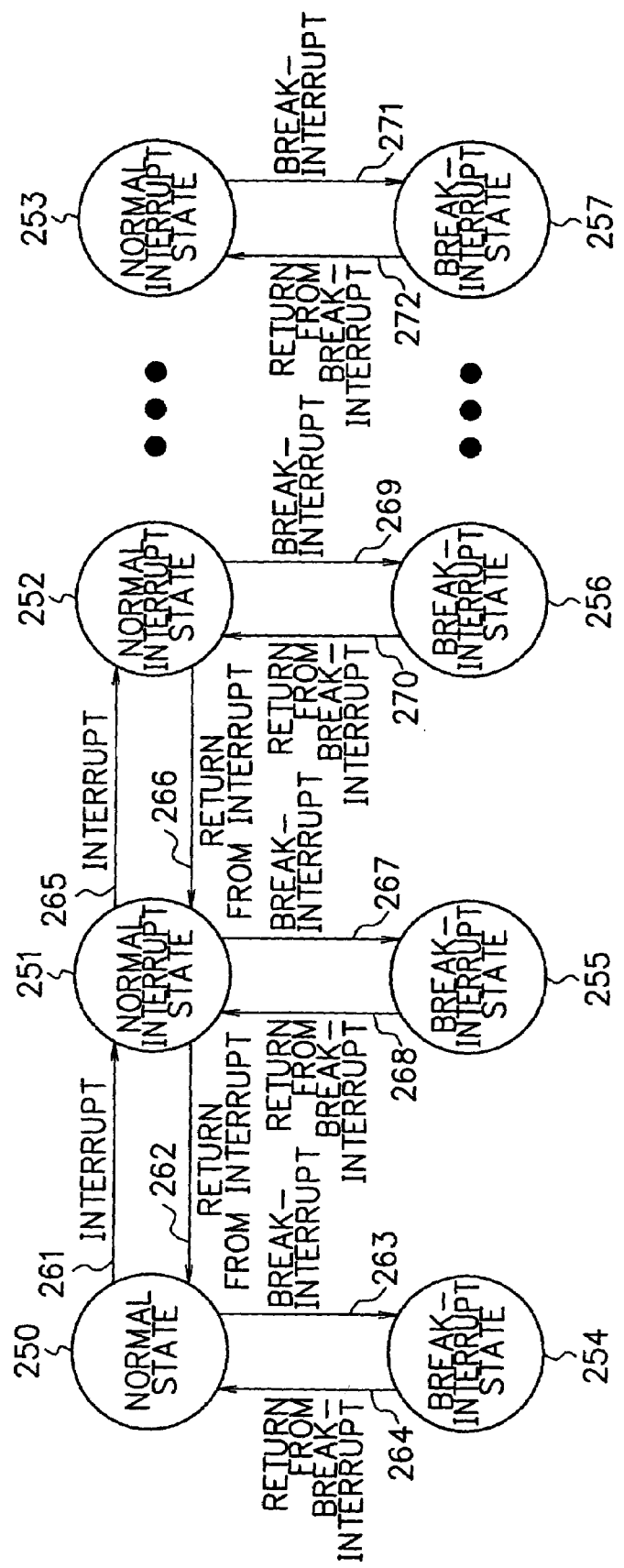
FIG. 8 is a representation showing another example of state transition of the processor in the interrupt control apparatus according to the first embodiment.

FIG. 8 is a representation showing another example of state transition of the processor in the first embodiment.

Referring to FIG. 8, reference numeral 250 denotes a normal state of the processor; 251, 252, and 253 denote normal interrupt states of the processor; and 254, 255, 256, and 257 denote break-interrupt states of the processor. When the processor is processing a normal application, the processor state is the normal state 250.

When a normal interrupt 261 occurs in the normal state 250, the processor transits to the normal interrupt state 251. When a normal interrupt return instruction 262 is executed in the normal interrupt state 251, the processor returns to the normal state 250. If another normal interrupt 265 occurs before execution of the normal interrupt return instruction 262 in the normal interrupt state 251, the processor transits from the normal interrupt state 251 to the next normal interrupt state 252. When a normal interrupt return instruction 266 is executed in this normal interrupt state 252, the processor returns to the previous normal interrupt state 251.

When a break-interrupt 263, 267, 269, or 271 occurs in the normal state 250 or normal interrupt state 251, 252, and 253, the processor transits to the break-interrupt state 254, 255, 256, or 257. When a break-interrupt return instruction 264, 268, 270, or 272 is executed in the break-interrupt state 254, 255, 256, or 257, the processor returns to the previous normal state 250 or normal interrupt state 251, 252, or 253.

The operation of the interrupt control apparatus shown in FIG. 6 will be described next by exemplifying the processor state transition shown in FIG. 7: normal state 201→normal interrupt state 202→break-interrupt state 204→normal interrupt state 202→normal state 201.

When the processor is in the normal state 201, the instruction fetch controller 421 shown in FIG. 6 reads out the instruction word 472 from the memory 410 on the basis of the instruction address 471 indicated by the program counter 422 and writes/holds the read-out instruction word in the instruction register 423. The instruction fetch section 420 also supplies the instruction word 473 held in the instruction register 423 to the instruction word decoder 431.

The instruction word decoder 431 decodes the received instruction word 473 and supplies an instruction to the instruction execution controller 432 or the breakpoint controller 433 in accordance with the decoding result. The instruction execution controller 432 or the breakpoint controller 433 executes processing in accordance with the received instruction. If the break-interrupt 213 or the normal interrupt 211 does not occur in this normal state 201, the processor repeats the above operation.

However, when the instruction fetch controller 421 or the instruction execution controller 432 detects the normal interrupt 211, the normal interrupt controller 441 is notified of the normal interrupt by the normal interrupt notification signal 479 from the instruction fetch controller 421 or the normal interrupt notification signal 486 from the instruction execution controller 432. When receiving the normal interrupt notification from the instruction fetch controller 421 or the instruction execution controller 432, the normal interrupt controller 441 controls the instruction fetch section 420 and the register section 450 to perform processing as follows.

First, the normal interrupt controller 441 reads out the presently indicated instruction address value 488 from the program counter 422 and writes the read-out instruction address value 488 in the normal return address register 452. The normal interrupt controller 441 also reads out the processor state (normal state) before the normal interrupt from the present state register 457, writes the read-out processor state in the normal previous state register 453, and also writes the factor of the normal interrupt in the normal factor register 454.

Next, the normal interrupt controller 441 writes, in the present state register 457, the processor state that has transited in accordance with the normal interrupt. The normal interrupt controller 441 also supplies the start address 476 of the interrupt handler corresponding to the normal interrupt to the instruction fetch section 420 and sets the address value in the program counter 422. Note that the flag register 456 keeps the initial value "0". Through the above-described process, the processor transits from the normal state 201 to the normal interrupt state 202.

The processor which has transited to the normal interrupt state 202 reads out the instruction word 472 of the interrupt handler to the instruction fetch controller 421 in accordance with the start address 476 of the interrupt handler, which is set in the program counter 422, temporarily holds the read-out instruction word in the instruction word register 423, and then supplies the instruction word to the instruction word decoder 431.

The instruction word decoder 431 decodes the received instruction word 473 and supplies the instruction to one of the instruction execution controller 432, the breakpoint controller 433, and the interrupt return controller 434 in accordance with the decoding result. The controller which has received the instruction executes processing in accordance with the received instruction. Unless the break-interrupt 215 occurs in the normal interrupt state 202, the instruction execution section 430 repeats the operation of executing the instruction word 473 sequentially supplied toward the final address of the interrupt handler.

However, when the instruction fetch controller 421, the instruction execution controller 432, or the breakpoint controller 433 detects the break-interrupt 215 during this operation, the break-interrupt controller 442 is notified of the break-interrupt by the break-interrupt notification signal 478 from the instruction fetch controller 421, the break-interrupt notification signal 485 from the instruction execution controller 432, or the break-interrupt notification signal 487 from the breakpoint controller 433.

When receiving the break-interrupt notification from the instruction fetch controller 421, the instruction execution controller 432, or the breakpoint controller 433, the break-interrupt controller 442 controls the instruction fetch section 420 and register section 450 to perform processing as follows.

First, the break-interrupt controller 442 reads out the currently indicated instruction address value 489 from the program counter 422, writes the read-out instruction address value 489 in the break return address register 455, and also writes "1" in the flag register 456.

Next, the break-interrupt controller 442 writes, in the present state register 457, the processor state that has transited in accordance with the break-interrupt. The break-interrupt controller 442 also supplies the start address 477 of the interrupt handler corresponding to the break-interrupt to the instruction fetch section 420 and sets the address value in the program counter 422. Through the above-described process, the processor transits from the normal interrupt state 202 to the break-interrupt state 204.

The processor which has transited to the break-interrupt state 204 reads out the instruction word 472 of the interrupt handler to the instruction fetch controller 421 in accordance with the start address 477 of the interrupt handler, which is set in the program counter 422, temporarily holds the read-out instruction word in the instruction word register 423, and then supplies the read-out instruction word 473 to the instruction word decoder 431.

The instruction word decoder 431 decodes the received instruction word 473 and supplies the instruction to the instruction execution controller 432 or the interrupt return controller 434 in accordance with the decoding result. The controller which has received the instruction executes processing in accordance with the received instruction. The instruction execution section 430 repeats the operation of executing the instruction word 473 sequentially supplied toward the final address of the interrupt handler.

When processing of the interrupt handler corresponding to the break-interrupt is ended, the processor executes the break-interrupt return instruction 216. At this time, the interrupt return instruction read out from the memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434.

When receiving the interrupt return instruction, the interrupt return controller 434 refers to the flag register 456 in the register section 450 and determines whether the flag register 456 has the value "1" representing the break-interrupt state. If the value of the flag register 456 is "1", the interrupt return controller 434 controls the instruction fetch section 420 and register section 450 to perform processing as follows.

First, the interrupt return controller 434 writes "0" in the flag register 456. The interrupt return controller 434 also reads out, from the break return address register 455, the original instruction address 475 to which the processor will return from the break-interrupt state, supplies the instruction address to the instruction fetch section 420, and sets the address value in the program counter 422.

On the basis of the original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining parts of processing of the interrupt handler corresponding to the normal interrupt.

When processing of the interrupt handler corresponding to the normal interrupt is ended in the normal interrupt state 202, the processor executes the normal interrupt return instruction 212. At this time, the interrupt return instruction read out from the memory 410 and supplied to the instruction word decoder 431 by the instruction fetch controller 421 is decoded by the instruction word decoder 431 and determined as an interrupt return instruction. In accordance with this determination, the instruction word decoder 431 supplies the interrupt return instruction to the interrupt return controller 434.

When receiving the interrupt return instruction, the interrupt return controller 434 refers to the flag register 456 in the register section 450 and determines whether the flag register 456 has the value "1". In this case, the flag register 456 has the value "0" representing the non-break-interrupt state. Hence, the interrupt return controller 434 controls the instruction fetch section 420 and register section 450 to perform processing as follows.

The interrupt return controller 434 reads out the value of the normal previous state register 453 and writes the value in the present state register 457. The interrupt return controller 434 also reads out, from the normal return address register 452, the original instruction address 475 to which the processor will return from the normal interrupt state, supplies the instruction address to the instruction fetch section 420, and sets the address value in the program counter 422.

On the basis of the original instruction address 471 set in the program counter 422, the instruction fetch controller 421 reads out the instruction word 472 for the normal operation from the memory 410, temporarily holds the instruction word in the instruction word register 423, and then supplies the instruction word to the instruction execution section 430. Thus, the processor transits from the normal interrupt state 202 to the normal state 201. The instruction execution section 430 executes the remaining part of processing of the application corresponding to the normal operation.

As described above in detail, according to this embodiment, when a normal interrupt occurs, the processor operation information before the normal interrupt is saved by writing, in the normal return address register 452, the original instruction address to which the processor will return from the normal interrupt state. When a break-interrupt occurs, the processor operation information before the break-interrupt is saved by writing, in the break return address register 455, the original instruction address to which the processor will return from the break-interrupt state. In addition, whether a break-interrupt has occurred is set in the flag register 456. In returning from the interrupt, which one of addresses of the return address registers 452 and 455 is to be used is determined by referring to the value of the flag register 456.

According to this construction, even within the interrupt inhibition periods immediately after the interrupt operation by a normal interrupt and immediately before interrupt return, when a write in the normal return address register 452, the normal previous state register 453, and the normal factor register 454 is inhibited, the break return address can be written in the break return address register 455 different from the normal return address register 452. Hence, a break-interrupt can occur even within the interrupt inhibition period by a normal interrupt. Additionally, the operation information before the normal interrupt or break-interrupt can be accurately restored by referring to the value of the flag register 456 in executing an interrupt return instruction.

Second Embodiment

The second embodiment of the present invention will be described next.

Figure 9:
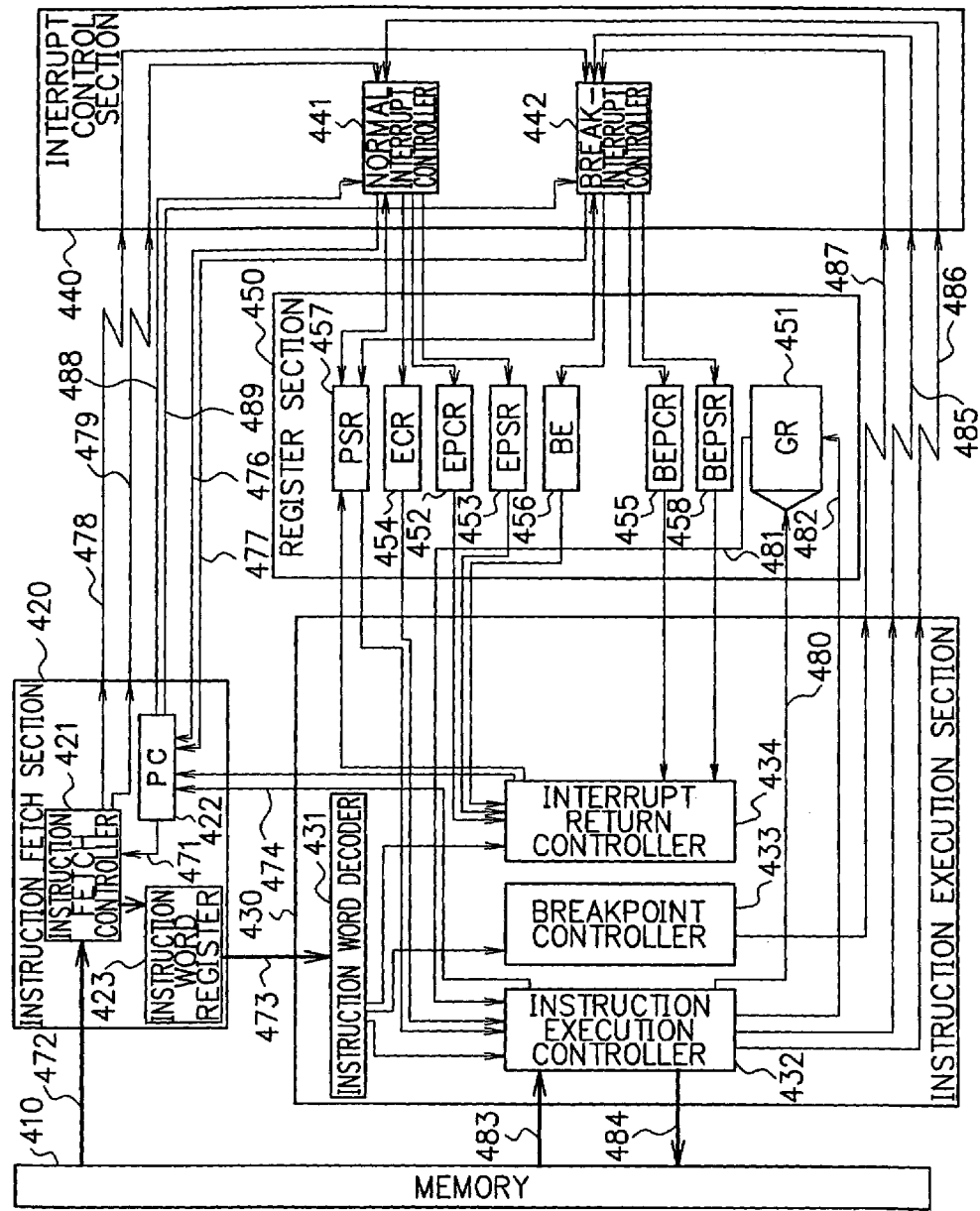
FIG. 9 is a block diagram showing the construction of an interrupt control apparatus according to the second embodiment of the present invention.

FIG. 9 is a block diagram showing the construction of an interrupt control apparatus according to the second embodiment. In FIG. 9, the same reference numerals as in FIG. 6 denote the same blocks as in FIG. 6, respectively, and a detailed description thereof will be omitted.

In the second embodiment shown in FIG. 9, in addition to registers 451 to 457 shown in FIG. 6, a break previous state register (BEPSR) 458 for holding the processor state before a break-interrupt is provided.

In this embodiment, the normal return address register 452, the normal previous state register 453, and the normal factor register 454 constitute the first information holding section of the present invention, and the break return address register 455 and the break previous state register 458 constitute the second information holding section of the present invention.

The flag register 456 constitutes the return operation specifying section of the present invention.

The operation of the interrupt control apparatus shown in FIG. 9 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and a register section 450 to perform processing as follows.

First, the break-interrupt controller 442 reads out the currently indicated instruction address value 489 from a program counter 422, writes the read-out instruction address value 489 in the break return address register 455, and also writes "1" in the flag register 456. The break-interrupt controller 442 also reads out the processor state (normal interrupt state) before the break-interrupt from the present state register 457 and writes the read-out processor state in the break previous state register 458.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431.

The instruction word decoder 431 decodes a received instruction word 473 and supplies the instruction to the instruction execution controller 432 or interrupt return controller 434 in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434.

When receiving the interrupt return instruction, the interrupt return controller 434 refers to the flag register 456 in the register section 450 and determines whether the flag register 456 has the value "1" representing the break-interrupt state. If the value of the flag register 456 is "1", the interrupt return controller 434 controls the instruction fetch section 420 and the register section 450 to perform processing as follows.

First, the interrupt return controller 434 writes "0" in the flag register 456 and simultaneously reads out the value of the break previous state register 458 and writes the value in the present state register 457. The interrupt return controller 434 also reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 6.

As described above, in the second embodiment, in addition to the operation of the above-described first embodiment, when a break-interrupt occurs, the processor state before the break-interrupt is written in the break previous state register 458.

According to this construction, a break-interrupt can occur even within the interrupt inhibition period by a normal interrupt, and additionally, the processor state before the interrupt can be held even for the break-interrupt. In returning from the break-interrupt, the previous processor state can be easily restored only by referring to the value of one register.

Third Embodiment

The third embodiment of the present invention will be described next.

FIG. 10 is a block diagram showing the construction of an interrupt control apparatus according to the third embodiment. In FIG. 10, the same reference numerals as in FIG. 6 denote the same blocks as in FIG. 6, respectively, and a detailed description thereof will be omitted.

In the third embodiment shown in FIG. 10, in addition to the registers 451 to 457 shown in FIG. 6, a break factor register (BECR) 459 for holding the factor (instruction breakpoint, data breakpoint, software breakpoint, or step execution) of a break-interrupt is provided.

In this embodiment, the normal return address register 452, the normal previous state register 453, and the normal factor register 454 constitute the first information holding section of the present invention, and the break return address register 455 and the break factor register 459 constitute the second information holding section of the present invention.

The flag register 456 constitutes the return operation specifying section of the present invention.

The operation of the interrupt control apparatus shown in FIG. 10 will be described next by exemplifying the processor state transition shown in FIG. 7: normal state 201 normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and the register section 450 to perform processing as follows.

First, the break-interrupt controller 442 reads out the currently indicated instruction address value 489 from a program counter 422, writes the read-out instruction address value 489 in the break return address register 455, and also writes "1" in the flag register 456. The break-interrupt controller 442 also writes the factor of the break-interrupt in the break factor register 459.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431.

The instruction word decoder 431 decodes a received instruction word 473 and supplies the instruction to the instruction execution controller 432 or interrupt return controller 434 in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434.

When receiving the interrupt return instruction, the interrupt return controller 434 refers to the flag register 456 in the register section 450 and determines whether the flag register 456 has the value "1" representing the break-interrupt state. If the value of the flag register 456 is "1", the interrupt return controller 434 controls the instruction fetch section 420 and register section 450 to perform processing as follows.

First, the interrupt return controller 434 writes "0" in the flag register 456. The interrupt return controller 434 also reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 6.

As described above, in the third embodiment, in addition to the operation of the above-described first embodiment, when a break-interrupt occurs, the factor of the break-interrupt is written in the break factor register 459.

According to this construction, a break-interrupt can occur even within the interrupt inhibition period by a normal interrupt, and additionally, the interrupt factor can be held even for the break-interrupt. For this reason, in a break-interrupt handler, not only predetermined specific processing but also appropriate interrupt processing corresponding to the interrupt factor can be performed.

Fourth Embodiment

The fourth embodiment of the present invention will be described next.

FIG. 11 is a block diagram showing the construction of an interrupt control apparatus according to the fourth embodiment. In FIG. 11, the same reference numerals as in FIGS. 6, 9, and 10 denote the same blocks as in FIGS. 6, 9, and 10, respectively, and a detailed description thereof will be omitted.

In the fourth embodiment shown in FIG. 11, in addition to the registers 451 to 457 shown in FIG. 6, a break previous state register 458 and a break factor register 459 are provided.

In this embodiment, the normal return address register 452, the normal previous state register 453, and the normal factor register 454 constitute the first information holding section of the present invention, and the break return address register 455, the break previous state register 458, and the break factor register 459 constitute the second information holding section of the present invention.

The flag register 456 constitutes the return operation specifying section of the present invention.

The operation of the interrupt control apparatus shown in FIG. 11 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and a register section 450 to perform processing as follows.

First, the break-interrupt controller 442 reads out the currently indicated instruction address value 489 from a program counter 422, writes the read-out instruction address value 489 in the break return address register 455, and also writes "1" in the flag register 456. The break-interrupt controller 442 also reads out the processor state (normal interrupt state) before the break-interrupt from the present state register 457 and writes the read-out processor state in the break previous state register 458, and simultaneously writes the factor of the break-interrupt in the break factor register 459.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431. The instruction word decoder 431 decodes a received instruction word 473 and supplies the instruction to the instruction execution controller 432 or the interrupt return controller 434 in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434.

When receiving the interrupt return instruction, the interrupt return controller 434 refers to the flag register 456 in the register section 450 and determines whether the flag register 456 has the value "1" representing the break-interrupt state. If the value of the flag register 456 is "1", the interrupt return controller 434 controls the instruction fetch section 420 and register section 450 to perform processing as follows.

First, the interrupt return controller 434 writes "0" in the flag register 456 and simultaneously reads out the value of the break previous state register 458 and writes the value in the present state register 457. The interrupt return controller 434 also reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 6.

As described above, in the fourth embodiment, in addition to the operation of the above-described first embodiment, when a break-interrupt occurs, the processor state before the break-interrupt is written in the break previous state register 458, and the factor of the break-interrupt is written in the break factor register 459.

According to this construction, a break-interrupt can occur even within the interrupt inhibition period by a normal interrupt. In addition, even in a break-interrupt handler, the previous processor state can be easily restored only in returning from the break-interrupt, and appropriate interrupt processing corresponding to the break-interrupt factor can be performed.

Fifth Embodiment

The fifth embodiment of the present invention will be described next.

FIG. 12 is a block diagram showing the construction of an interrupt control apparatus according to the fifth embodiment. In FIG. 12, the same reference numerals as in FIG. 6 denote the same blocks as in FIG. 6, respectively, and a detailed description thereof will be omitted.

Referring to FIG. 12, an interrupt return controller 434' executes a return operation from an interrupt state, like the interrupt return controller 434 shown in FIG. 6. The interrupt return controller 434' of this embodiment specifies whether the operation is a return operation from a normal interrupt state or a return operation from a break-interrupt state on the basis of information in the interrupt return instruction and restores operation information before the interrupt.

Additionally, in this embodiment, the flag register 456 used in the first to fourth embodiments is omitted, and instead, an interrupt return instruction (to be described later) contains information on whether a break-interrupt state is set.

In this embodiment, a normal return address register 452, a normal previous state register 453, and a normal factor register 454 constitute the first information holding section of the present invention, and a break return address register 455 constitutes the second information holding section of the present invention.

FIG. 13 is a representation showing the instruction form of an interrupt return instruction according to this embodiment.

Referring to FIG. 13, reference numeral 101 denotes a field representing an instruction code; and 102 denotes a field representing an operand. In this embodiment, the instruction code 101 means an interrupt return instruction, and the value of the operand 102 means whether a break-interrupt state is set. The operand 102 having the value "0" means return from a normal interrupt state, and the value "1" means return from a break-interrupt state.

The interrupt return instruction shown in FIG. 13 is prepared at the end of each of an interrupt handler for a normal interrupt and an interrupt handler for a break-interrupt. The value of the operand 102 of the interrupt return instruction for a normal interrupt is set to "0", and the value of the operand 102 of the interrupt return instruction for a break-interrupt is set to "1". The operand 102 of the interrupt return instruction constitutes the return operation specifying section of the present invention.

The operation of the interrupt control apparatus shown in FIG. 12 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and register section 450 to perform processing as follows.

First, the break-interrupt controller 442 reads out the currently indicated instruction address value 489 from a program counter 422 and writes the read-out instruction address value 489 in the break return address register 455.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431.

The instruction word decoder 431 decodes a received instruction word 473 and supplies the instruction to the instruction execution controller 432 or the interrupt return controller 434' in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434'.

When receiving the interrupt return instruction, the interrupt return controller 434' refers to the operand 102 of the received interrupt return instruction and determines whether the value is "1". If the operand 102 has the value "1" representing return from the break-interrupt state, the interrupt return controller 434' controls the instruction fetch section 420 and register section 450 to perform processing as follows.

First, the interrupt return controller 434' reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212. At this time, the interrupt return instruction read out from the memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434'.

When receiving the interrupt return instruction, the interrupt return controller 434' refers to the operand 102 of the received interrupt return instruction and determines whether the value is "1". In this case, the operand 102 has the value "0" representing return from the normal interrupt state. The interrupt return controller 434' controls the instruction fetch section 420 and the register section 450 to start the normal interrupt return operation. In this normal interrupt return operation, the same operation as that of the interrupt control apparatus shown in FIG. 6 is performed, and the normal interrupt state 202 transits to the normal state 201.

As described above, according to the fifth embodiment, when a normal interrupt occurs, the processor operation information before the normal interrupt is saved by writing, in the normal return address register 452, the original instruction address to which the processor will return from the normal interrupt state. When a break-interrupt occurs, the processor operation information before the break-interrupt is saved by writing, in the break return address register 455, the original instruction address to which the processor will return from the break-interrupt state. In addition, an interrupt return instruction whose operand 102 has the value "0" is prepared at the end of an interrupt handler corresponding to a normal interrupt, and an interrupt return instruction whose operand 102 has the value "138 is prepared at the end of an interrupt handler corresponding to a break-interrupt. In returning from the interrupt, the address to be used, i.e., the address in the return address register 452 or 455 is determined by referring to the value of the operand 102.

According to this construction, even within the interrupt inhibition periods immediately after the interrupt operation by a normal interrupt and immediately before interrupt return, the break return address can be written in the break return address register 455 different from the normal return address register 452. Hence, a break-interrupt can occur even within the interrupt inhibition period by a normal interrupt. Additionally, the operation information before the normal interrupt or break-interrupt can be accurately restored by referring to the value of the operand 102 of an interrupt return instruction in executing the interrupt return instruction. Furthermore, since not a register but the operand 102 in the interrupt return instruction has an identifier representing return from the normal interrupt state or return from the break-interrupt state, the processor operation information before the interrupt can be restored with a minimum hardware resource.

Sixth Embodiment

The sixth embodiment of the present invention will be described next.

Figure 14:
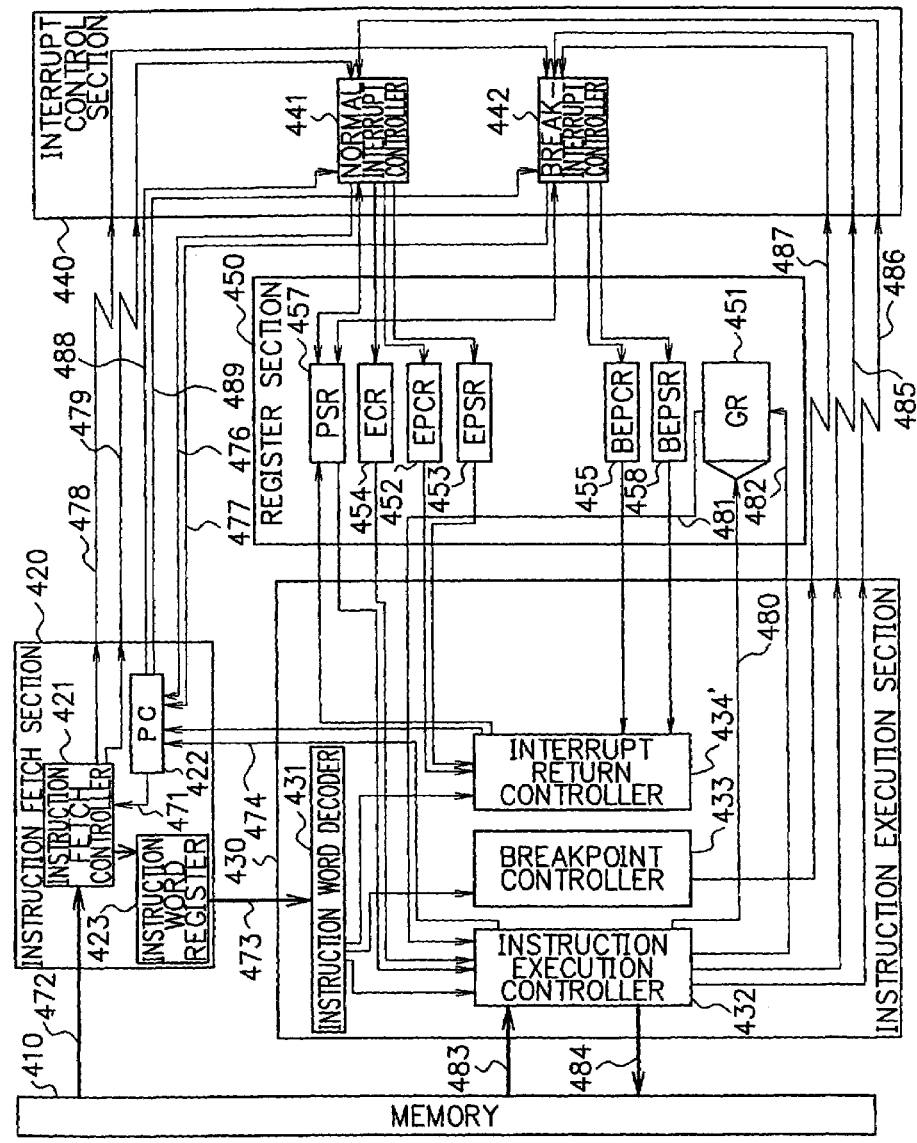
FIG. 14 is a block diagram showing the construction of an interrupt control apparatus according to the sixth embodiment of the present invention.

FIG. 14 is a block diagram showing the construction of an interrupt control apparatus according to the sixth embodiment. In FIG. 14, the same reference numerals as in FIGS. 6, 9, and 12 denote the same blocks as in FIGS. 6, 9, and 12, respectively, and a detailed description thereof will be omitted.

In this embodiment, an interrupt return instruction shown in FIG. 13 contains information on whether a break-interrupt state is set, like in the fifth embodiment shown in FIG. 12.

In this embodiment, a normal return address register 452, a normal previous state register 453, and a normal factor register 454 constitute the first information holding section of the present invention, and a break return address register 455 and a break previous state register 458 constitute the second information holding section of the present invention.

The interrupt return instruction is prepared at the end of either of an interrupt handler for a normal interrupt and an interrupt handler for a break-interrupt. The value of an operand 102 of the interrupt return instruction for a normal interrupt is set to "0", and the value of the operand 102 of the interrupt return instruction for a break-interrupt is set to "1". The operand 102 of the interrupt return instruction constitutes the return operation specifying section of the present invention.

The operation of the interrupt control apparatus shown in FIG. 14 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and register section 450 to perform processing as follows.

First, the break-interrupt controller 442 reads out the currently indicated instruction address value 489 from a program counter 422 and writes the read-out instruction address value 489 in the break return address register 455. The break-interrupt controller 442 also reads out the processor state (normal interrupt state) before the break-interrupt from the present state register 457 and writes the read-out processor state in the break previous state register 458.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431. The instruction word decoder 431 decodes a received instruction word 473 and supplies the instruction to the instruction execution controller 432 or interrupt return controller 434' in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434'.

When receiving the interrupt return instruction, the interrupt return controller 434' refers to the operand 102 of the received interrupt return instruction and determines whether the value is "1".

If the operand 102 has the value "1" representing return from the break-interrupt state, the interrupt return controller 434' controls the instruction fetch section 420 and register section 450 to perform processing as follows.

First, the interrupt return controller 434' reads out the value of the break previous state register 458 and writes the value in the present state register 457. The interrupt return controller 434' also reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 12.

As described above, in the sixth embodiment, in addition to the operation of the above-described fifth embodiment, when a break-interrupt occurs, the processor state before the break-interrupt is written in the break previous state register 458.

According to this construction, a break-interrupt can occur even within the interrupt inhibition period by a normal interrupt, and additionally, the processor state before the interrupt can be held even for the break-interrupt. In returning from the break-interrupt, the previous processor state can be easily restored.

Seventh Embodiment

The seventh embodiment of the present invention will be described next.

Figure 15:
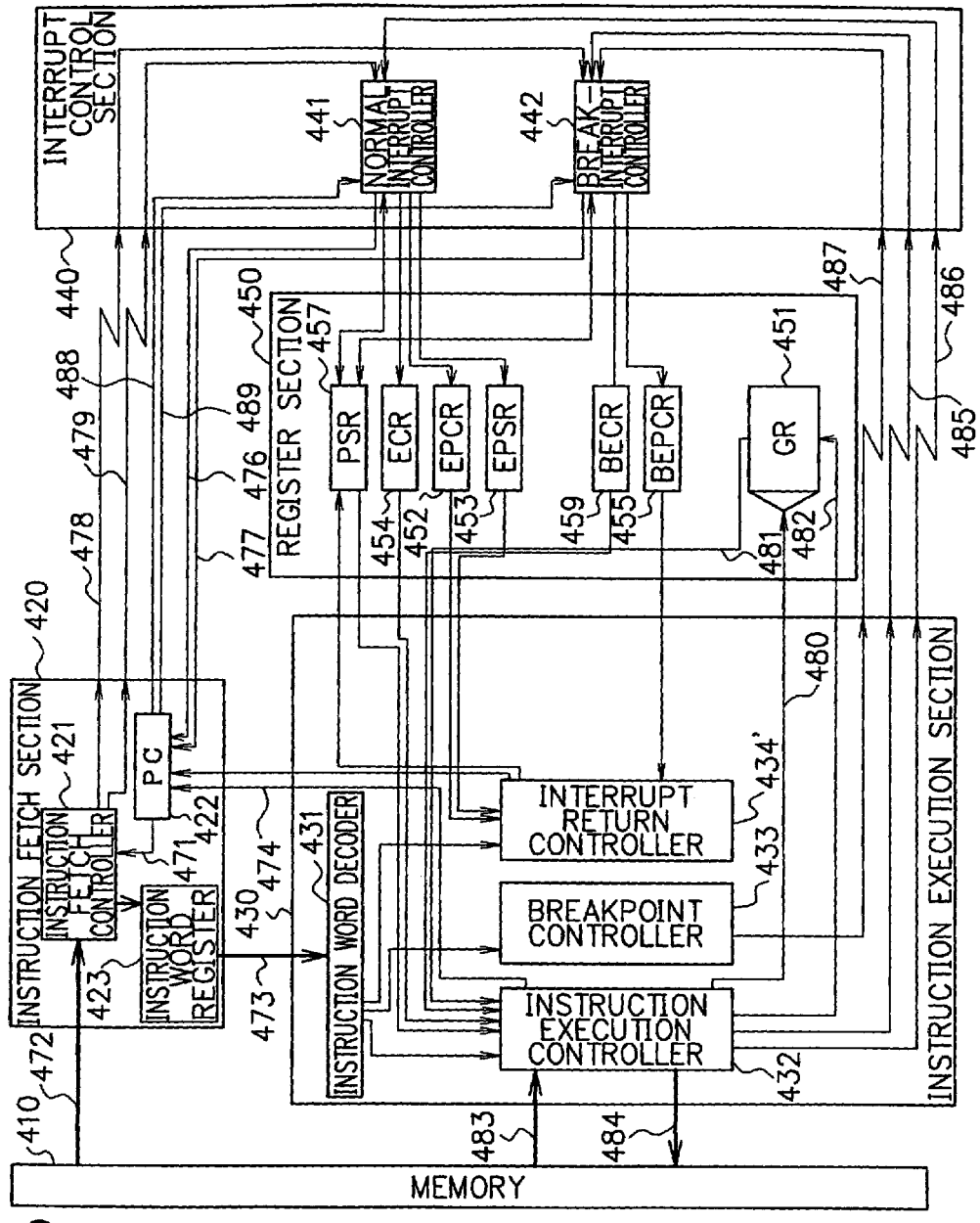
FIG. 15 is a block diagram showing the construction of an interrupt control apparatus according to the seventh embodiment of the present invention.

FIG. 15 is a block diagram showing the construction of an interrupt control apparatus according to the seventh embodiment. In FIG. 15, the same reference numerals as in FIGS. 6, 10, and 12 denote the same blocks as in FIGS. 6, 10, and 12, respectively, and a detailed description thereof will be omitted.

In this embodiment, an interrupt return instruction shown in FIG. 13 contains information on whether a break-interrupt state is set, like in the fifth embodiment shown in FIG. 12.

In this embodiment, a normal return address register 452, a normal previous state register 453, and a normal factor register 454 constitute the first information holding section of the present invention, and a break return address register 455 and a break factor register 459 constitute the second information holding section of the present invention.

The interrupt return instruction is prepared at the end of either of an interrupt handler for a normal interrupt and an interrupt handler for a break-interrupt. The value of an operand 102 of the interrupt return instruction for a normal interrupt is set to "0", and the value of the operand 102 of the interrupt return instruction for a break-interrupt is set to "1". The operand 102 of the interrupt return instruction constitutes the return operation specifying section of the present invention.

The operation of the interrupt control apparatus shown in FIG. 15 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and register section 450 to perform processing as follows.

First, the break-interrupt controller 442 reads out the currently indicated instruction address value 489 from a program counter 422 and writes the read-out instruction address value 489 in the break return address register 455. The break-interrupt controller 442 also writes the factor of the break-interrupt in the break factor register 459.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431. The instruction word decoder 431 decodes a received instruction word 473 and supplies the instruction to the instruction execution controller 432 or the interrupt return controller 434' in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434'.

When receiving the interrupt return instruction, the interrupt return controller 434' refers to the operand 102 of the received interrupt return instruction and determines whether the value is "1". If the operand 102 has the value "1" representing return from the break-interrupt state, the interrupt return controller 434' controls the instruction fetch section 420 and register section 450 to perform processing as follows.

First, the interrupt return controller 434' reads out, from the break return address register 455, an original instruction address 475 to which the processor will return from the break-interrupt state, supplies the instruction address to the instruction fetch section 420, and sets the address value in the program counter 422. On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 12.

As described above, in the seventh embodiment, in addition to the operation of the above-described fifth embodiment, when a break-interrupt occurs, the factor of the break-interrupt is written in the break factor register 459.

According to this construction, a break-interrupt can occur even within the interrupt inhibition period by a normal interrupt, and additionally, the interrupt factor can be held even for the break-interrupt. For this reason, in a break-interrupt handler, not only predetermined specific processing but also appropriate interrupt processing corresponding to the interrupt factor can be performed.

Eighth Embodiment

The eighth embodiment of the present invention will be described next.

FIG. 16 is a block diagram showing the construction of an interrupt control apparatus according to the eighth embodiment. In FIG. 16, the same reference numerals as in FIGS. 6, 9, 10, and 12 denote the same blocks as in FIGS. 6, 9, 10, and 12, respectively, and a detailed description thereof will be omitted.

In this embodiment, an interrupt return instruction shown in FIG. 13 contains information on whether a break-interrupt state is set, like in the fifth embodiment shown in FIG. 12.

In this embodiment, a normal return address register 452, a normal previous state register 453, and a normal factor register 454 constitute the first information holding section of the present invention, and a break return address register 455, a break previous state register 458, and a break factor register 459 constitute the second information holding section of the present invention.

The interrupt return instruction is prepared at the end of either of an interrupt handler for a normal interrupt and an interrupt handler for a break-interrupt. The value of an operand 102 of the interrupt return instruction for a normal interrupt is set to "0", and the value of the operand 102 of the interrupt return instruction for a break-interrupt is set to "1". The operand 102 of the interrupt return instruction constitutes the return operation specifying section of the present invention.

The operation of the interrupt control apparatus shown in FIG. 16 will be described next by exemplifying the processor state transition shown in FIG. 7: normal state 201→normal interrupt state 202→break-interrupt state 204→normal interrupt state 202→normal state 201.

When the processor in the normal state 201 transits to the normal interrupt state 202 due to a normal interrupt, the same operation as that of the interrupt control apparatus shown in FIG. 6 is performed.

When the processor is in the normal interrupt state 202, and an instruction fetch controller 421, an instruction execution controller 432, or an interrupt return controller 434 detects a break-interrupt 215, a break-interrupt controller 442 is notified of the break-interrupt by a break-interrupt notification signal 478 from the instruction fetch controller 421, a break-interrupt notification signal 485 from the instruction execution controller 432, or a break-interrupt notification signal 487 from the breakpoint controller 433.

When receiving the break-interrupt notification from the instruction fetch controller 421, the instruction execution controller 432, or the breakpoint controller 433, the break-interrupt controller 442 controls an instruction fetch section 420 and a register section 450 to perform processing as follows.

First, the break-interrupt controller 442 reads out the currently indicated instruction address value 489 from a program counter 422 and writes the read-out instruction address value 489 in the break return address register 455. The break-interrupt controller 442 also reads out the processor state (normal interrupt state) before the break-interrupt from the present state register 457 and writes the read-out processor state in the break previous state register 458. The break-interrupt controller 442 also writes the factor of the break-interrupt in the break factor register 459.

Next, the break-interrupt controller 442 writes, in the present state register 457, the processor state that has transited in accordance with the break-interrupt. The break-interrupt controller 442 also supplies a start address 477 of the interrupt handler corresponding to the break-interrupt to the instruction fetch section 420 and sets the address value in the program counter 422. By processing as described above, the processor transits from the normal interrupt state 202 to the break-interrupt state 204.

The processor which has transited to the break-interrupt state 204 reads out an instruction word 472 of the interrupt handler to the instruction fetch controller 421 in accordance with the start address 477 of the interrupt handler, which is set in the program counter 422, temporarily holds the read-out instruction word in an instruction word register 423, and then supplies the read-out instruction word 473 to an instruction word decoder 431.

The instruction word decoder 431 decodes a received instruction word 473 and supplies the instruction to the instruction execution controller 432 or the interrupt return controller 434' in accordance with the decoding result. The controller which has received the instruction executes processing in accordance with the received instruction. An instruction execution section 430 repeats the operation of executing the instruction word 473 sequentially supplied toward the final address of the interrupt handler.

When processing of the interrupt handler corresponding to the break-interrupt is ended, the processor executes a break-interrupt return instruction 216. At this time, the interrupt return instruction read out from a memory 410 and supplied to the instruction word decoder 431 by the instruction fetch section 420 is decoded by the instruction word decoder 431 and determined as an interrupt return instruction. In accordance with this determination, the instruction word decoder 431 supplies the interrupt return instruction to the interrupt return controller 434'.

When receiving the interrupt return instruction, the interrupt return controller 434' refers to the operand 102 of the received interrupt return instruction and determines whether the value is "1". If the operand 102 has the value "1" representing return from the break-interrupt state, the interrupt return controller 434' controls the instruction fetch section 420 and the register section 450 to perform processing as follows.

First, the interrupt return controller 434' reads out the value of the break previous state register 458 and writes the value in the present state register 457. The interrupt return controller 434' also reads out, from the break return address register 455, an original instruction address 475 to which the processor will return from the break-interrupt state, supplies the instruction address to the instruction fetch section 420, and sets the address value in the program counter 422.

On the basis of an original instruction address 471 set in the program counter 422, the instruction fetch controller 421 reads out the instruction word 472 of the interrupt handler corresponding to the normal interrupt from the memory 410, temporarily holds the instruction word in the instruction word register 423, and then supplies the instruction word to the instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes a normal interrupt return instruction 212 and returns from the normal interrupt state 202 to the normal state 201. The operation at this time is the same as that of the interrupt control apparatus shown in FIG. 12.

As described above, in the eighth embodiment, in addition to the operation of the above-described fifth embodiment, when a break-interrupt occurs, the processor state before the break-interrupt is written in the break previous state register 458, and the factor of the break-interrupt is written in the break factor register 459.

According to this construction, a break-interrupt can occur even within the interrupt inhibition period by a normal interrupt. In addition, even in a break-interrupt handler, the previous processor state can be easily restored only in returning from the break-interrupt, and appropriate interrupt processing corresponding to the break-interrupt factor can be performed.

Ninth Embodiment

The ninth embodiment of the present invention will be described next.

Figure 17:
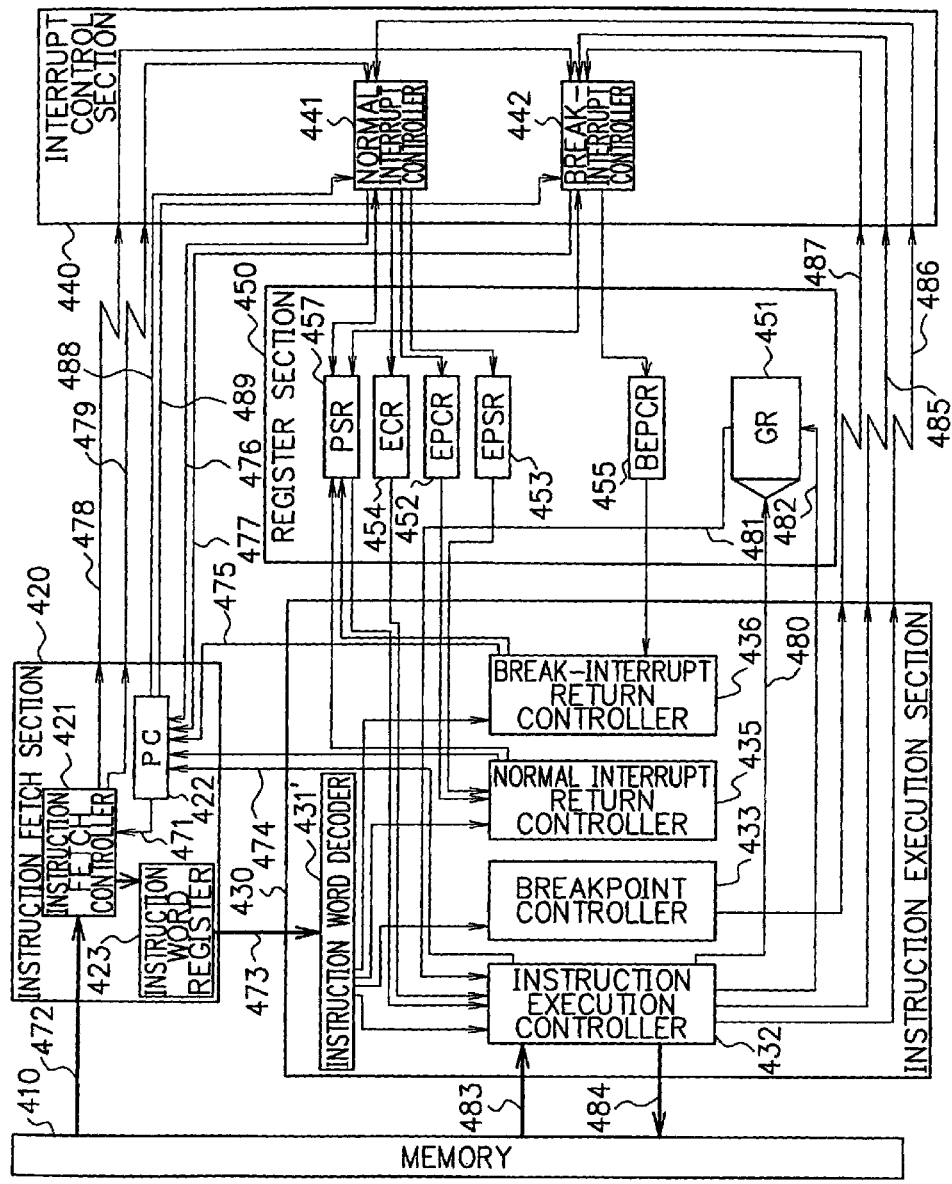
FIG. 17 is a block diagram showing the construction of an interrupt control apparatus according to the ninth embodiment of the present invention.

FIG. 17 is a block diagram showing the construction of an interrupt control apparatus according to the ninth embodiment. In FIG. 17, the same reference numerals as in FIG. 12 denote the same blocks as in FIG. 12, respectively, and a detailed description thereof will be omitted.

Referring to FIG. 17, reference numeral 341' denotes an instruction word decoder; 435 denotes a normal interrupt return controller; and 436 denotes a break-interrupt return controller.

The instruction word decoder 431' decodes an instruction word 473 supplied from an instruction fetch section 420, like the instruction word decoder 431 shown in FIG. 12. When it is detected by decoding that the supplied instruction word 473 is an instruction word for generating a break-interrupt by a software breakpoint, the instruction word decoder 431' of this embodiment supplies a break-interrupt generation instruction to a breakpoint controller 433.

When the supplied instruction word 473 is an instruction word for returning the processor from a normal interrupt state, the instruction word decoder 431' supplies a normal interrupt return instruction to the normal interrupt return controller 435. When the supplied instruction word 473 is an instruction word for returning the processor from a break-interrupt state, the instruction word decoder 431' supplies a break-interrupt return instruction to the break-interrupt return controller 436. When the supplied instruction word 473 is an instruction word of another type, the instruction word decoder 431' supplies the decoded instruction to an instruction execution controller 432.

The normal interrupt return controller 435 executes a return operation from the normal interrupt state in accordance with the normal interrupt return instruction supplied from the instruction word decoder 431'. The break-interrupt return controller 436 executes a return operation from the break-interrupt state in accordance with the break-interrupt return instruction supplied from the instruction word decoder 431'.

More specifically, in the fifth embodiment shown in FIG. 12, it is specified in accordance with the value of the operand 102 in the interrupt return instruction shown in FIG. 13 whether the operation is a return operation from a normal interrupt state or break-interrupt state. In the ninth embodiment, however, as the contents of an instruction code 101, two types of return instructions, a return instruction from a normal interrupt state and a return instruction from a break-interrupt state are used. In accordance with which return instruction is supplied to the instruction word decoder 431', the interrupt return controller which should perform the return operation is specified, and the processor operation information before the interrupt is restored. In this case, an operand 102 has an arbitrary value.

In this embodiment, a normal return address register 452, a normal previous state register 453, and a normal factor register 454 constitute the first information holding section of the present invention, and a break return address register 455 constitutes the second information holding section of the present invention.

In this embodiment as well, the interrupt return instruction is prepared at the end of each of an interrupt handler for a normal interrupt and an interrupt handler for a break-interrupt. The instruction code 101 of an interrupt return instruction for a normal interrupt is constructed by a return instruction from a normal interrupt, and the instruction code 101 of an interrupt return instruction for a break-interrupt is constructed by a return instruction from a break-interrupt. The two types of interrupt return instructions constitute the return operation specifying section of the present invention.

The operation of the interrupt control apparatus of this embodiment will be described next by exemplifying the processor state transition shown in FIG. 7: normal state 201→normal interrupt state 202→break-interrupt state 204→normal interrupt state 202→normal state 201.

In this embodiment, when the processor transits to an interrupt state due to a normal interrupt or break-interrupt, the same operation as that of the interrupt control apparatus shown in FIG. 12 is performed.

Hence, only the return operation from a normal interrupt state and break-interrupt state, i.e., state transition: break-interrupt state 204→normal interrupt state 202→normal state 201 will be described below.

When the processor is in the break-interrupt state 204, and processing by an interrupt handler corresponding to the break-interrupt is ended, the processor executes an interrupt return instruction 216 at the end of the interrupt handler. The instruction code 101 of the interrupt return instruction executed at this time means an interrupt return instruction from the break-interrupt state. For this reason, the instruction word decoder 4311 decodes the interrupt return instruction and consequently supplies a break-interrupt return instruction to the break-interrupt return controller 436. When receiving the break-interrupt return instruction, the break-interrupt return controller 436 controls the instruction fetch section 420 and the register section 450 to perform processing as follows.

First, the break-interrupt return controller 436 reads out, from the break return address register 455, an original instruction address 475 to which the processor will return from the break-interrupt state, supplies the instruction address to the instruction fetch section 420, and sets the address value in a program counter 422.

On the basis of an original instruction address 471 set in the program counter 422, an instruction fetch controller 421 reads out an instruction word 472 of the interrupt handler corresponding to the normal interrupt from a memory 410, temporarily holds the instruction word in an instruction word register 423, and then supplies the instruction word to an instruction execution section 430. Thus, the processor returns from the break-interrupt state 204 to the normal interrupt state 202. The instruction execution section 430 executes the remaining part of processing of the interrupt handler corresponding to the normal interrupt.

When processing of the interrupt handler corresponding to the normal interrupt is ended in the normal interrupt state 202, the processor executes an interrupt return instruction 212 at the end of the interrupt handler. The instruction code 101 of the interrupt return instruction executed at this time means an interrupt return instruction from the normal interrupt state. For this reason, the instruction word decoder 431' decodes the interrupt return instruction and consequently supplies a normal interrupt return instruction to the normal interrupt return controller 435.

When receiving the normal interrupt return instruction, the normal interrupt return controller 435 controls the instruction fetch section 420 and register section 450 to start the normal interrupt return operation. For this normal interrupt return operation, the same operation as that of the interrupt control apparatus shown in FIG. 12 is performed, and the normal interrupt state 202 transits to the normal state 201.

As described above, in the ninth embodiment, a normal interrupt return instruction whose instruction code 101 means a return instruction from a normal interrupt state is prepared at the end of an interrupt handler corresponding to a normal interrupt, and a break-interrupt return instruction whose instruction code 101 means a return instruction from a break-interrupt state is prepared at the end of an interrupt handler corresponding to a break-interrupt. In returning from an interrupt, the return operation is specified in accordance with the contents of the instruction code 101.

According to this construction, even within the interrupt inhibition period immediately after interrupt processing by a normal interrupt and immediately before interrupt return, a break-interrupt can occur. In addition, the processor operation information before the interrupt can be restored with a minimum hardware resource. Furthermore, using two types of instructions: a return instruction from a normal interrupt state and a return instruction from a break-interrupt state, a return instruction for an interrupt can be executed, the calculation time can be shortened, and even when a break-interrupt occurs in a normal interrupt state, the processor operation information before the break-interrupt can be quickly and accurately restored.

In the ninth embodiment, only the break return address register 455 is provided as the second information holding section of the present invention. However, not only the break return address register 455 but also one or both of a break previous state register 458 and a break factor register 459 may be provided, like in the sixth to eighth embodiments shown in FIGS. 14 to 16.

In this case, when the processor transits to an interrupt state due to a normal interrupt or break-interrupt, the same operation as that of the interrupt control apparatuses shown in FIGS. 14 to 16 is performed. As for the return operation from the interrupt state, the return operation from a normal interrupt state is executed by the normal interrupt return controller 435, and the return operation from a break-interrupt state is executed by the break-interrupt return controller 436. Control of the registers is the same as that in the interrupt control apparatuses shown in FIGS. 14 to 16.

The above embodiments can be applied to debug an interrupt handler corresponding to exceptional processing or external interrupt, and also to debug an interrupt handler corresponding to system call or supervisor call of an OS (Operating System).

10th Embodiment

The 10th embodiment of the present invention will be described below with reference to drawings.

Figure 18:
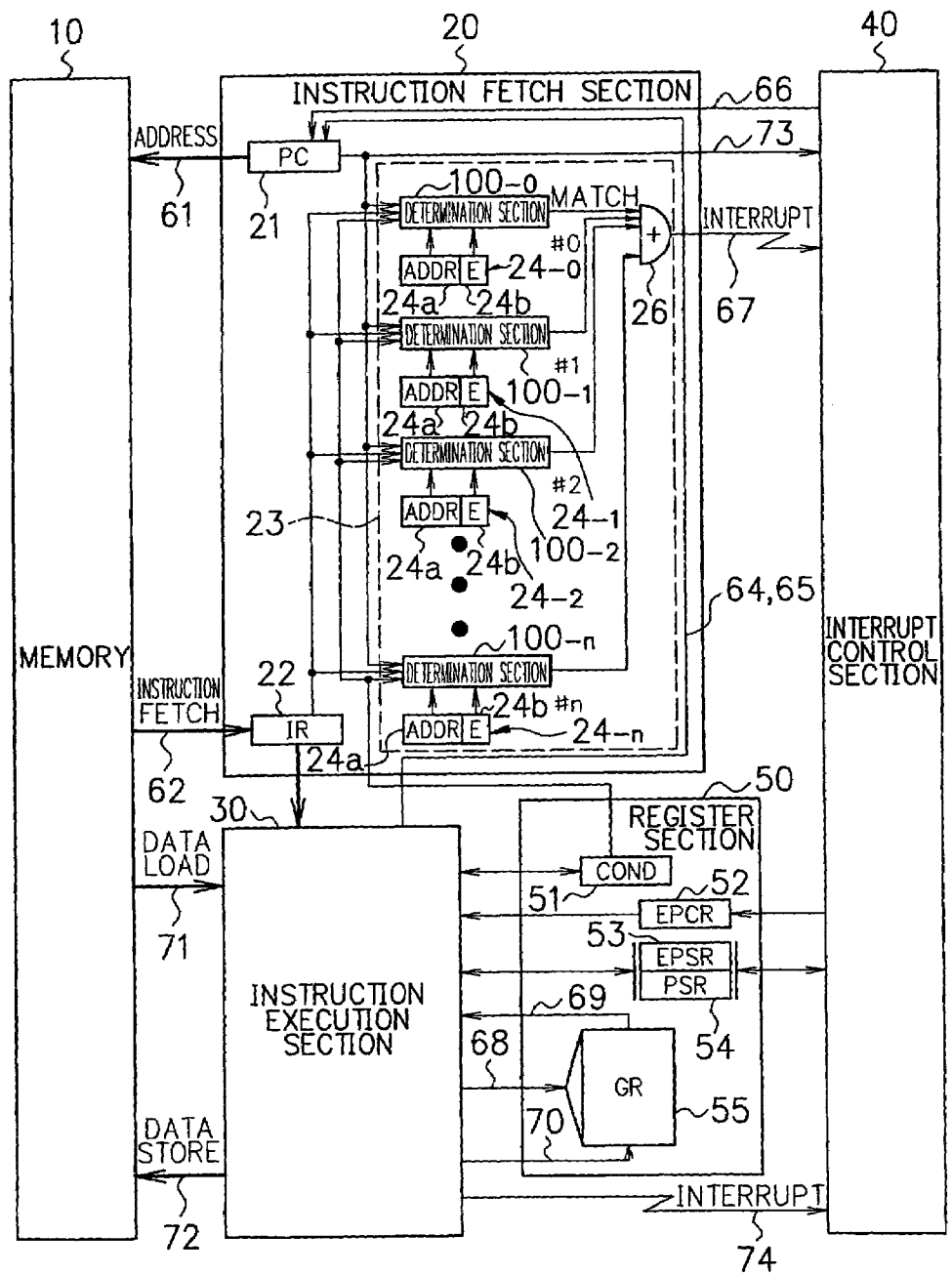
FIG. 18 is a block diagram showing the construction of a data processing system (processor) according to the 10th embodiment of the present invention for implementing an instruction break scheme by a hardware mechanism.

FIG. 18 is a block diagram showing the construction of a data processing system (processor) according to the 10th embodiment for implementing an instruction break scheme by a hardware mechanism.

Figure 1:
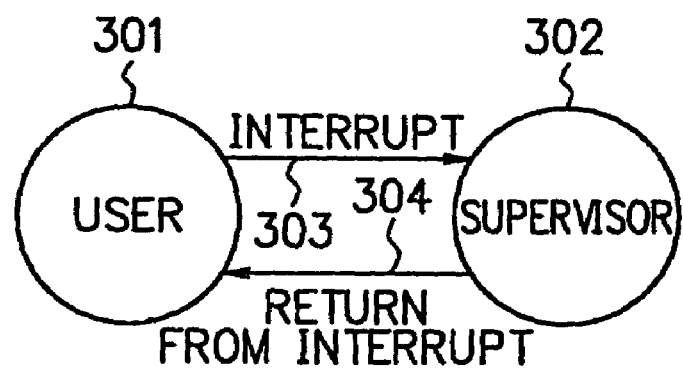
FIG. 1 is a representation showing an example of state transition of a processor in a conventional interrupt control apparatus.
Figure 2:
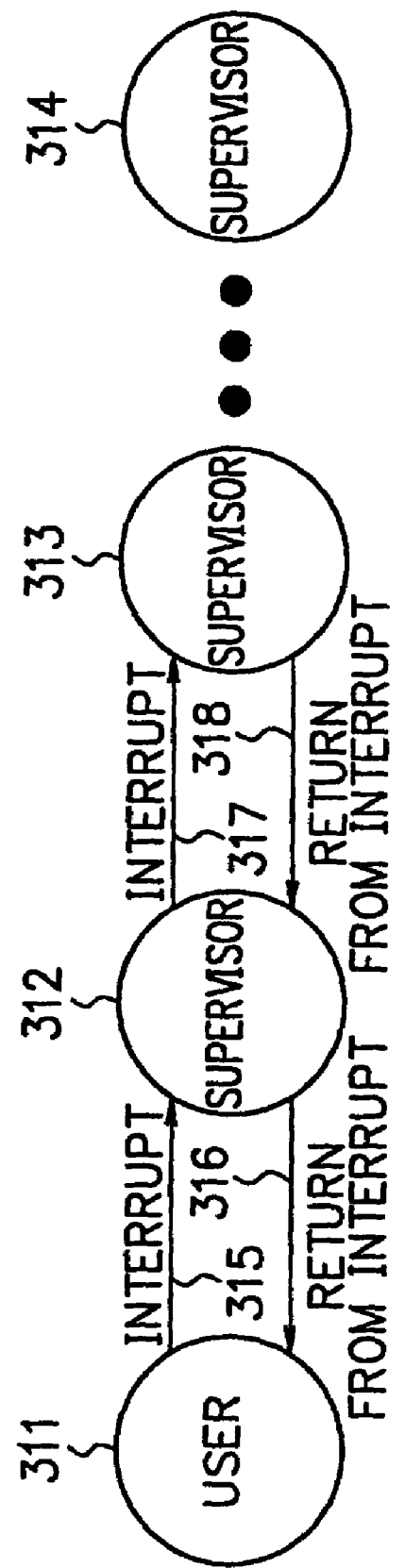
FIG. 2 is a representation showing another example of state transition of the processor in the conventional interrupt control apparatus.
Figure 3:
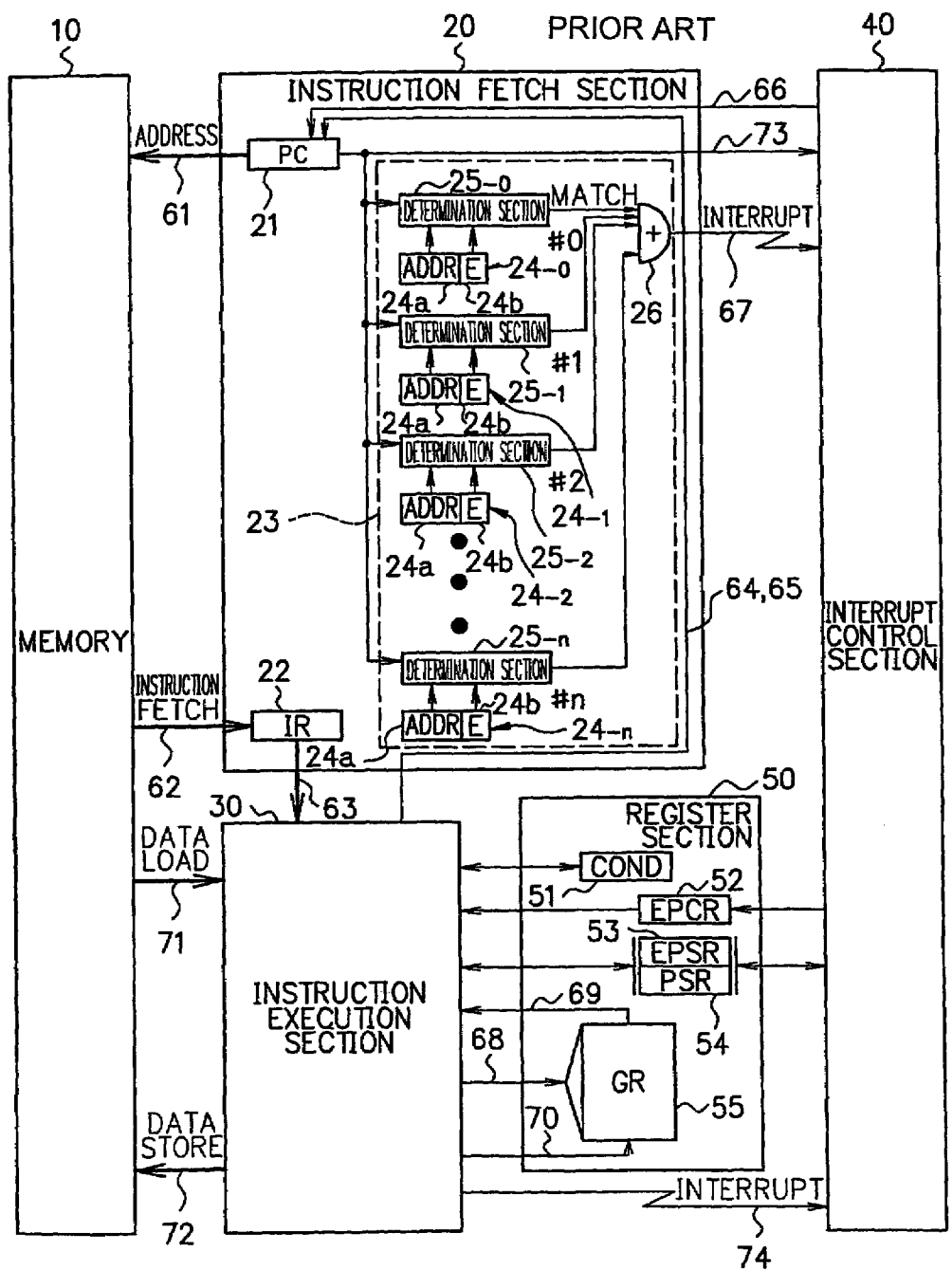
FIG. 3 is a block diagram showing the construction of a processor for implementing the conventional instruction break scheme.

In FIG. 18, the same reference numerals as in FIG. 3 denote the same functional parts as in FIG. 3, respectively, and a detailed description thereof will be omitted.

In the 10th embodiment, an instruction break detection section 23 has, in place of the determination sections $25_{-0}$ to $25_{-n}$, used in FIG. 3, determination sections $100_{-0}$ to $100_{-n}$ for performing determination processing different from that of the determination sections $25_{-0}$, to $25_{-n}$.

These determination sections $100_{-0}$ to $100_{-n}$ receive not only instruction break addresses and flags held in breakpoint registers $24_{-0}$ to $24_{-n}$ prepared in units of determination sections $100_{-0}$ to $100_{-n}$ and current execution address supplied from a program counter 21 but also the condition code of a conditional instruction, which is read out from a condition register 51 in a register section 50, and an instruction word that is read out from an instruction register 22 and currently being executed.

Figure 19:
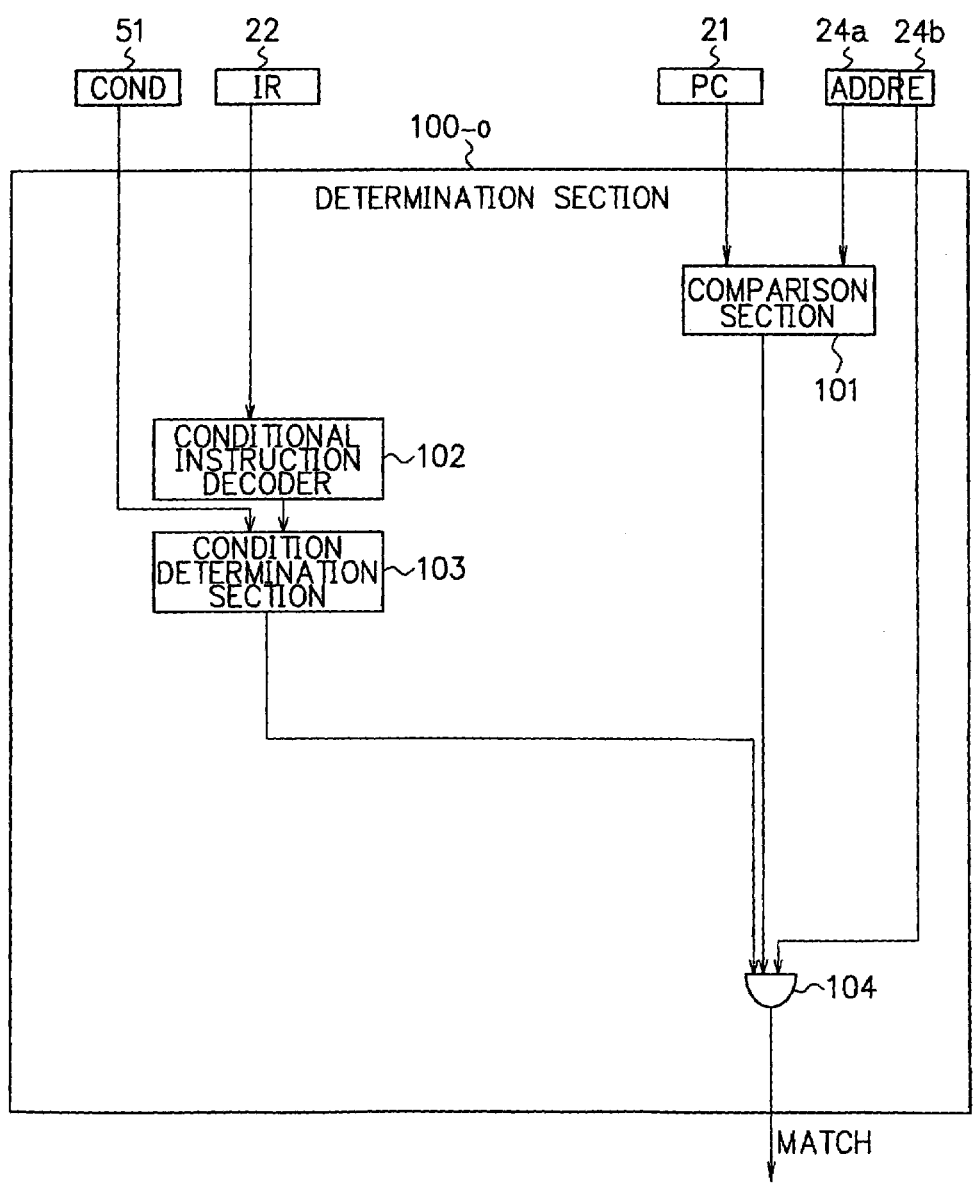
FIG. 19 is a block diagram showing the construction of a determination section according to the 10th embodiment.

FIG. 19 is a block diagram showing the construction of the determination section $100_{-0}$ as a representative of the determination sections $100_{-0}$ to $100_{-n}$. Each of the remaining determination sections $100_{-1}$ to $100_{-n}$ has the same construction as in FIG. 19.

As shown in FIG. 19, the determination section 1000 of this embodiment comprises a comparison section 101, a conditional instruction decoder 102, a condition determination section 103, and an AND circuit 104.

The comparison section 101 compares an instruction break address held in an address register 24a of the breakpoint register $24_{-0}$ provided in accordance with the determination section $100_{-0}$ with a current execution address supplied from the program counter 21 and determines whether the two addresses match. When the two addresses match, the comparison section 101 outputs a determination signal having the value "1". When the two addresses do not match, the comparison section 101 outputs a determination signal having the value "0".

The conditional instruction decoder 102 decodes the instruction word that is supplied from the instruction register 22 and currently being executed to detect whether the instruction is a conditional instruction, and supplies the detection result to the condition determination section 103. On the basis of the decoding result of the instruction word, which is supplied from the conditional instruction decoder 102, the condition determination section 103 determines whether the condition designated by the condition code of the conditional instruction, which is supplied from the condition register 51, is satisfied. If the condition designated by the condition code of the conditional instruction is satisfied, a determination signal having the value "1" is output. If the condition is not satisfied, a determination signal having the value "0" is output. If it is found by decoding by the conditional instruction decoder 102 that the supplied instruction is not a conditional instruction, the condition determination section 103 outputs a determination signal having the value "0".

The AND circuit 104 performs AND operation to the value of a flag register 24b of the breakpoint register $24_{-0}$ provided in accordance with the determination section $100_{-0}$, the determination signal output from the comparison section 101 and related to the instruction break address, and the determination signal output from the condition determination section 103 and related to the condition code, and outputs the AND operation result to an OR circuit 26 shown in FIG. 18.

According to this construction, in at least one entry of the determination sections $100_{-0}$ to $100_{-n}$ of the instruction break detection section 23, when the instruction break address and the current execution address match, the value of the flag register 24b is "1", and the condition of the conditional instruction is satisfied, the OR circuit 26 outputs an interrupt notification signal 67 to an interrupt control section 40.

As described above, in the 10th embodiment, each of the determination sections $100_{-0}$ to $100_{-n}$ determines not only whether the instruction break generation condition for the instruction break address and the flag value is satisfied but also whether the condition of the conditional instruction is satisfied. Only when both conditions are satisfied, a break-interrupt occurs.

Thus, in debugging a program including a conditional instruction, a break-interrupt can be controlled in accordance with whether the condition of the conditional instruction is satisfied. More specifically, in a situation where the instruction break generation condition is satisfied, when the condition of the conditional instruction is satisfied, a break-interrupt occurs. When the condition of the conditional instruction is not satisfied, or the supplied instruction is an unconditional instruction, a break-interrupt can be inhibited.

11th Embodiment

The 11th embodiment of the present invention will be described next with reference to drawings.

FIG. 20 is a block diagram showing the construction of a data processing system (processor) according to the 11th embodiment for implementing an instruction break scheme by a hardware mechanism.

In FIG. 20, the same reference numerals as in FIG. 18 denote the same functional parts as in FIG. 18, respectively, and a detailed description thereof will be omitted.

In the 10th embodiment shown in FIG. 18, a scalar processor for executing one unit of processing in accordance with one instruction has been described. The 11th embodiment shown in FIG. 20 is applied to a VLIW (Very Long Instruction Word) type processor which designates processing operations by one instruction and executes those operations in parallel.

More specifically, as shown in FIG. 20, an instruction register 27 of the 11th embodiment is designed to hold a fixed-length long instruction word formed from short instructions. Each of determination sections $100_{-0}$ to $100_{-n}$ of an instruction break detection section 23 has a construction shown in FIG. 21. FIG. 21 is a block diagram showing the construction of the determination section $100_{-0}$ as a representative of the determination sections $100_{-0}$ to $100_{-n}$. In FIG. 21, the same reference numerals as in FIG. 19 denote the same blocks as in FIG. 19, respectively, and a detailed description thereof will be omitted.

As shown in FIG. 21, the determination section $100_{-0}$ of this embodiment comprises a comparison section 101, a conditional instruction decoder 111, a condition determination section 112, an OR circuit 113, and an AND circuit 104.

The conditional instruction decoder 111 has conditional instruction decoders $111_{-0}$ and $111_{-i}$ provided in accordance with short instructions IR#0 to IR#i forming the long instruction word held in the instruction register 27 to decode each short instruction supplied from the instruction register 27 and detect whether the instruction is a conditional instruction.

The condition determination section 112 has condition determination sections $112_{-n}$, to $112_{-i}$ provided in accordance with the conditional instruction decoders $111_{-0}$ and $111_{-i}$, respectively. Each of the condition determination sections $112_{-0}$ to $112_{-i}$ determines, on the basis of the short instruction decoding result supplied from a corresponding one of the conditional instruction decoders $111_{-0}$ and $111_{-i}$, whether the condition designated by the condition code of the conditional instruction supplied from a condition register 51 is satisfied. If the condition of the conditional instruction is satisfied, a determination signal having the value "1" is output. If the condition is not satisfied, a determination signal having the value "0" is output. If it is found by decoding by the conditional instruction decoders $111_{-0}$ to $111_{-i}$ that the supplied instructions are not conditional instructions, the condition determination sections $112_{-0}$ to $112_{-i}$ output determination signals each having the value "0".

The OR circuit 113 performs OR operation to the determination signals output from the condition determination sections $112_{-0}$ to $112_{-i}$ and outputs the OR operation result to the AND circuit 104. The AND circuit 104 performs AND operation to the value of a flag register 24b of a breakpoint register $24_{-0}$ provided in accordance with the determination section $100_{-0}$, the determination signal output from the comparison section 101 and related to the instruction break address, and the determination signal output from the OR circuit 113 and related to the condition code, and outputs the AND operation result to an OR circuit 26 shown in FIG. 20.

According to this construction, in at least one entry of the determination sections $100_{-0}$ to $100_{-n}$, of the instruction break detection section 23, when the instruction break address and current execution address match, the value of the flag register 24b is "1", and the condition of the conditional instruction is satisfied for at least one of the short instructions forming the long instruction word, the OR circuit 26 outputs an interrupt notification signal 67 to an interrupt control section 40.

As described above, in the 11th embodiment, each of the determination sections $100_{-0}$ to $100_{-n}$ determines not only whether the instruction break generation condition for the instruction break address and the flag value is satisfied but also whether the condition of the conditional instruction is satisfied for each of the short instructions forming the long instruction word. Only when both conditions are satisfied, a break-interrupt occurs.

Thus, when the short instructions forming the long instruction word include a conditional instruction, a break-interrupt can be controlled in accordance with whether the condition of the conditional instruction is satisfied. More specifically, in a situation where the instruction break generation condition is satisfied, when the condition of the conditional instruction is satisfied for any one of the short instructions, a break-interrupt occurs. When the condition of the conditional instruction is not satisfied for none of the short instructions, or all the short instructions are unconditional instructions, a break-interrupt can be inhibited.

12th Embodiment

The 12th embodiment of the present invention will be described next with reference to drawings.

Figure 22:
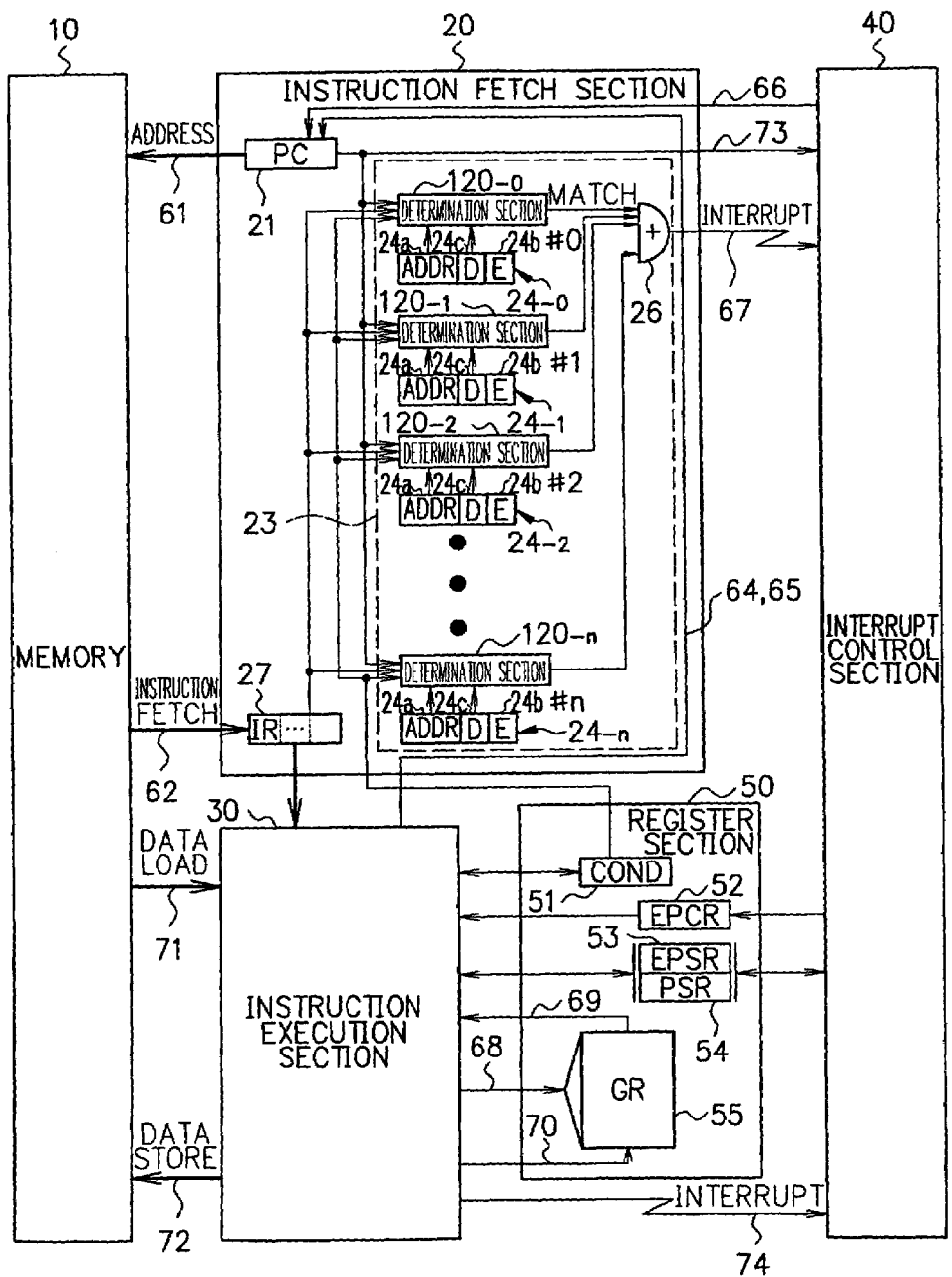
FIG. 22 is a block diagram showing the construction of a data processing system (processor) according to the 12th embodiment of the present invention for implementing an instruction break scheme by a hardware mechanism.

FIG. 22 is a block diagram showing the construction of a data processing system (processor) according to the 12th embodiment for implementing an instruction break scheme by a hardware mechanism.

The processor according to the 12th embodiment shown in FIG. 22 is also a VLIW type processor, like the processor according to the 11th embodiment shown in FIG. 20. In FIG. 22, the same reference numerals as in FIG. 20 denote the same blocks as in FIG. 20, respectively.

In the 12th embodiment shown in FIG. 22, each of breakpoint registers $24_{-0}$ to $24_{-n}$ of an instruction break detection section 23 has a displacement register 24c for holding displacement information from the start portion of a long instruction word as a breakpoint target, in addition to an address register 24a for holding the target address of a breakpoint at which execution is to be stopped and a flag register 24b indicating whether an instruction break operation is valid. The displacement information held in the displacement register 24c is used together with the instruction break address held in the address register 24a, thereby specifying one of short instructions forming one long instruction word.

Figure 23:
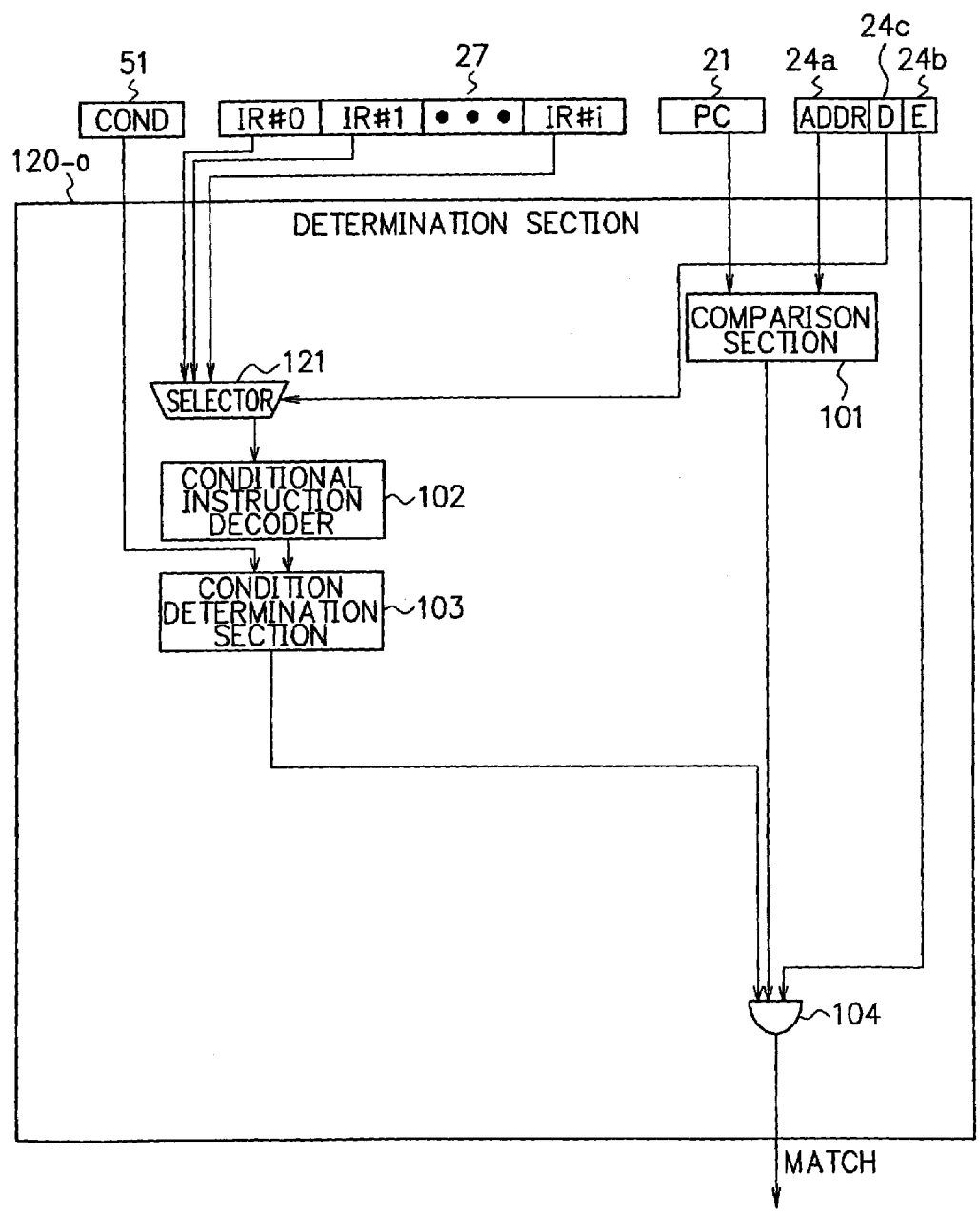
FIG. 23 is a block diagram showing the construction of a determination section according to the 12th embodiment.

Each of determination sections $120_{-0}$ to $120_{-n}$ according to the 12th embodiment has a construction shown in FIG. 23. FIG. 23 is a block diagram showing the construction of the determination section $120_{-0}$ as a representative of the determination sections $120_{-0}$ to $120_{-n}$. In FIG. 23, the same reference numerals as in FIGS. 19 and 21 denote the same blocks as in FIGS. 19 and 21, respectively, and a detailed description thereof will be omitted.

As shown in FIG. 23, the determination section $120_{-0}$ of this embodiment comprises a comparison section 101, a conditional instruction decoder 102, a condition determination section 103, an AND circuit 104, and a selector 121.

The selector 121 switches the selection state using, as a control signal, displacement information held in the displacement register 24c of the breakpoint register $24_{-0}$ provided in accordance with the determination section $120_{-0}$ whereby only a short instruction designated by the displacement information from short instructions IR#0 to IR#i is selectively output to the conditional instruction decoder 102. The conditional instruction decoder 102 decodes the short instruction selected by the selector 121 to detect whether the instruction is a conditional instruction, and supplies the decoding result to the condition determination section 103.

According to this construction, in at least one entry of the determination sections $120_{-0}$ to $120_{-n}$ of the instruction break detection section 23, when the instruction break address and current execution address match, the value of the flag register 24b is "1", and the condition of the conditional instruction is satisfied for a selected instruction of the short instructions forming the long instruction word, an OR circuit 26 outputs an interrupt notification signal 67 to an interrupt control section 40.

As described above, in the 12th embodiment, each of the determination sections $120_{-0}$ to $120_{-n}$ determines not only whether the instruction break generation condition for the instruction break address and the flag value is satisfied but also whether the condition of the conditional instruction specified by the displacement information is satisfied for each of the short instructions forming the long instruction word. Only when both conditions are satisfied, a break-interrupt occurs.

Thus, when a specific instruction selected by the displacement information from the short instructions forming the long instruction word is a conditional instruction, a break-interrupt can be controlled in accordance with whether the condition of the conditional instruction is satisfied. More specifically, in a situation where the instruction break generation condition is satisfied, when the condition of the specified conditional instruction is satisfied, a break-interrupt occurs. When the condition of the specified conditional instruction is not satisfied, or the specified short instruction is an unconditional instruction, a break-interrupt can be inhibited.

13th Embodiment

The 13th embodiment of the present invention will be described next with reference to drawings.

Figure 24:
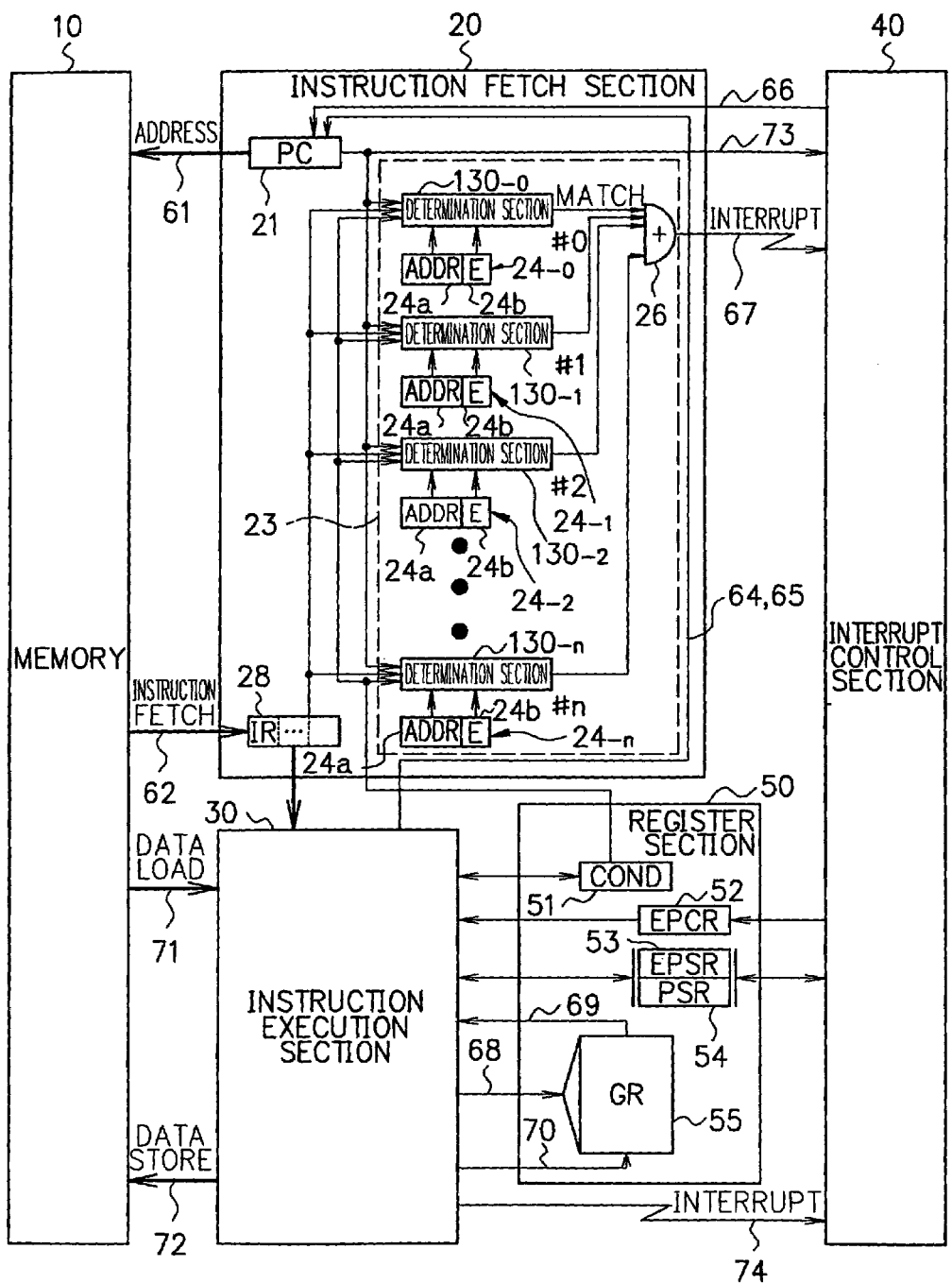
FIG. 24 is a block diagram showing the construction of a data processing system (processor) according to the 13th embodiment of the present invention for implementing an instruction break scheme by a hardware mechanism.

FIG. 24 is a block diagram showing the construction of a data processing system (processor) according to the 13th embodiment for implementing an instruction break scheme by a hardware mechanism.

In FIG. 24, the same reference numerals as in FIGS. 18 and 20 denote the same functional parts as in FIGS. 18 and 20, respectively, and a detailed description thereof will be omitted.

In the 10th embodiment shown in FIG. 18, a scalar processor for executing one unit of processing in accordance with one instruction has been described. In the 11th embodiment shown in FIG. 20, a VLIW type processor which parallelly executes short instructions forming a fixed-length long instruction word has been described. The 13th embodiment shown in FIG. 24 is applied to a parallel processor for executing one basic instruction or, in parallel, basic instructions forming a variable-length instruction word.

More specifically, as shown in FIG. 24, an instruction register 28 of the 13th embodiment is designed to hold a variable-length instruction word formed from one or more basic instructions. Each of determination sections $130_{-0}$ to $130_{-n}$ of an instruction break detection section 23 has a construction shown in FIG. 25. FIG. 25 is a block diagram showing the construction of the determination section $130_{-0}$ as a representative of the determination sections $130_{-0}$ to $130_{-n}$.

As shown in FIG. 25, the determination section $130_{-0}$ of this embodiment comprises a comparison section 101, a valid instruction encoder 131, a conditional instruction decoder 111, a condition determination section 112, an AND circuit 132, an OR circuit 113, and another AND circuit 104. In FIG. 25, the same reference numerals as in FIG. 21 denote the same functional parts as in FIG. 21, respectively, and a detailed description thereof will be omitted.

In the VLIW type processor shown in FIG. 21, one long instruction word has a fixed length, and the number of short instructions forming it is constant. Hence, the instruction register 27 always stores i short instructions IR#0 to IR#i (an unexecuted instruction such as "nop" is stored at an unused portion).

To the contrary, in the parallel processor according to the 13th embodiment shown in FIG. 25, the instruction word stored in the instruction register 28 has a variable length, and the number of basic instructions forming it is variable. Hence, the instruction register 28 stores an arbitrary number of basic instructions and j basic instructions at maximum from the left side (sequentially from IR#0 side). In this case, each basic instruction has, at its head portion, a one-bit flag representing whether the basic instruction is at the end of a variable-length instruction word.

The valid instruction encoder 131 encodes the basic instructions stored in the instruction register 28 and refers to the flag information described at the head portion of each basic instruction, thereby detecting the number of valid basic instructions stored in the instruction register 28. An encoded signal having the value "1" is output sequentially from the IR#0 side in number equal to the number of basic instructions stored in the instruction register 28, and an encoded signal having the value "0" is output for the remaining portions.

The AND circuit 132 includes AND circuits $132_{-0}$ to $132_{-i}$ provided in accordance with determination sections $112_{-0}$ to $112_{-i}$, respectively. Each of the AND circuits $132_{-0}$ to $132_{-i}$ performs AND operation to a determination signal representing whether the condition of a conditional instruction obtained by a corresponding one of the determination sections $112_{-0}$ to $112_{-i}$ and an encoded signal output from the valid instruction encoder 131 in accordance with each of the basic instructions IR#0 to IR#i in the instruction register 28, and outputs the AND operation result to the OR circuit 113.

The OR circuit 113 performs OR operation to the signals output from the condition determination sections $132_{-0}$ to $132_{-i}$ and outputs the OR operation result to the AND circuit 104. The AND circuit 104 performs AND operation to the value of a flag register 24b of a breakpoint register $24_{-0}$ provided in accordance with the determination section $130_{-0}$, the determination signal output from the comparison section 101 and related to the instruction break address, and the determination signal output from the OR circuit 113 and related to the condition code, and outputs the AND operation result to an OR circuit 26 shown in FIG. 24.

According to this construction, in at least one entry of the determination sections $130_{-0}$ to $130_{-n}$ of the instruction break detection section 23, when the instruction break address and current execution address match, the value of the flag register 24b is "1", and the condition of the conditional instruction is satisfied for at least one of the basic instructions forming the variable-length instruction word, the OR circuit 26 outputs an interrupt notification signal 67 to an interrupt control section 40.

As described above, in the 13th embodiment, each of the determination sections $130_{-0}$ to $130_{-n}$ determines not only whether the instruction break generation condition for the instruction break address and the flag value is satisfied but also whether the condition of the conditional instruction is satisfied for each of the basic instructions forming the variable-length instruction word. Only when both conditions are satisfied, a break-interrupt occurs.

Thus, when the basic instructions forming the variable-length instruction word include a conditional instruction, a break-interrupt can be controlled in accordance with whether the condition of the conditional instruction is satisfied. More specifically, in a situation where the instruction break generation condition is satisfied, when the condition of the conditional instruction is satisfied for any one of the basic instructions, a break-interrupt occurs. When the condition of the conditional instruction is not satisfied for none of the basic instructions, or all the basic instructions are unconditional instructions, a break-interrupt can be inhibited.

14th Embodiment

The 14th embodiment of the present invention will be described next with reference to drawings.

Figure 26:
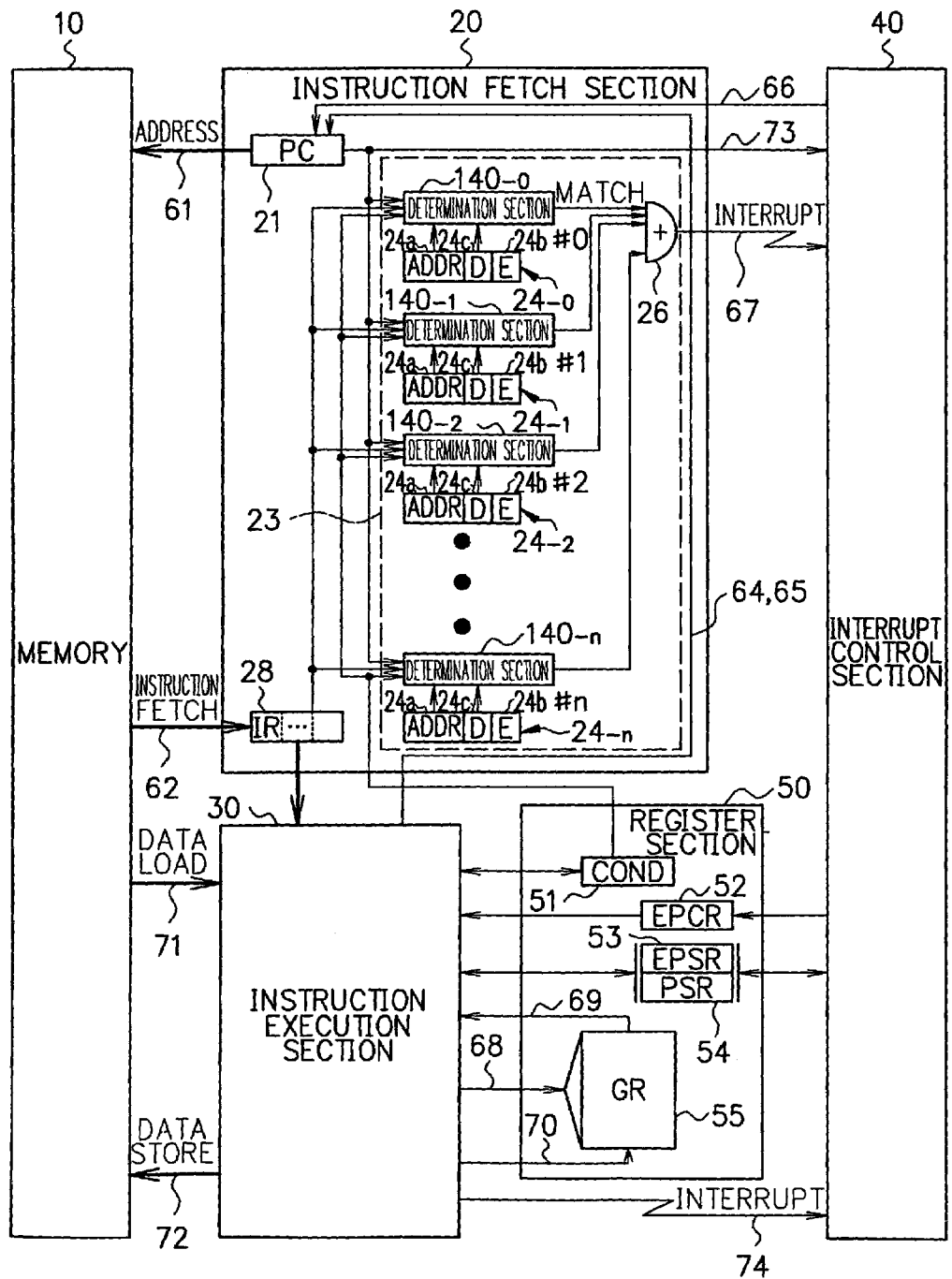
FIG. 26 is a block diagram showing the construction of a data processing system (processor) according to the 14th embodiment of the present invention for implementing an instruction break scheme by a hardware mechanism.

FIG. 26 is a block diagram showing the construction of a data processing system (processor) according to the 14th embodiment for implementing an instruction break scheme by a hardware mechanism.

The processor according to the 14th embodiment shown in FIG. 26 is also a parallel processor, like the processor according to the 13th embodiment shown in FIG. 24. In FIG. 26, the same reference numerals as in FIG. 24 denote the same blocks as in FIG. 24, respectively.

In the 14th embodiment shown in FIG. 26, each of breakpoint registers $24_{-0}$ to $24_{-n}$ of an instruction break detection section 23 has an address register 24a, a flag register 24b, and a displacement register 24c, like in the 12th embodiment shown in FIG. 22. Displacement information held in the displacement register 24c is used together with the instruction break address held in the address register 24a, thereby specifying one of basic instructions forming one variable-length instruction word.

Each of determination sections $140_{-0}$ to $140_{-n}$ according to the 14th embodiment has a construction shown in FIG. 27. FIG. 27 is a block diagram showing the construction of the determination section $140_{-0}$ as a representative of the determination sections $140_{-0}$ to $140_{-n}$. In FIG. 27, the same reference numerals as in FIGS. 23 and 25 denote the same blocks as in FIGS. 23 and 25, respectively, and a detailed description thereof will be omitted.

As shown in FIG. 27, the determination section $140_{-0}$ of this embodiment comprises a comparison section 101, a conditional instruction decoder 102, a condition determination section 103, an AND circuit 104, a first selector 121, a valid instruction encoder 131, a second selector 141, and another AND circuit 142.

The second selector 141 switches the selection state using, as a control signal, displacement information held in the displacement register 24c of the breakpoint register $24_{-0}$ provided in accordance with the determination section $140_{-0}$ whereby only an encoded signal designated by the displacement information from encoded signals output from the valid instruction encoder 131 in accordance with basic instructions IR#0 to IR#i in an instruction register 28 is selectively output to the AND circuit 142.

The AND circuit 142 performs AND operation to the condition determination signal obtained by the condition determination section 103 for the conditional instruction selected by the first selector 121 on the basis of the displacement information, and the encoded signal selected by the second selector 141 on the basis of the displacement information, and outputs the AND operation result to the AND circuit 104.

According to this construction, in at least one entry of the determination sections $140_{-0}$ to $140_{-n}$ of the instruction break detection section 23, when the instruction break address and current execution address match, the value of the flag register 24b is "1", and the condition of the conditional instruction is satisfied for a selected instruction of the basic instructions forming the variable-length instruction word, an OR circuit 26 outputs an interrupt notification signal 67 to an interrupt control section 40.

As described above, in the 14th embodiment, each of the determination sections $140_{-0}$ to $140_{-n}$ determines not only whether the instruction break generation condition for the instruction break address and flag value is satisfied but also whether the condition of the conditional instruction specified by the displacement information is satisfied for each of the basic instructions forming the variable-length instruction word of the parallel processor. Only when both conditions are satisfied, a break-interrupt occurs.

Thus, when an instruction selected by the displacement information from the basic instructions forming the variable-length instruction word is a conditional instruction, a break-interrupt can be controlled in accordance with whether the condition of the conditional instruction is satisfied. More specifically, in a situation where the instruction break generation condition is satisfied, when the condition of the specified conditional instruction is satisfied, a break-interrupt occurs. When the condition of the specified conditional instruction is not satisfied, or the specified basic instruction is an unconditional instruction, a break-interrupt can be inhibited.

15th Embodiment

The 15th embodiment of the present invention will be described next with reference to drawings.

Figure 28:
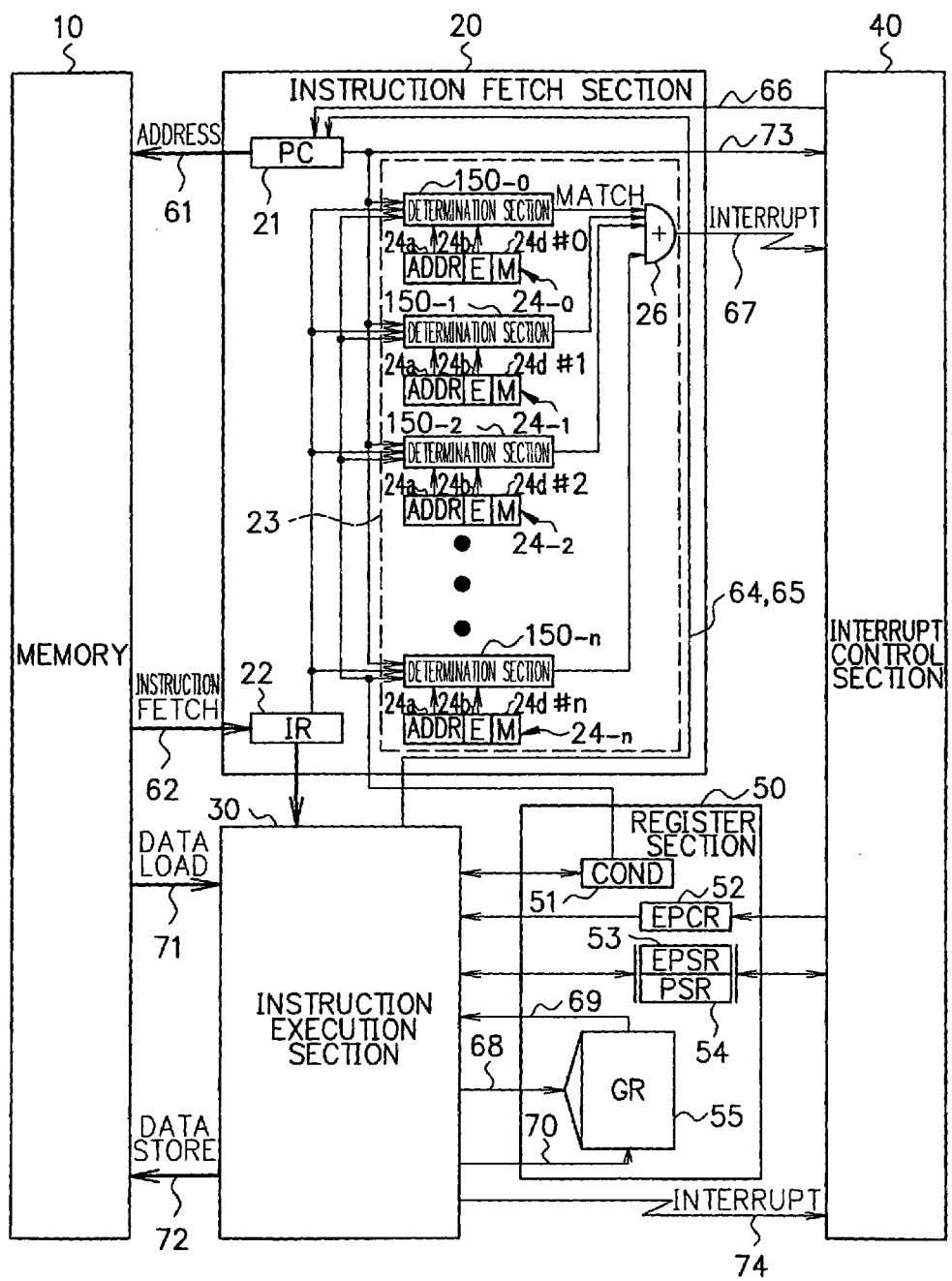
FIG. 28 is a block diagram showing the construction of a data processing system (processor) according to the 15th embodiment of the present invention for implementing an instruction break scheme by a hardware mechanism.
Figure 30:
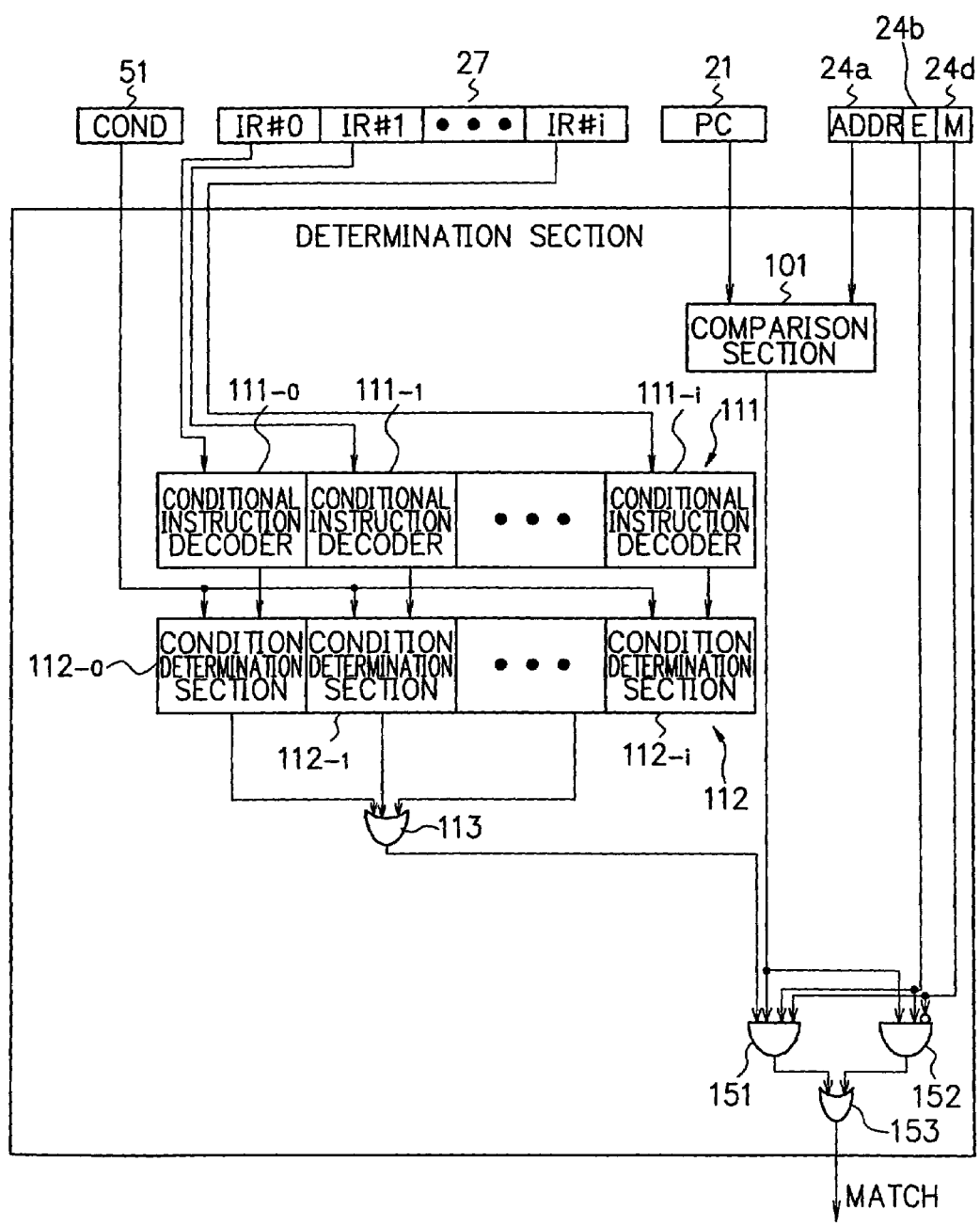
FIG. 30 is a block diagram showing the second construction of the determination section according to the 15th embodiment.
Figure 31:
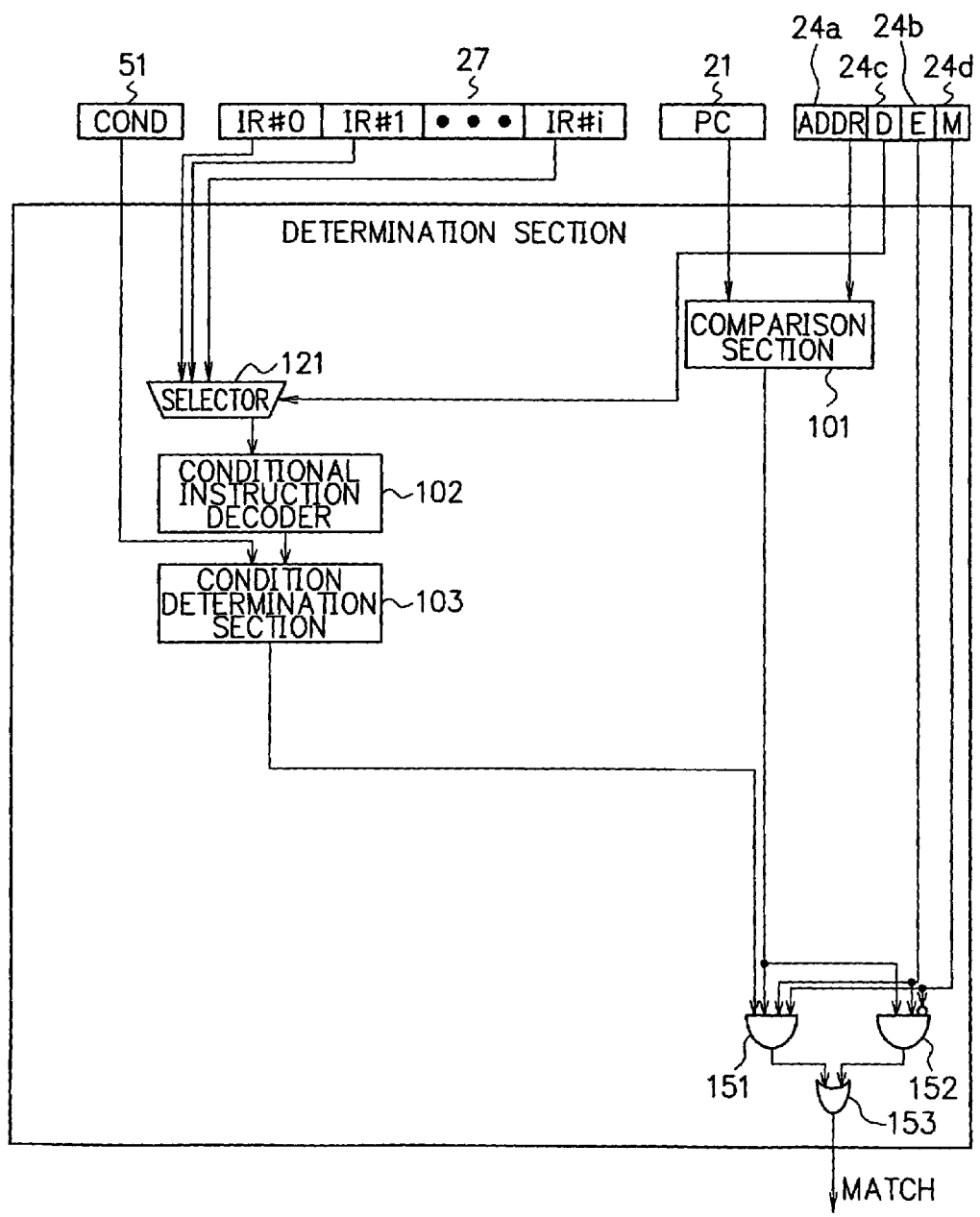
FIG. 31 is a block diagram showing the third construction of the determination section according to the 15th embodiment.
Figure 32:
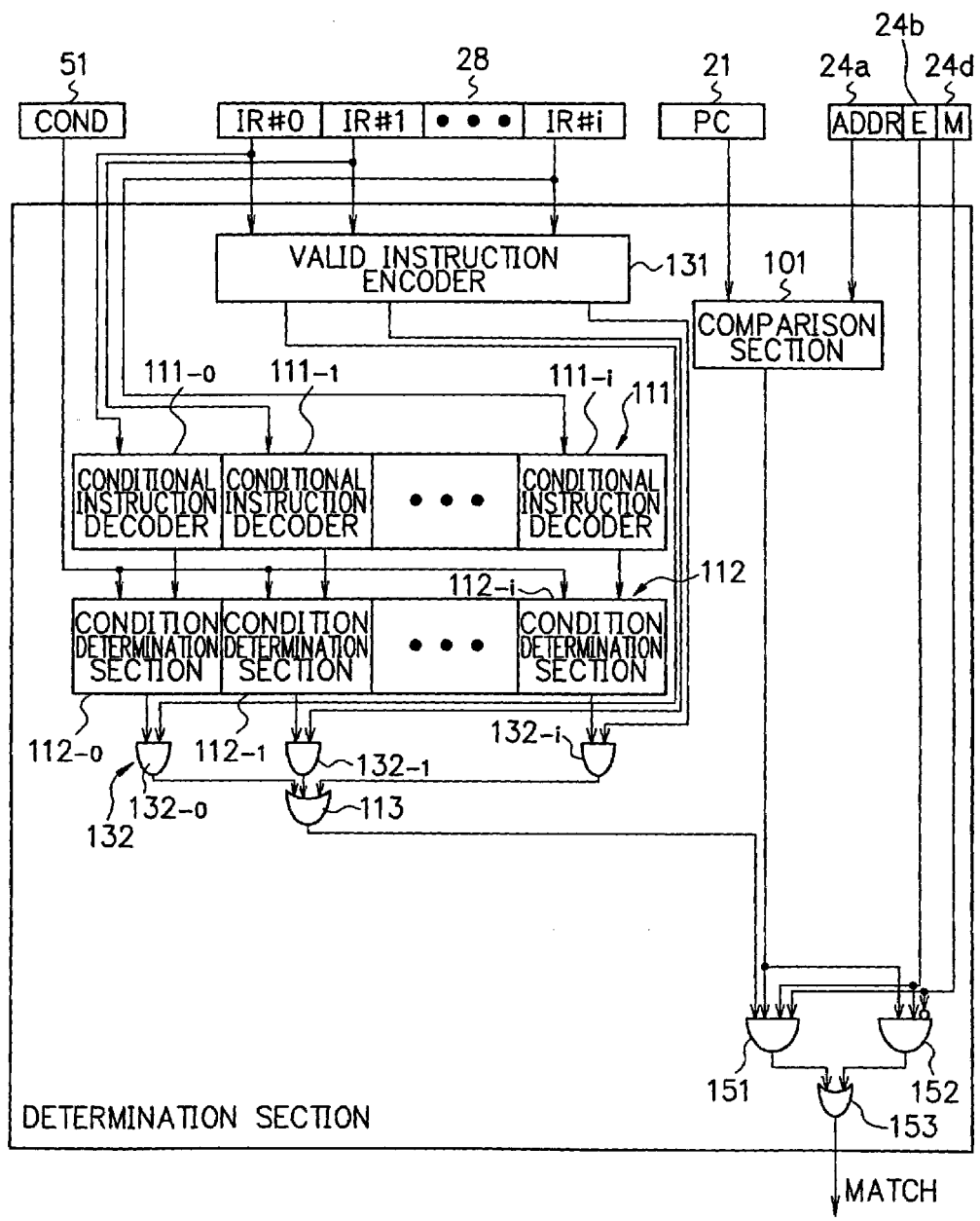
FIG. 32 is a block diagram showing the fourth construction of the determination section according to the 15th embodiment.
Figure 33:
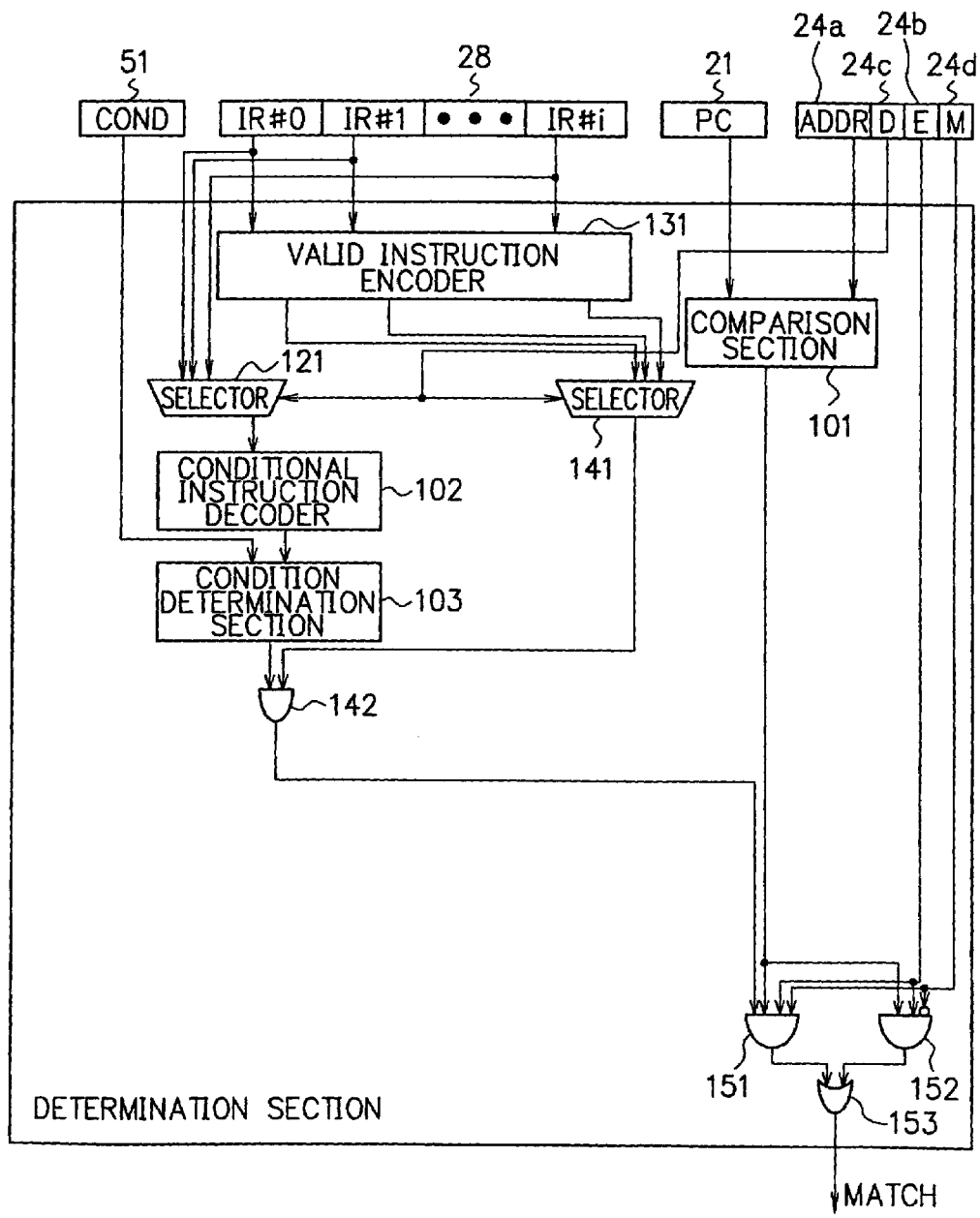
FIG. 33 is a block diagram showing the fifth construction of the determination section according to the 15th embodiment.
Figure 36:
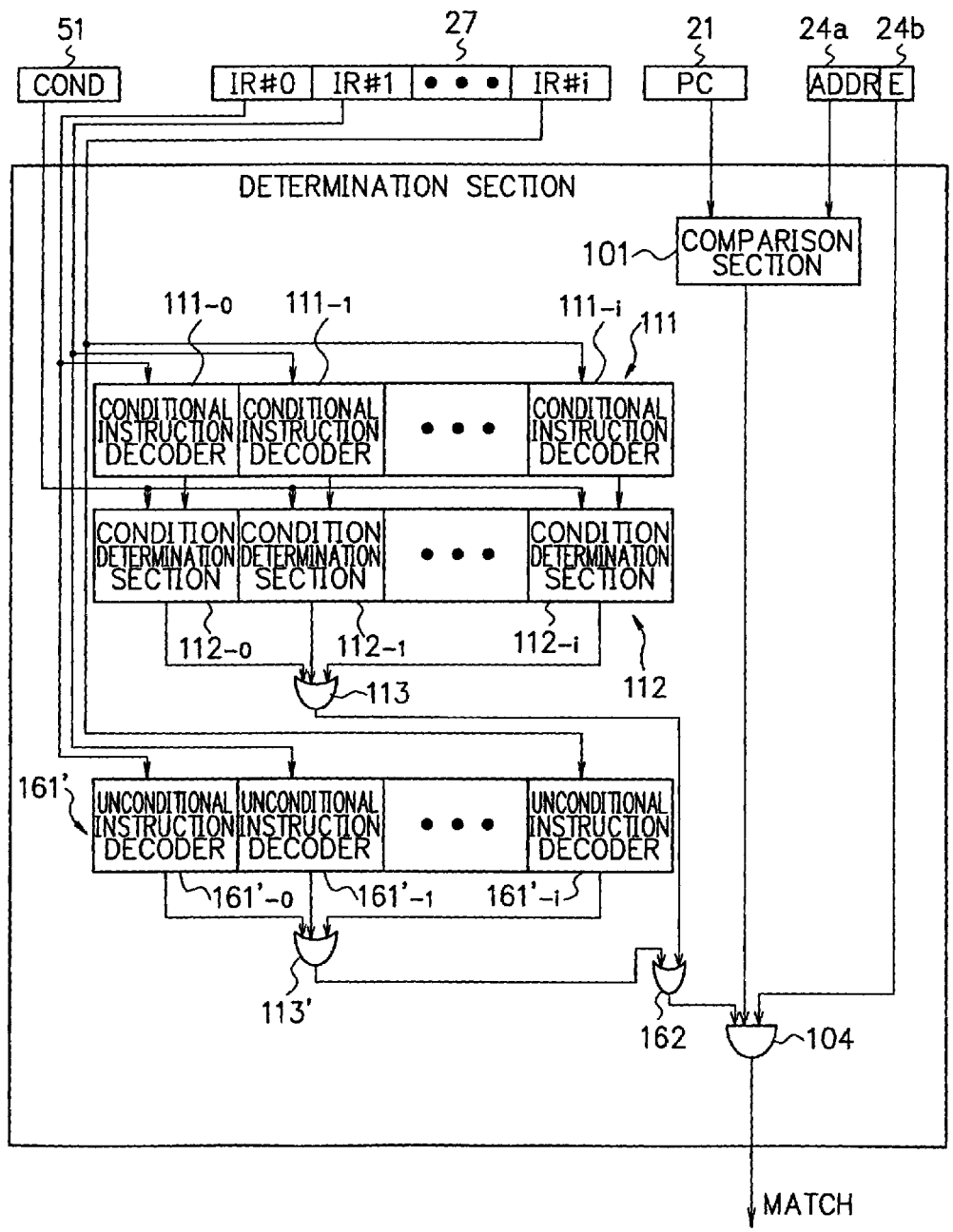
FIG. 36 is a block diagram showing the second construction of the determination section according to the 16th embodiment.
Figure 37:
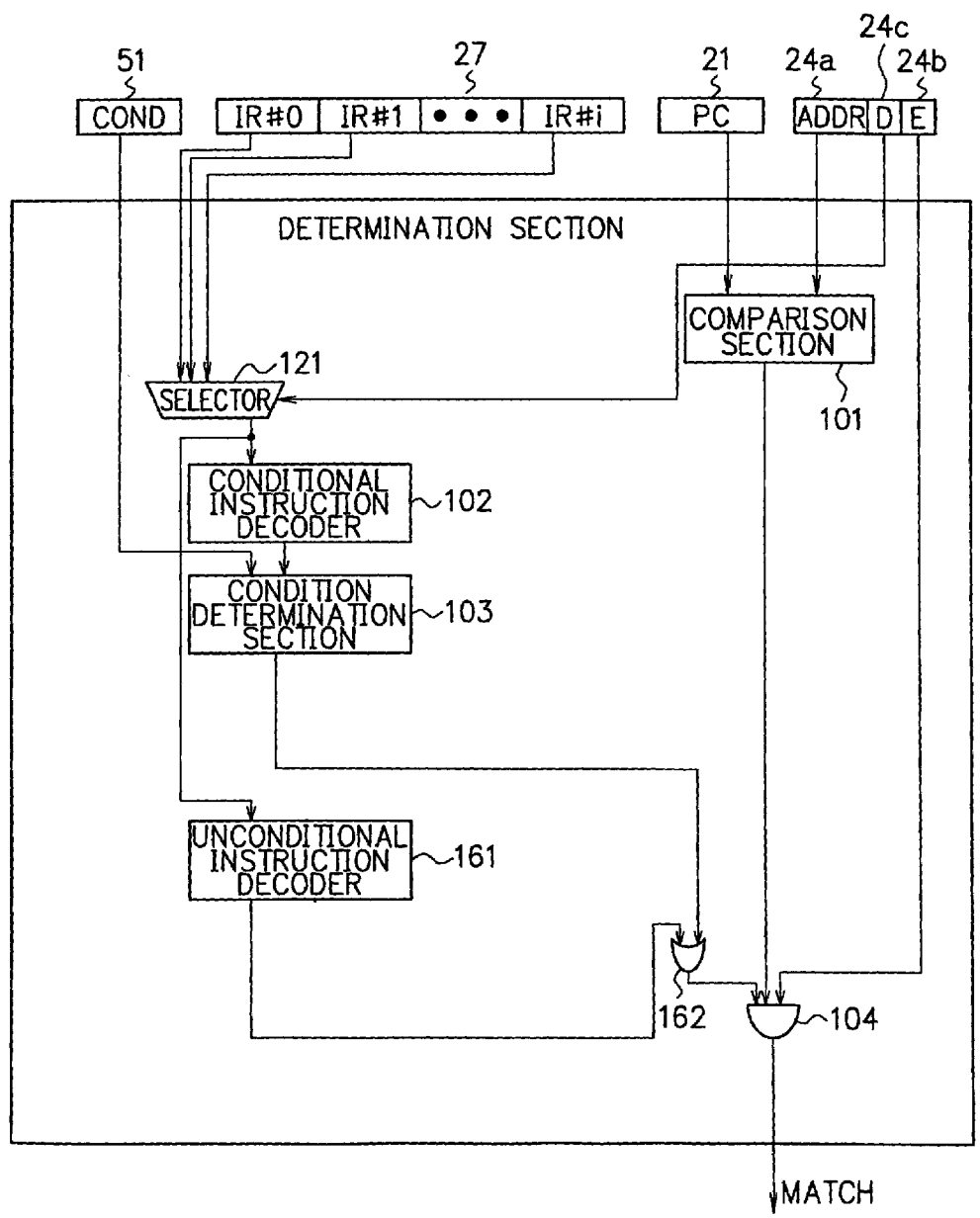
FIG. 37 is a block diagram showing the third construction of the determination section according to the 16th embodiment.
Figure 38:
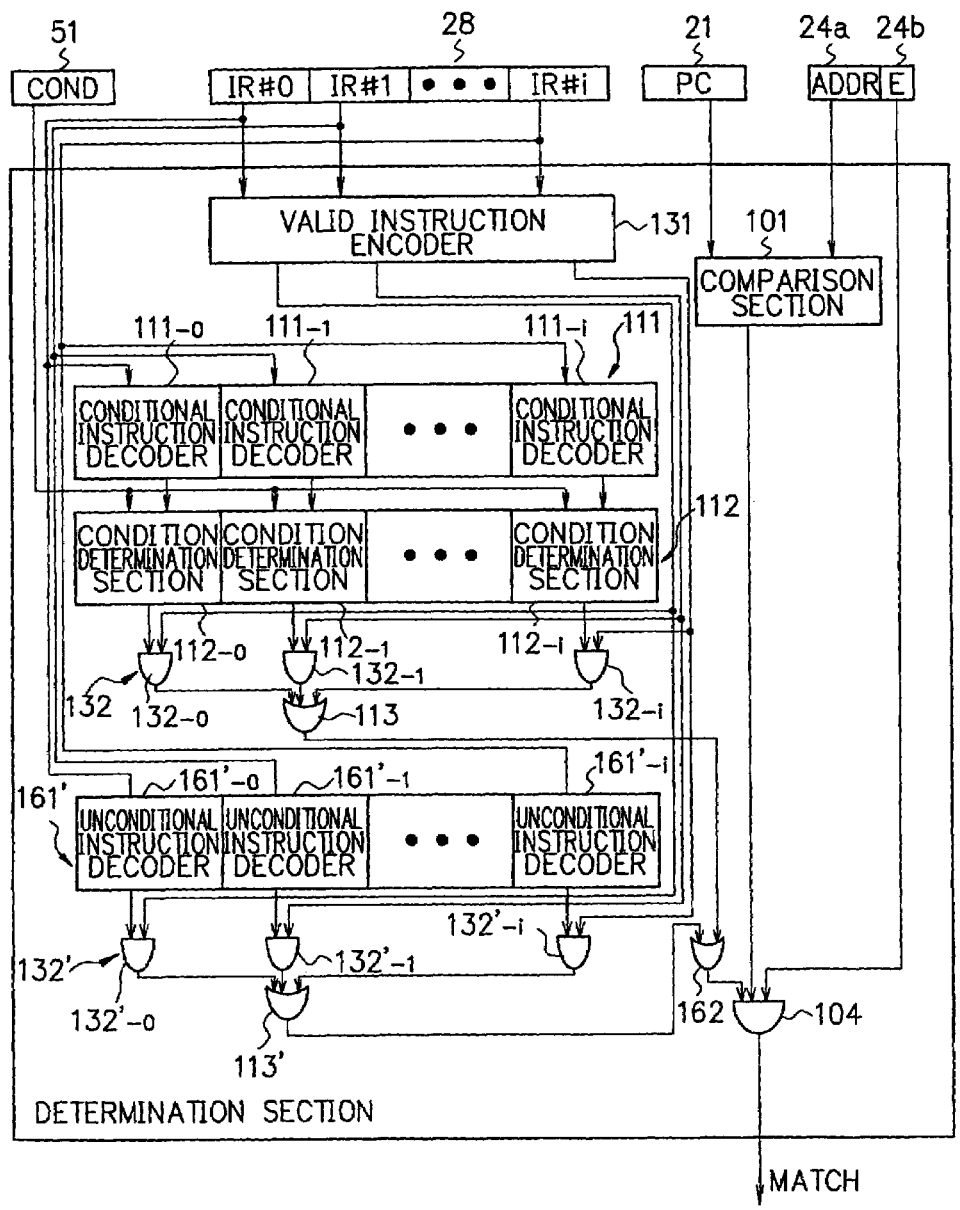
FIG. 38 is a block diagram showing the fourth construction of the determination section according to the 16th embodiment.
Figure 39:
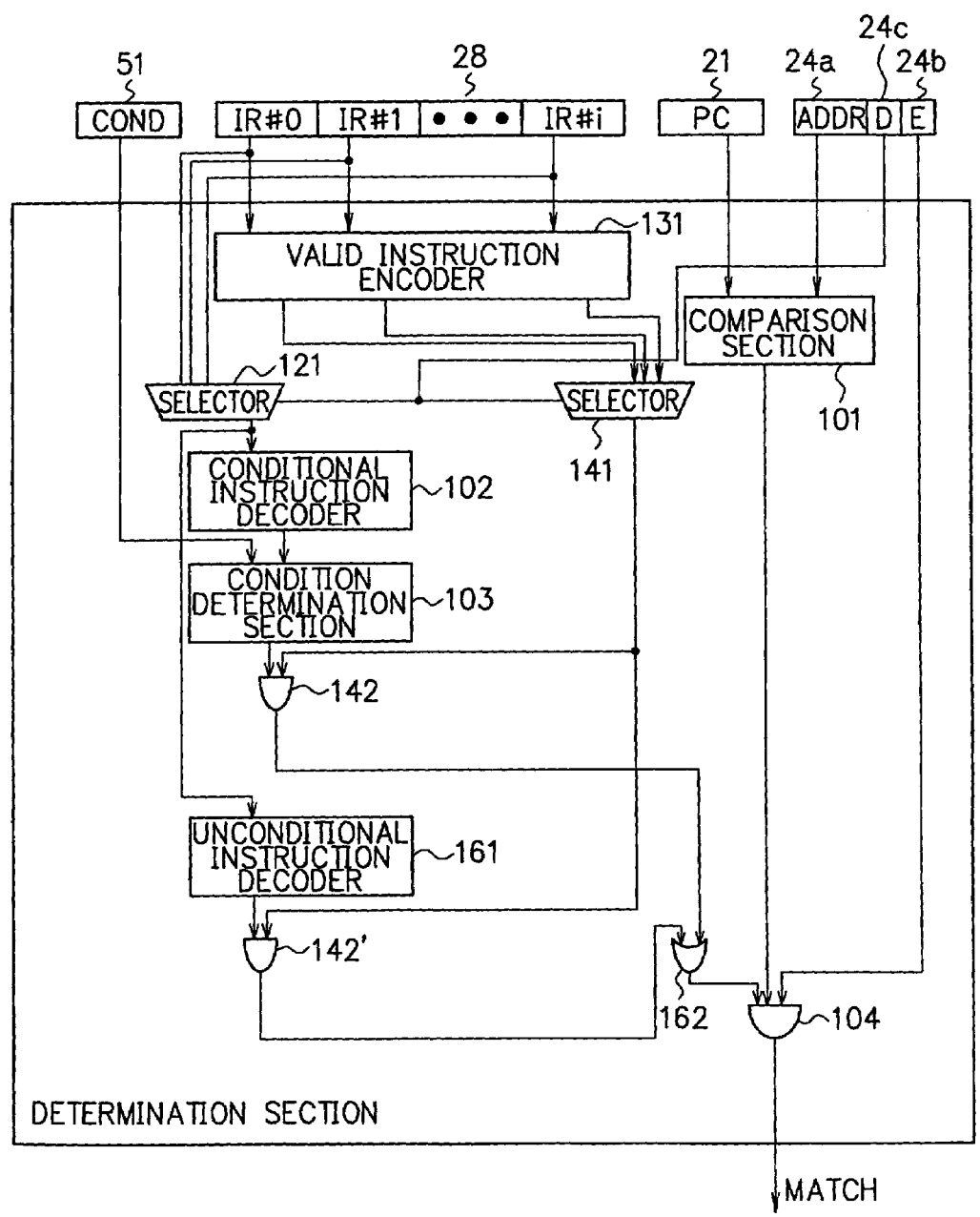
FIG. 39 is a block diagram showing the fifth construction of the determination section according to the 16th embodiment.

FIG. 28 is a block diagram showing the construction of a data processing system (scalar processor) according to the 15th embodiment for implementing an instruction break scheme by a hardware mechanism. In FIG. 28, the same reference numerals as in FIG. 18 denote the same functional parts as in FIG. 18, respectively, and a detailed description thereof will be omitted.

In the 15th embodiment shown in FIG. 28, each of breakpoint registers $24_{-0}$ to $24_{-n}$ of an instruction break detection section 23 has a mode register 24d for holding mode information on an instruction break mode or conditional instruction break mode, in addition to an address register 24a for holding the target address of a breakpoint at which execution is to be stopped and a flag register 24b indicating whether an instruction break operation is valid. The mode register 24d having the value "0" means an instruction break mode, and the mode register 24d having the value "1" means a conditional instruction break mode.

In the instruction break mode, when instruction break generation condition held by the address register 24a and the flag register 24b are satisfied, a break-interrupt occurs. In the conditional instruction break mode, a break-interrupt occurs when not only the instruction break generation conditions but also the condition of a conditional instruction is satisfied, as described in the 10th embodiment.

Each of determination sections $150_{-0}$ to $150_{-n}$ according to the 15th embodiment has a construction shown in FIG. 29. FIG. 29 is a block diagram showing the construction of the determination section $150_{-0}$ as a representative of the determination sections $150_{-0}$ to $150_{-n}$. In FIG. 29, the same reference numerals as in FIG. 19 denote the same blocks as in FIG. 19, respectively, and a detailed description thereof will be omitted.

As shown in FIG. 29, the determination section $150_{-0}$ of this embodiment comprises a comparison section 101, a conditional instruction decoder 102, a condition determination section 103, two AND circuits 151 and 152, and an OR circuit 153.

One AND circuit 151 performs AND operation to a determination signal output from the comparison section 101 and related to an instruction break address, a determination signal output from the condition determination section 103 and related to a condition code, the value of the flag register 24b of the breakpoint register $24_{-0}$ provided in accordance with the determination section $150_{-0}$, and the value of the mode register 24d, and outputs the AND operation result to the OR circuit 153.

The other AND circuit 152 performs AND operation to the determination signal output from the comparison section 101 and related to an instruction break address, the value of the flag register 24b of the breakpoint register $24_{-0}$ provided in accordance with the determination section $150_{-0}$, and a value obtained by inverting the value of the mode register 24d, and outputs the AND operation result to the OR circuit 153. The OR circuit 153 performs OR operation to the signals output from the two AND circuits 151 and 152, and outputs the OR operation result to an OR circuit 26 shown in FIG. 28.

According to this construction, in a situation where the conditional instruction break mode is designated by mode information stored in the mode register 24d, in at least one entry of the determination sections $150_{-0}$ to $150_{-n}$ of the instruction break detection section 23, when the instruction break address and current execution address match, the value of the flag register 24b is "1", and the condition of the conditional instruction is satisfied, the OR circuit 26 outputs an interrupt notification signal 67 to an interrupt control section 40.

On the other hand, in a situation where the instruction break mode is designated by mode information stored in the mode register 24d, in at least one entry of the determination sections $150_{-0}$ to $150_{-n}$ of the instruction break detection section 23, when the instruction break address and current execution address match, and the value of the flag register 24b is "1", the OR circuit 26 outputs the interrupt notification signal 67 to the interrupt control section 40.

As described above, according to the 15th embodiment, when the conditional instruction break mode is designated, a break-interrupt can be controlled in accordance with whether the instruction break generation condition and the condition of the conditional instruction are satisfied. In addition, when the instruction break mode is designated, a break-interrupt can be controlled in accordance with whether the instruction break generation condition is satisfied regardless of whether the condition of the conditional instruction is satisfied.

In the 15th embodiment, an construction in which the mode register 24d is added to the scalar processor described in the 10th embodiment, and accordingly, the two AND circuits 151 and 152 and the OR circuit 153 are provided in each of the determination sections $150_{-0}$ to $150_{-n}$ has been described. These components may be added to the VLIW type processor and parallel processor described in the 11th to 14th embodiments.

In this case, the determination sections have constructions shown in FIGS. 30 to 33, respectively. In FIGS. 30 to 33, the same reference numerals as in FIGS. 21, 23, 25, 27, and 29 denote respectively the same parts as in FIGS. 21, 23, 25, 27, and 29, which perform the same operations as described above, and a detailed description thereof will be omitted.

16th Embodiment

The 16th embodiment of the present invention will be described next with reference to drawings.

FIG. 34 is a block diagram showing the construction of a data processing system (scalar processor) according to the 16th embodiment for implementing an instruction break scheme by a hardware mechanism. In FIG. 34, the same reference numerals as in FIG. 18 denote the same functional parts as in FIG. 18, respectively, and a detailed description thereof will be omitted.

The 16th embodiment shown in FIG. 34 is different from the 10th embodiment shown in FIG. 18 in the construction of each of determination sections of an instruction break detection section 23. Each of determination sections $160_{-0}$ to $160_{-n}$ of this embodiment has a construction shown in FIG. 35. FIG. 35 is a block diagram showing the construction of the determination section $160_{-0}$ as a representative of the determination sections $160_{-0}$ to $160_{-n}$. In FIG. 35, the same reference numerals as in FIG. 19 denote the same blocks as in FIG. 19, respectively, and a detailed description thereof will be omitted.

As shown in FIG. 35, the determination section $160_{-0}$ of this embodiment comprises a comparison section 101, a conditional instruction decoder 102, a condition determination section 103, an AND circuit 104, an unconditional instruction decoder 161, and an OR circuit 162.

The unconditional instruction decoder 161 decodes an instruction word that is supplied from an instruction register 22 and currently being executed to detect whether the instruction word is an unconditional instruction and supplies the decoding result to the OR circuit 162. When the supplied instruction word is an unconditional instruction, the unconditional instruction decoder 161 output a signal having the value "1".

On the basis of the decoding result from the conditional instruction decoder 102, which represents whether the instruction is a conditional instruction, the condition determination section 103 of this embodiment determines whether the condition designated by the condition code of the conditional instruction, which is supplied from a condition register 51, is satisfied, and supplies the determination signal to the OR circuit 162.

The OR circuit 162 performs OR operation to the condition determination signal obtained by the condition determination section 103 for the conditional instruction and the unconditional instruction determination signal obtained by the unconditional instruction decoder 161, and outputs the OR operation result to the AND circuit 104.

The AND circuit 104 performs AND operation to the value of a flag register 24b of a breakpoint register $24_{-0}$ provided in accordance with the determination section $160_{-0}$, the determination signal output from the comparison section 101 and related to the instruction break address, and the signal output from the OR circuit 162, and outputs the AND operation result to an OR circuit 26 shown in FIG. 34.

According to this construction, in a case wherein the instruction word stored in the instruction register 22 is a conditional instruction, in at least one entry of the determination sections $160_{-0}$ to $160_{-n}$ of the instruction break detection section 23, when the instruction break address and current execution address match, the value of the flag register 24b is "1", and the condition of the conditional instruction is satisfied, the OR circuit 26 outputs an interrupt notification signal 67 to an interrupt control section 40.

On the other hand, when the instruction word stored in the instruction register 22 is an unconditional instruction, the OR circuit 162 outputs a signal having the value "1", like in the case wherein the instruction word is a conditional instruction, and the condition is satisfied. Hence, in at least one entry, when the instruction break address and current execution address match, and the value of the flag register 24b is "1", the OR circuit 26 outputs the interrupt notification signal 67 to the interrupt control section 40.

As described above, according to the 16th embodiment, when the supplied instruction word is a conditional instruction, a break-interrupt can be controlled in accordance with whether the instruction break generation condition and the condition of the conditional instruction are satisfied. When the supplied instruction word is an unconditional instruction, a break-interrupt can be controlled in accordance with whether the instruction break generation condition is satisfied.

In the 16th embodiment, an construction in which, for the scalar processor described in the 10th embodiment, the unconditional instruction decoder 161 and OR circuit 162 are added in each of the determination sections $160_{-0}$ to $160_{-n}$ has been described. These components may be added to the VLIW type processor and parallel processor described in the 11th to 14th embodiments.

In this case, the determination sections have constructions shown in FIGS. 36 to 39, respectively.

In FIGS. 36 to 39, the same reference numerals as in FIGS. 21, 23, 25, 27, and 35 denote respectively the same parts as in FIGS. 21, 23, 25, 27, and 35, which perform the same operations as described above. Each component with a symbol "'" has the same function as that of a corresponding component without this symbol, and its operation will be apparent without a detailed description of FIGS. 36 to 39.

17th Embodiment

The 17th embodiment of the present invention will be described next with reference to drawings.

FIG. 40 is a block diagram showing the construction of a data processing system (scalar processor) according to the 17th embodiment for implementing an instruction break scheme by a hardware mechanism. In the 17th embodiment, the 15th embodiment shown in FIG. 28 and the 16th embodiment shown in FIG. 34 are combined. In the 17th embodiment shown in FIG. 40, the same reference numerals as in FIGS. 28 and 34 denote the same functional parts as in FIGS. 28 and 34, respectively, and a detailed description thereof will be omitted.

Figure 41:
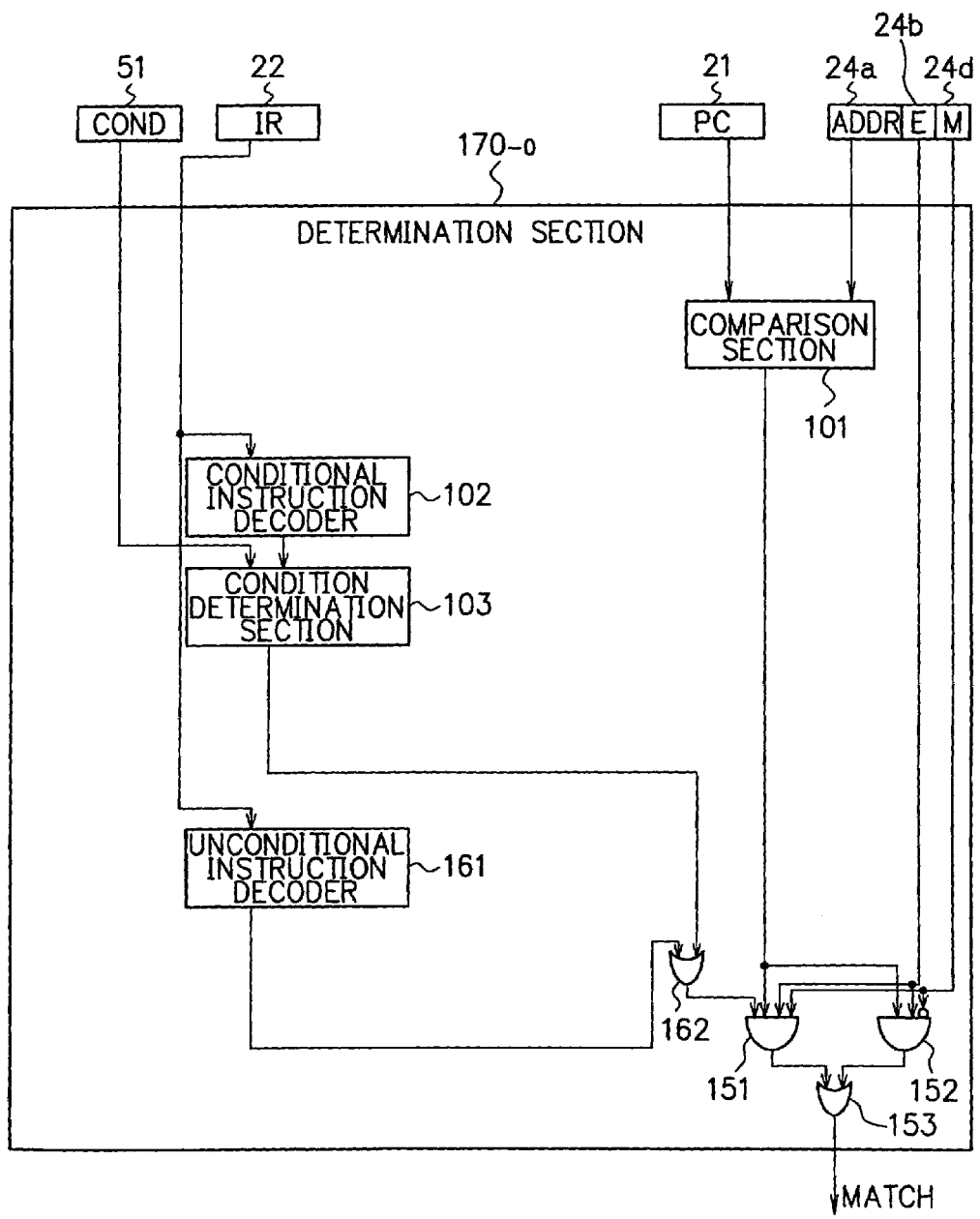
FIG. 41 is a block diagram showing the first construction of a determination section according to the 17th embodiment.
Figure 43:
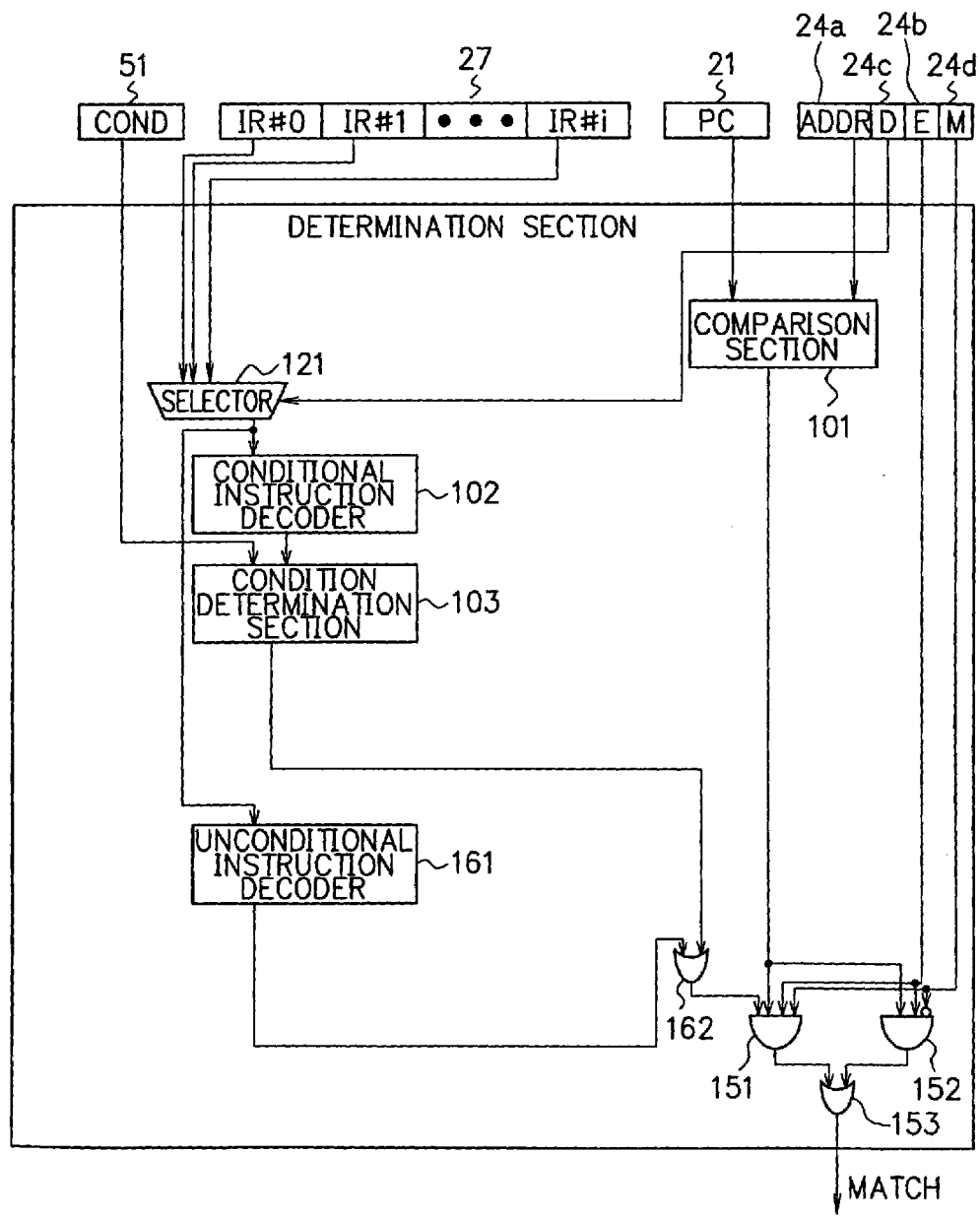
FIG. 43 is a block diagram showing the third construction of the determination section according to the 17th embodiment.
Figure 44:
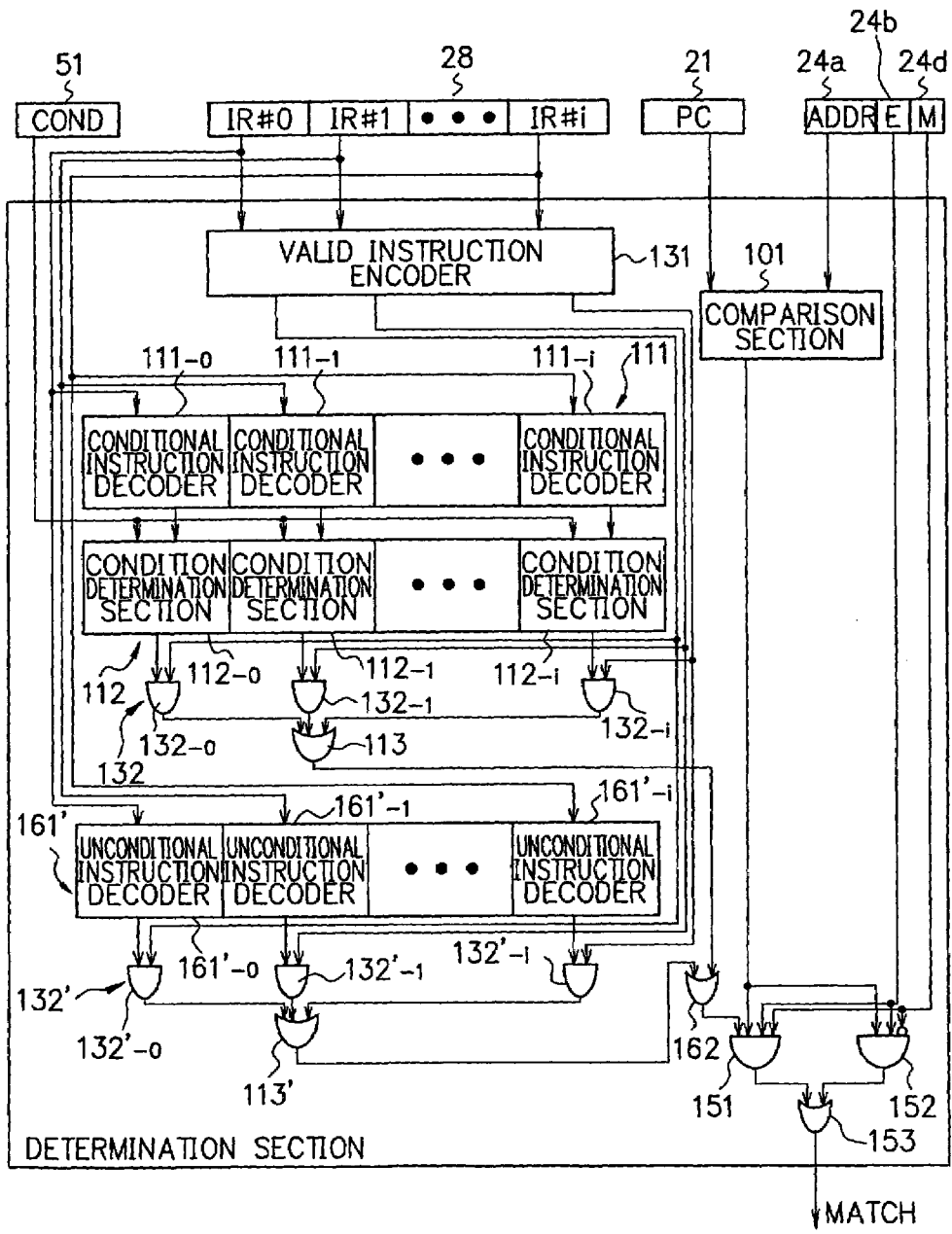
FIG. 44 is a block diagram showing the fourth construction of the determination section according to the 17th embodiment.

The 17th embodiment shown in FIG. 40 is different from the 15th embodiment shown in FIG. 28 an the 16th embodiment shown in FIG. 34 in the construction of each of determination sections of an instruction break detection section 23. Each of determination sections $170_{-0}$ to $170_{-n}$ of this embodiment has a construction shown in FIG. 41. FIG. 41 is a block diagram showing the construction of the determination section $170_{-0}$ as a representative of the determination sections $170_{-0}$ to $170_{-n}$. In FIG. 40, the same reference numerals as in FIGS. 29 and 35 denote the same blocks as in FIGS. 29 and 35, respectively, and a detailed description thereof will be omitted.

As shown in FIG. 41, the determination section $170_{-0}$ of this embodiment comprises a comparison section 101, a conditional instruction decoder 102, a condition determination section 103, two AND circuits 151 and 152, an OR circuit 153, an unconditional instruction decoder 161, and another OR circuit 162.

The unconditional instruction decoder 161 decodes an instruction word that is supplied from an instruction register 22 and currently being executed to detect whether the instruction word is an unconditional instruction and supplies the decoding result to the OR circuit 162. When the supplied instruction word is an unconditional instruction, the unconditional instruction decoder 161 output a signal having the value "1".

On the basis of the decoding result from the conditional instruction decoder 102, which represents whether the instruction is a conditional instruction, the condition determination section 103 of this embodiment determines whether the condition designated by the condition code of the conditional instruction, which is supplied from a condition register 51, is satisfied, and supplies the determination signal to the OR circuit 162.

The OR circuit 162 performs OR operation to the condition determination signal obtained by the condition determination section 103 for the conditional instruction and the unconditional instruction determination signal obtained by the unconditional instruction decoder 161, and outputs the OR operation result to one AND circuit 151.

The AND circuit 151 performs AND operation to a signal output from the OR circuit 162, a determination signal output from the comparison section 101 and related to an instruction break address, the value of a flag register 24b of a breakpoint register $24_{-0}$ provided in accordance with the determination section $170_{-0}$, and the value of a mode register 24d, and outputs the AND operation result to the OR circuit 153.

The other AND circuit 152 performs AND operation to the determination signal output from the comparison section 101 and related to an instruction break address, the value of the flag register 24b of the breakpoint register $24_{-0}$ provided in accordance with the determination section $170_{-0}$, and a value obtained by inverting the value of the mode register 24d, and outputs the AND operation result to the OR circuit 153. The OR circuit 153 performs OR operation to the signals output from the two AND circuits 151 and 152, and outputs the OR operation result to an OR circuit 26 shown in FIG. 40.

According to this construction, in a situation where the conditional instruction break mode is designated by mode information stored in the mode register 24d, and the instruction word stored in the instruction register 22 is a conditional instruction, in at least one entry of the determination sections $170_{-0}$ to $170_{-n}$ of the instruction break detection section 23, when the instruction break address and current execution address match, the value of the flag register 24b is "1", and the condition of the conditional instruction is satisfied, the OR circuit 26 outputs an interrupt notification signal 67 to an interrupt control section 40.

In a situation where the conditional instruction break mode is designated by mode information stored in the mode register 24d, and the instruction word stored in the instruction register 22 is an unconditional instruction, in at least one entry of the determination sections $170_{-0}$ to $170_{-n}$ of the instruction break detection section 23, when the instruction break address and current execution address match, and the value of the flag register 24b is "1", the OR circuit 26 outputs the interrupt notification signal 67 to the interrupt control section 40.

In addition, in a situation where the instruction break mode is designated by mode information stored in the mode register 24d, in at least one entry of the determination sections $170_{-0}$ to $170_{-n}$ of the instruction break detection section 23, when the instruction break address and current execution address match, and the value of the flag register 24b is "1" the OR circuit 26 outputs the interrupt notification signal 67 to the interrupt control section 40.

As described above, according to the 17th embodiment, when the conditional instruction break mode is designated, a break-interrupt can be controlled in accordance with whether the instruction break generation condition and the condition of the conditional instruction are satisfied. Additionally, when the instruction break mode is designated, a break-interrupt can be controlled independently of whether the condition of the conditional instruction is satisfied and in accordance with whether the instruction break generation condition is satisfied.

Furthermore, when the conditional instruction break mode is designated, and the supplied instruction word is a conditional instruction, a break-interrupt can be controlled in accordance with whether the instruction break generation condition and the condition of the conditional instruction are satisfied. Also, even when the supplied instruction word is an unconditional instruction, a break-interrupt can be controlled in accordance with whether the instruction break generation condition is satisfied.

In the 17th embodiment, an construction in which the mode register 24d is added to the scalar processor described in the 10th embodiment, and the two AND circuit 151 and 152, the OR circuit 153, the unconditional instruction decoder 161, and the OR circuit 162 are added in each of the determination sections $170_{-0}$ to $170_{-n}$ has been described. These components may be added to the VLIW type processor and parallel processor described in the 11th to 14th embodiments.

In this case, the determination sections have constructions shown in FIGS. 42 to 45, respectively. In FIGS. 42 to 45, the same reference numerals as in FIGS. 21, 23, 25, 27, 35, and 41 denote respectively the same parts as in FIGS. 21, 23, 25, 27, 35, and 41, which perform the same operations as described above. Each component with a symbol "'" has the same function as that of a corresponding component without this symbol, and its operation will be apparent without a detailed description of FIGS. 42 to 45.

18th Embodiment

The 18th embodiment of the present invention will be described next with reference to drawings.

In the 10th to 17th embodiments, an example has been described in which whether the instruction break generation condition and the condition of a conditional instruction are satisfied is implemented by a hardware mechanism. In the 18th to 22nd embodiments to be described below, an example will be described in which whether at least the condition of a conditional instruction is satisfied is implemented by the function of software.

In the 18th to 21st embodiments, the overall construction of a data processing system (processor) for implementing the instruction break scheme is the same as that shown in FIG. 3. As is apparent from this, whether the instruction break generation condition is satisfied is determined by a hardware mechanism using breakpoint registers $24_{-0}$ to $24_{-n}$ for holding the target address of a breakpoint and flag information on whether the instruction break operation is valid, and determination sections $25_{-0}$ to $25_{-n}$ for determining on the basis of these pieces of information whether the instruction break generation condition is satisfied.

Figure 46:
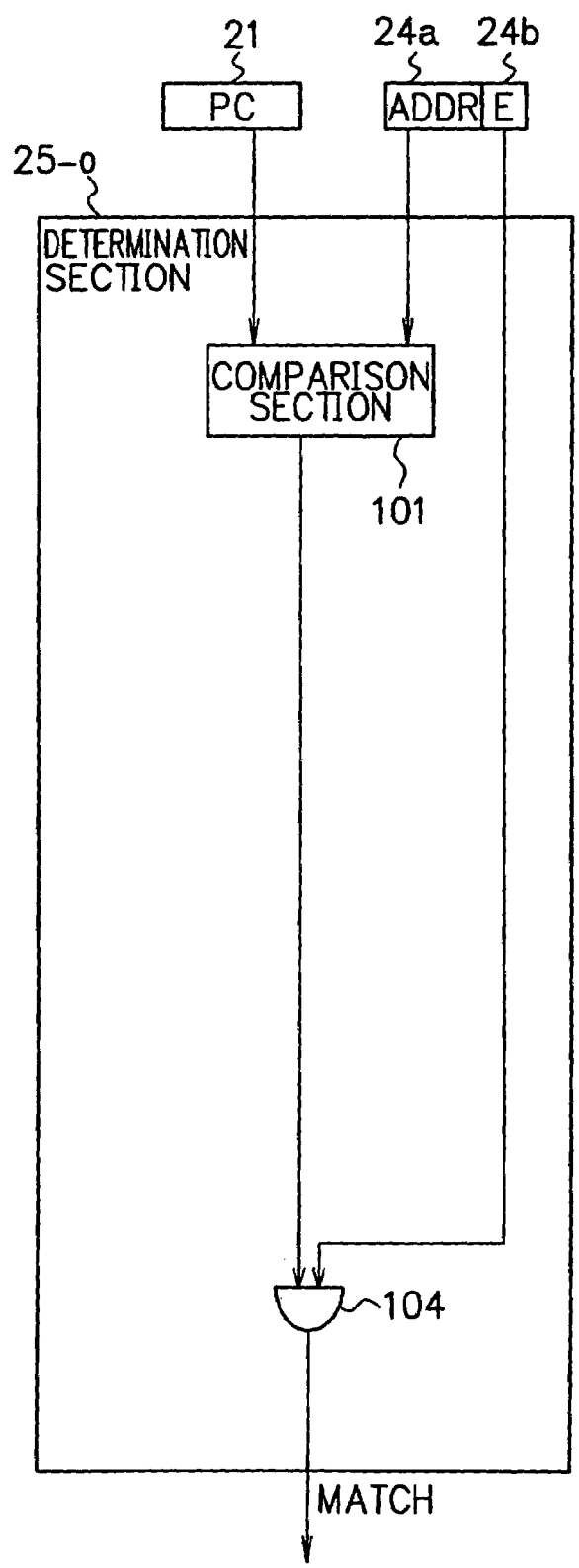
FIG. 46 is a block diagram showing the construction of a determination section according to the 18th to 21st embodiments of the present invention.

In this case, each of the determination sections $25_{-0}$ to $25_{-n}$ has a construction shown in FIG. 46. FIG. 46 is a block diagram showing the construction of the determination section $25_{-0}$ as a representative of the determination sections $25_{-0}$ to $25_{-n}$. In FIG. 46, the same reference numerals as in FIG. 19 denote the same blocks as in FIG. 19, respectively.

As shown in FIG. 46, the determination section $25_{-0}$ of this embodiment comprises a comparison section 101 and AND circuit 104.

The comparison section 101 compares an instruction break address held in an address register 24a of the breakpoint register $24_{-0}$ provided in accordance with the determination section $25_{-0}$ with a current execution address supplied from a program counter 21 and determines whether the two addresses match. When the two addresses match, the comparison section 101 outputs a determination signal having the value "1". When the two addresses do not match, the comparison section 101 outputs a determination signal having the value "0".

The AND circuit 104 performs AND operation to the value of a flag register 24b of the breakpoint register $24_{-0}$ provided in accordance with the determination section $25_{-0}$ and the determination signal output from the comparison section 101 and related to the instruction break address and outputs the AND operation result to an OR circuit 26 shown in FIG. 3.

According to this construction, in at least one entry of the determination sections $25_{-0}$ to $25_{-n}$, of an instruction break detection section 23, when the instruction break address and current execution address match, and the value of the flag register 24b is "1", the OR circuit 26 outputs an interrupt notification signal 67 to an interrupt control section 40.

The interrupt notification signal 67 output in this embodiment represents only that the instruction break generation condition is satisfied and does not includes that the condition of the conditional instruction is satisfied. Whether the condition of the conditional instruction is satisfied is determined by an interrupt handler as a program for condition determination, which is stored in a memory 10 and started as the interrupt notification signal 67 is received.

More specifically, when receiving the interrupt notification signal 67 from the OR circuit 26, the interrupt control section 40 reads out an instruction address 73 at the time of interrupt from a program counter 21 of an instruction fetch section 20 and writes the instruction address 73 in a return address register 52 of a register section 50. A start address 66 of the interrupt handler for determining the condition of the conditional instruction is supplied to the instruction fetch section 20 and set in the program counter 21. The interrupt control section 40 also writes the processor state before the interrupt in a previous state register 53 and writes, in a present state register 54, the processor state that has transited in accordance with the interrupt. Thus, the processor transits from the user state to the supervisor state.

The processor that has transited to the supervisor state executes processing of the interrupt handler sequentially from the start address 66 of the interrupt handler, which is set in the program counter 21.

Figure 47:
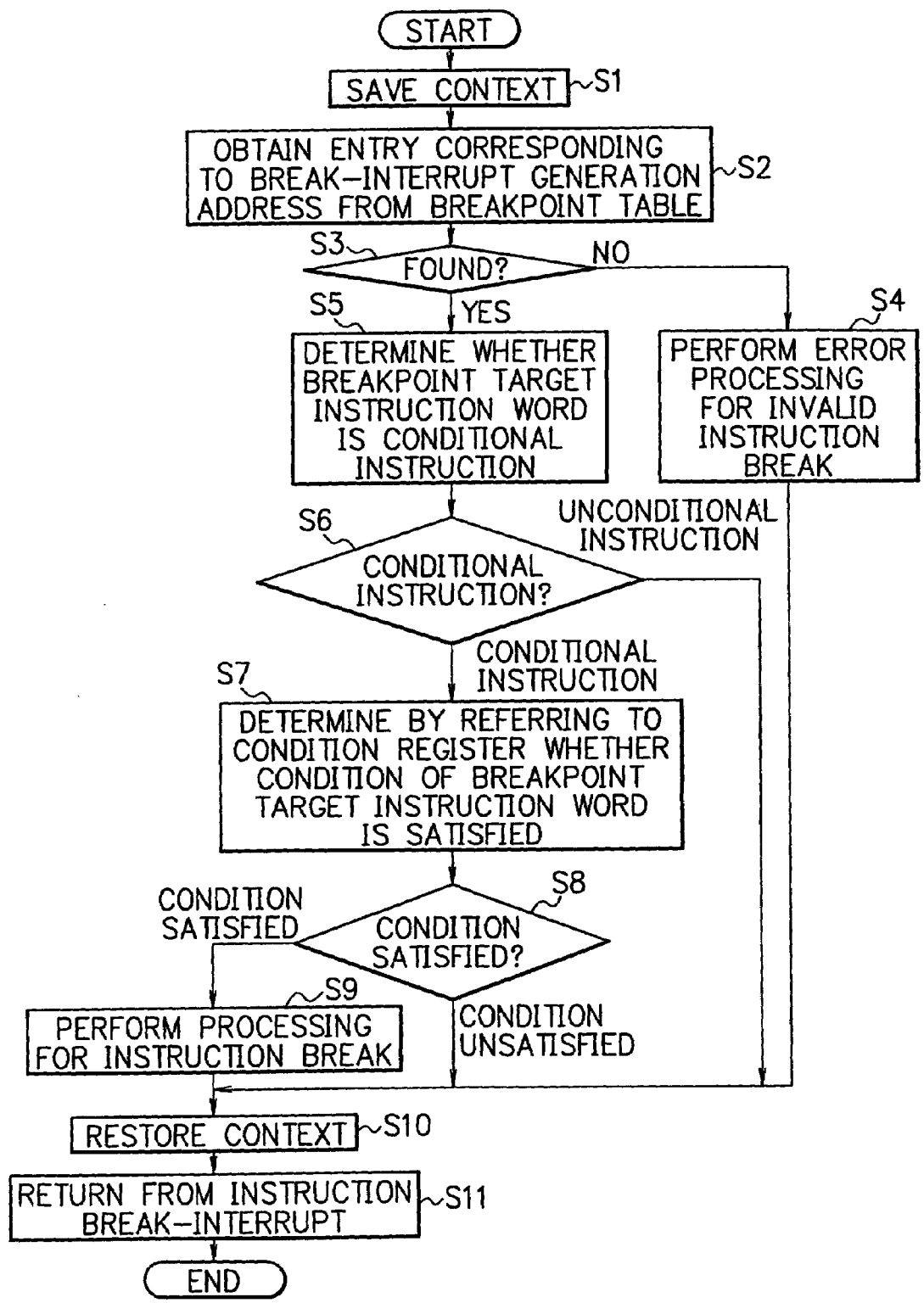
FIG. 47 is a flow chart showing the first example of processing by an instruction break-interrupt handler according to the 18th embodiment.

FIG. 47 is a flow chart showing the processing procedure of the interrupt handler according to the 18th embodiment. In the 18th embodiment, interrupt control based on determination of the condition of a conditional instruction, which is done by the hardware mechanism in the scalar processor of the 10th embodiment, is performed by the function of software shown in the flow chart of FIG. 47.

Figure 48:
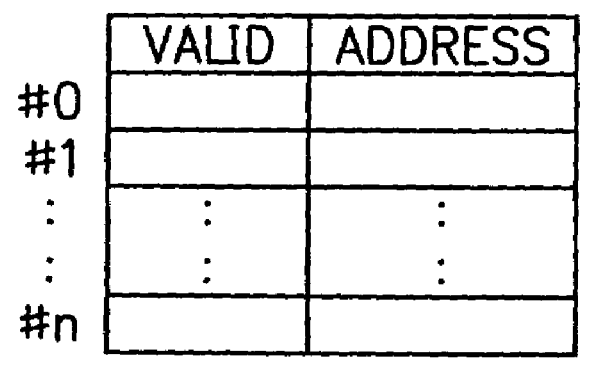

Referring to FIG. 47, the context is saved in step S1. More specifically, the value of the register section 50 used by the interrupt handler is written in the memory 10. In step S2, an entry corresponding to a break-interrupt generation address is obtained by looking up, e.g., the breakpoint table of an instruction execution section 30 shown in FIG. 3. More specifically, a breakpoint table as shown in FIG. 48 is set and held in the instruction execution section 30 in advance. Referring to FIG. 48, a column "VALID" represents whether the breakpoint operation is valid. The value "1" means a breakpoint operation valid state while the value "0" means a breakpoint operation invalid state. A column "ADDRESS" holds the target address of a breakpoint at which execution is to be stopped.

In step S2, an entry where one of instruction addresses stored in the address registers 24a of the breakpoint registers $24_{-0}$ to $24_{-n}$ shown in FIG. 3 or an instruction address as the factor of the break-interrupt is present is obtained from entries #0 to #n by looking up the column "ADDRESS" of the breakpoint table shown in FIG. 48.

In step S3, it is determined whether an entry corresponding to the break-interrupt generation address is found in the breakpoint table. If NO in step S3, it is determined that the instruction break is invalid. The flow advances to step S4 to execute error processing for the invalid instruction break. If YES in step S3, the flow advances to step S5.

In step S5, whether the breakpoint target instruction word (instruction word as the factor of the interrupt notification signal 67) is a conditional instruction. In step S6, it is determined whether the breakpoint target instruction word is a conditional instruction. If the instruction word is not a conditional instruction, the flow jumps to step S10 without performing processing for the instruction break.

If the breakpoint target instruction word is a conditional instruction, the flow advances to step S7. In step S7, it is determined by referring to the condition register 51 whether the condition of the breakpoint target instruction word as a conditional instruction is satisfied. In step S8, it is determined whether the condition of the conditional instruction is satisfied. If the condition is not satisfied, the flow jumps to step S10 without performing processing for the instruction break.

If the condition of the conditional instruction is satisfied, the flow advances to step S9 to execute processing for the instruction break. More specifically, in accordance with the sequentially incremented value of the program counter 21, an instruction word 62 of the interrupt handler is read out to the instruction fetch section 20, and the instruction execution section 30 sequentially executes processing toward the final address of the interrupt handler in accordance with the read-out instruction word.

At the final stage of the interrupt handler corresponding to the interrupt, the context is restored in step S10. When context restoration processing is ended, the flow advances to step S1. The instruction execution section 30 executes the break-interrupt return instruction to return the processor from instruction break interrupt processing to the previous application program processing.

More specifically, the instruction execution section 30 reads out the value of the previous state register 53 and writes the value in the present state register 54. Thus, the processor transits from the supervisor state to the user state. The instruction execution section 30 also reads out, from the return address register 52, the original instruction address to which the processor will return from the interrupt state, supplies the instruction address to the instruction fetch section 20 as a branch destination instruction address 65, and sets the address value in the program counter 21.

On the basis of the original instruction address set in the program counter 21, the instruction fetch section 20 reads out the instruction word 62 for the normal operation from the memory 10, temporarily holds the instruction word in the instruction register 22, and then supplies the instruction word to the instruction execution section 30. The instruction execution section 30 executes the remaining part of processing of the application corresponding to the normal operation.

As described above, when the breakpoint target instruction word is not a conditional instruction, and the condition of the conditional instruction is not satisfied, the flow immediately advances to step S10 without performing processing for the instruction break in step S9. In step S10, the context is restored. In step S11, return processing from the instruction break-interrupt is executed, and then, processing returns to the operation of the original application program.

As described above, in the 18th embodiment, whether the generation condition of the instruction break corresponding to the instruction break address and flag value is satisfied is determined by the determination sections $25_{-0}$ to $25_{-n}$. In addition, whether the condition of the conditional instruction is satisfied is determined by software of the interrupt handler. Only when both conditions are satisfied, break-interrupt processing is actually executed.

Thus, like in the 10th embodiment, in debugging a program including a conditional instruction, a break-interrupt can be controlled in accordance with whether the condition of the conditional instruction is satisfied. More specifically, in a situation where the instruction break generation condition is satisfied, when the condition of the conditional instruction is satisfied, a break-interrupt occurs. When the condition of the conditional instruction is not satisfied, or the supplied instruction is an unconditional instruction, a break-interrupt can be inhibited.

In the 18th embodiment, processing corresponding to the scalar processor described in the 10th embodiment is implemented by the function of software.

Processing corresponding to the VLIW type processor described in the 11th and 12th embodiments or the parallel processor described in the 13th and 14th embodiments can also be implemented by the function of software.

Figure 49:
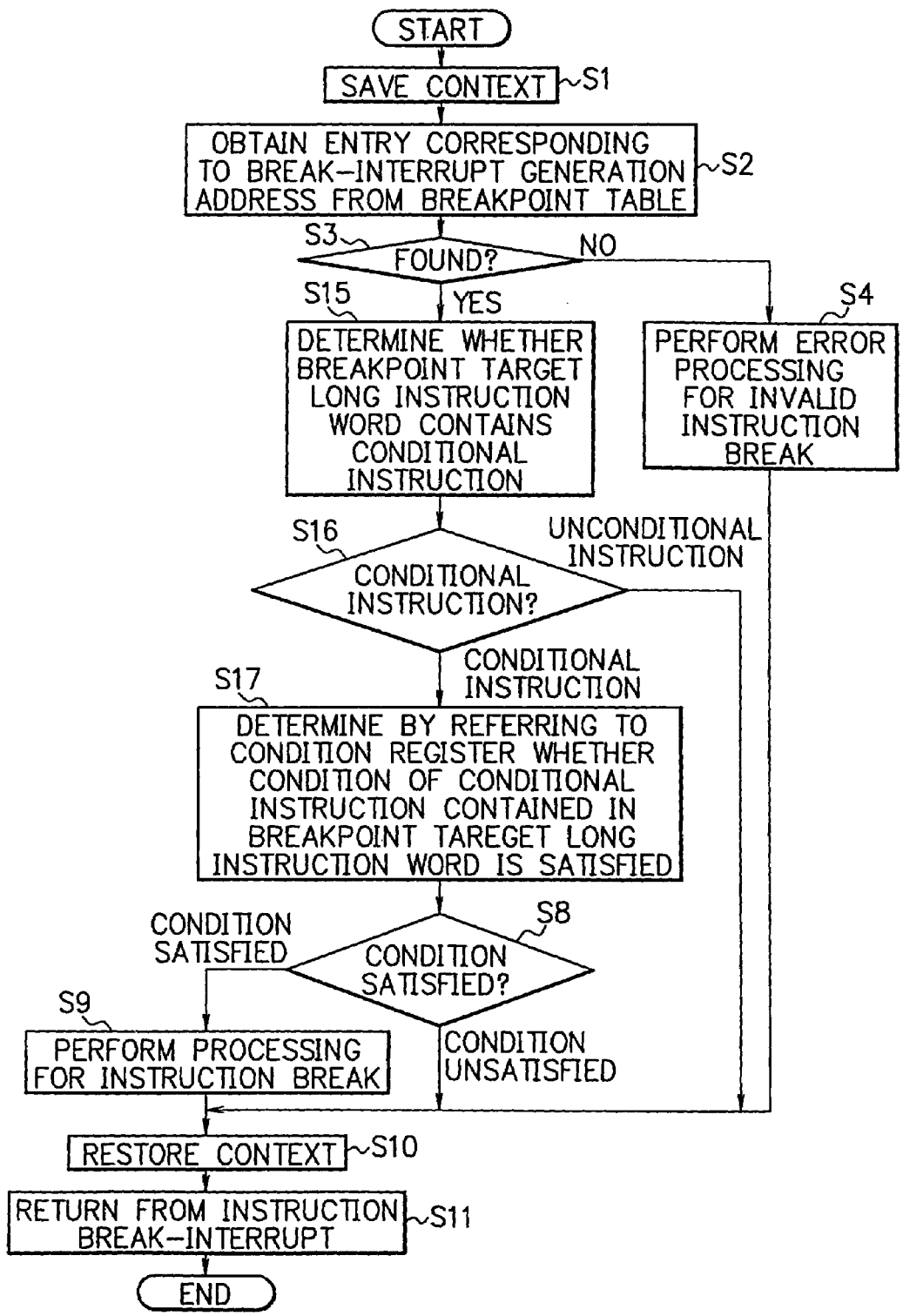
FIG. 49 is a flow chart showing the second example of processing by the instruction break-interrupt handler according to the 18th embodiment.

For example, to implement determination of the condition of a conditional instruction by the function of software, unlike the 11th embodiment in which the determination is done by the hardware mechanism of the VLIW type processor, a flow chart shown in FIG. 49 is used. Referring to FIG. 49, in step S15, it is determined whether the long instruction word as a breakpoint target includes a short instruction formed from a conditional instruction. On the basis of the determination result, it is determined in step S16 whether the long instruction word as a breakpoint target contains a conditional instruction.

When short instructions forming the long instruction word contain only unconditional instructions, the flow jumps to step S10. When a conditional instruction is contained, the flow advances to step S17. It is determined in step S17 by referring to the condition register 51 whether the condition of the conditional instruction contained in the long instruction word as a breakpoint target is satisfied. In step S8, it is determined whether the condition of the conditional instruction is satisfied. Processing in the remaining steps is the same as described above.

In this case, when the short instructions forming the long instruction word include a conditional instruction, a break-interrupt can be controlled in accordance with whether the condition of the conditional instruction is satisfied. More specifically, in a situation where the instruction break generation condition is satisfied, when the condition of the conditional instruction is satisfied for any one of the short instructions, a break-interrupt occurs. When the condition of the conditional instruction is not satisfied for none of the short instructions, or all the short instructions are unconditional instructions, a break-interrupt can be inhibited.

Figure 50:
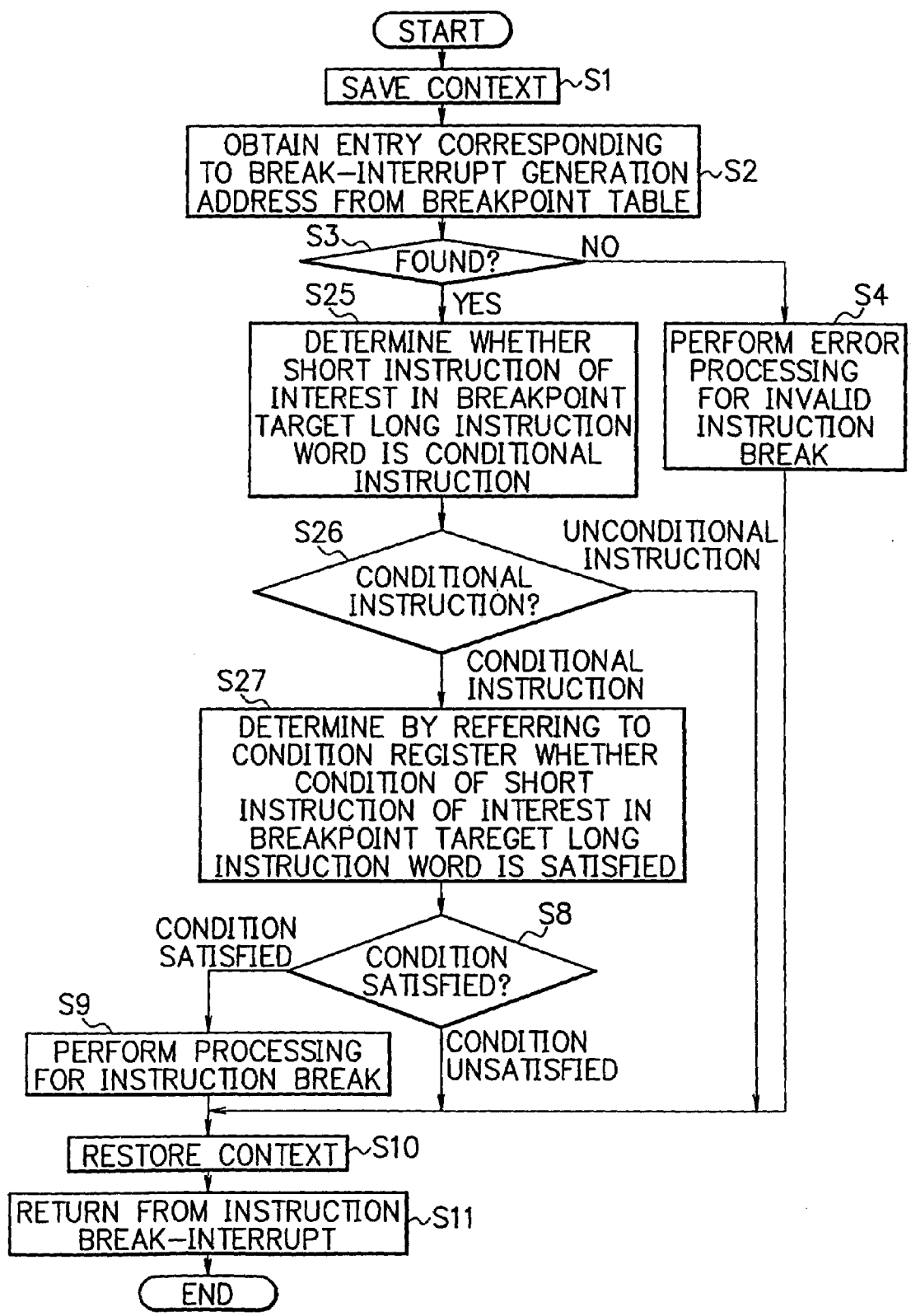
FIG. 50 is a flow chart showing the third example of processing by the instruction break-interrupt handler according to the 18th embodiment.

To implement determination of the condition of a conditional instruction by the function of software, unlike the 12th embodiment in which the determination is done by the hardware mechanism of the VLIW type processor, a flow chart shown in FIG. 50 is used. Referring to FIG. 50, in step S25, it is determined whether a short instruction of interest in short instructions forming a long instruction word as a breakpoint target is a conditional instruction. In step S26, it is determined whether the short instruction of interest is a conditional instruction.

The short instruction in the long instruction word is specified using the breakpoint table held in the instruction execution section 30. More specifically, the breakpoint table has the construction shown in FIG. 51. A column "DISP" is added to the breakpoint table shown in FIG. 48. The column "DISP" holds displacement information from the head portion of the long instruction word as a breakpoint target. One of the short instructions forming the long instruction word is specified using the displacement information together with the instruction break address held in the column "ADDRESS".

If it is determined in step S26 that the short instruction of interest is not a conditional instruction, the flow jumps to step S10. If the short instruction is a conditional instruction, the flow advances to step S27. It is determined in step S27 by referring to the condition register 51 whether the condition of the conditional instruction of interest in the long instruction word as a breakpoint target is satisfied. In step S8, it is determined whether the condition of the conditional instruction is satisfied. Processing in the remaining steps is the same as described above.

In this case, one of the short instructions forming the long instruction word is specified, and it is determined whether the condition of the conditional instruction is satisfied. A break-interrupt can be controlled in accordance with whether the condition is satisfied. More specifically, in a situation where the instruction break generation condition is satisfied, when the condition of the designated conditional instruction is satisfied, a break-interrupt occurs. When the condition of the designated conditional instruction is not satisfied, or the designated short instruction is an unconditional instruction, a break-interrupt can be inhibited.

Figure 52:
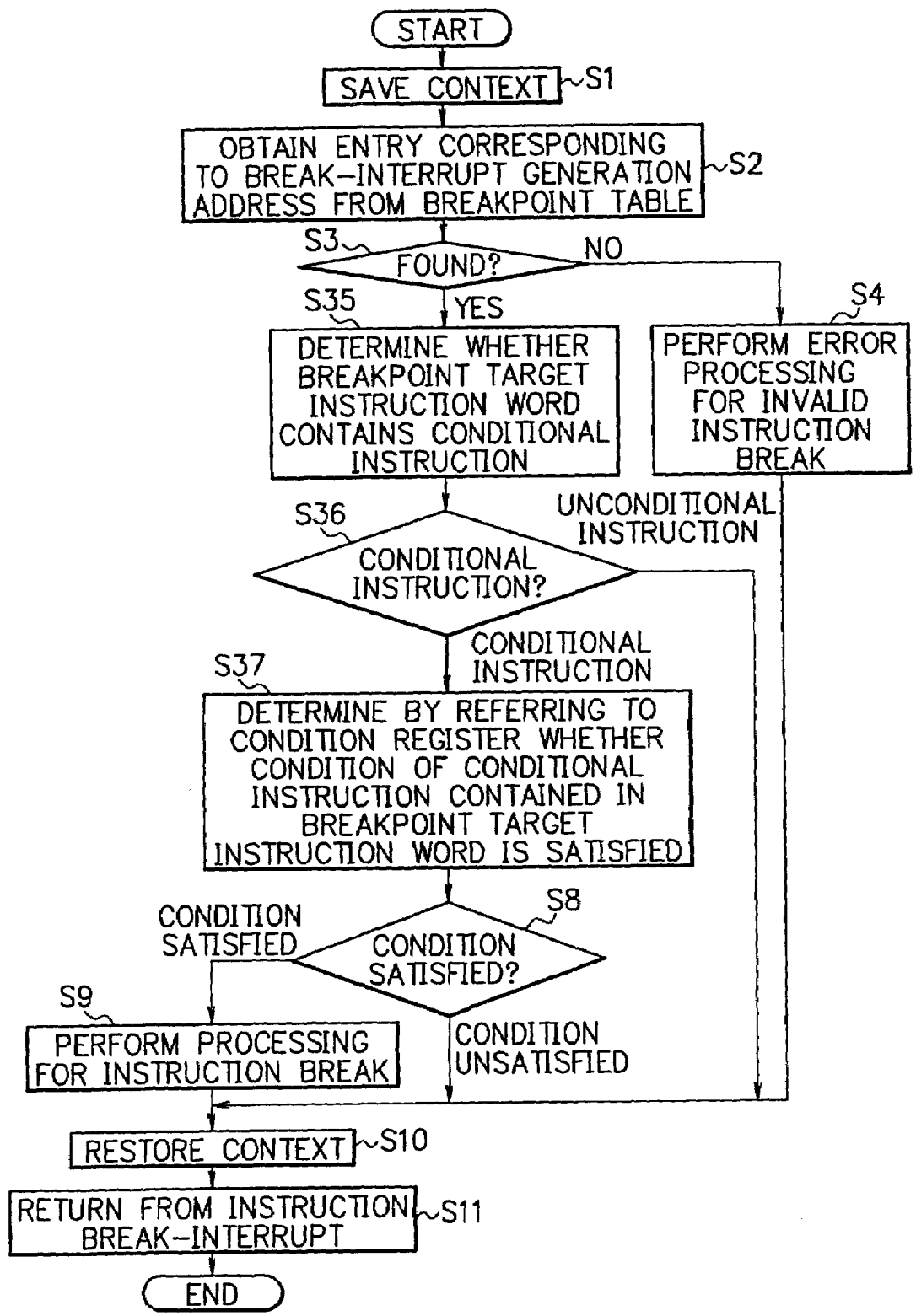
FIG. 52 is a flow chart showing the fourth example of processing by the instruction break-interrupt handler according to the 18th embodiment.

To implement determination of the condition of a conditional instruction by the function of software, unlike the 13th embodiment in which the determination is done by the hardware mechanism of the parallel processor, a flow chart shown in FIG. 52 is used. Referring to FIG. 52, in step S35, it is determined whether a variable-length instruction word as a breakpoint target contains a basic instruction. On the basis of this determination result, it is determined in step S36 whether the variable-length instruction word contains a conditional instruction.

When basic instructions forming the breakpoint target instruction word contain only unconditional instructions, the flow jumps to step S10. When a conditional instruction is contained, the flow advances to step S37. It is determined in step S37 by referring to the condition register 51 whether the condition of the conditional instruction contained in the breakpoint target instruction word is satisfied. In step S8, it is determined whether the condition of the conditional instruction is satisfied. Processing in the remaining steps is the same as described above.

In this case, when the basic instructions forming the variable-length instruction word include a conditional instruction, a break-interrupt can be controlled in accordance with whether the condition of the conditional instruction is satisfied. More specifically, in a situation where the instruction break generation condition is satisfied, when the condition of the conditional instruction is satisfied for any one of the basic instructions, a break-interrupt occurs. When the condition of the conditional instruction is not satisfied for none of the basic instructions, or all the basic instructions are unconditional instructions, a break-interrupt can be inhibited.

Figure 53:
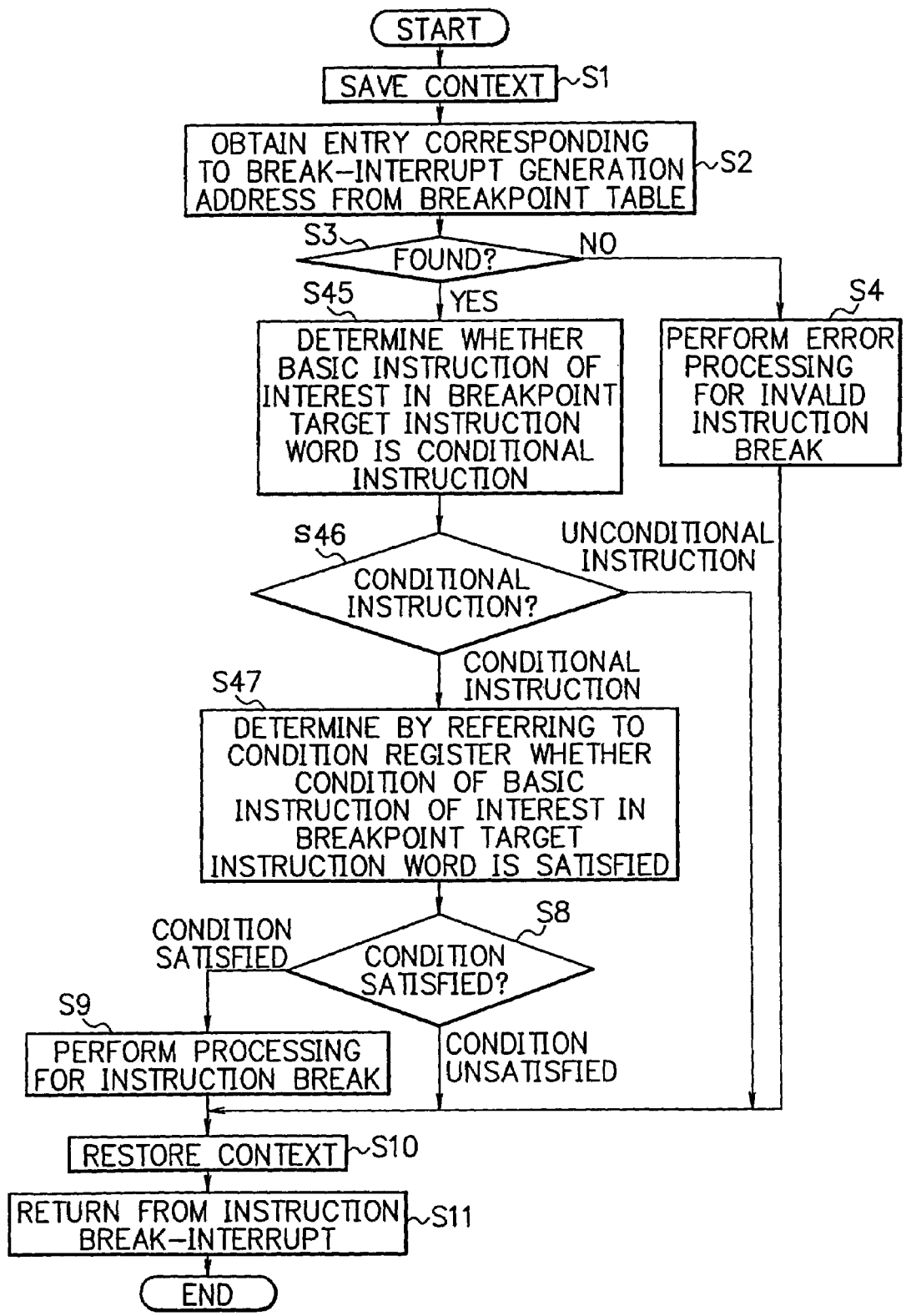
FIG. 53 is a flow chart showing the fifth example of processing by the instruction break-interrupt handler according to the 18th embodiment.

To implement determination of the condition of a conditional instruction by the function of software, unlike the 14th embodiment in which the determination is done by the hardware mechanism of the parallel processor, a flow chart shown in FIG. 53 is used. Referring to FIG. 53, in step S45, it is determined whether a basic instruction of interest in basic instructions forming a variable-length instruction word as a breakpoint target is a conditional instruction. In step S46, it is determined whether the basic instruction of interest is a conditional instruction.

Figure 51:
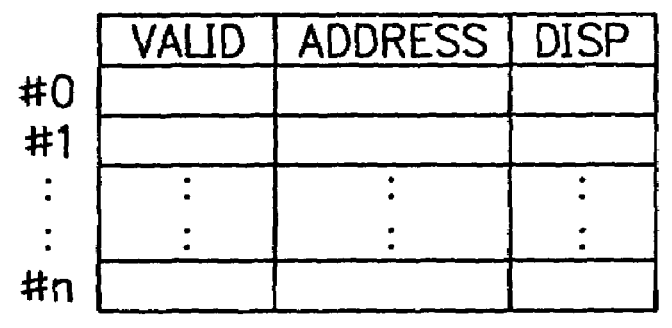

The basic instruction in the variable-length instruction word is specified using a breakpoint table shown in FIG. 51. In this breakpoint table, a column "DISP" holds displacement information from the head portion of the variable-length instruction word as a breakpoint target. One of the basic instructions forming the variable-length instruction word is specified using the displacement information together with the instruction break address held in the column "ADDRESS".

If it is determined in step S46 that the basic instruction of interest is not a conditional instruction, the flow jumps to step S10. If the basic instruction is a conditional instruction, the flow advances to step S47. It is determined in step S47 by referring to the condition register 51 whether the condition of the conditional instruction of interest in the breakpoint target instruction word is satisfied. In step S8, it is determined whether the condition of the conditional instruction is satisfied. Processing in the remaining steps is the same as described above.

In this case, one of the basic instructions forming the variable-length instruction word is specified, and it is determined whether the condition of the conditional instruction is satisfied. A break-interrupt can be controlled in accordance with whether the condition is satisfied. More specifically, in a situation where the instruction break generation condition is satisfied, when the condition of the designated conditional instruction is satisfied, a break-interrupt occurs. When the condition of the designated conditional instruction is not satisfied, or the designated basic instruction is an unconditional instruction, a break-interrupt can be inhibited.

19th Embodiment

The 19th embodiment of the present invention will be described next with reference to drawings.

Figure 54:
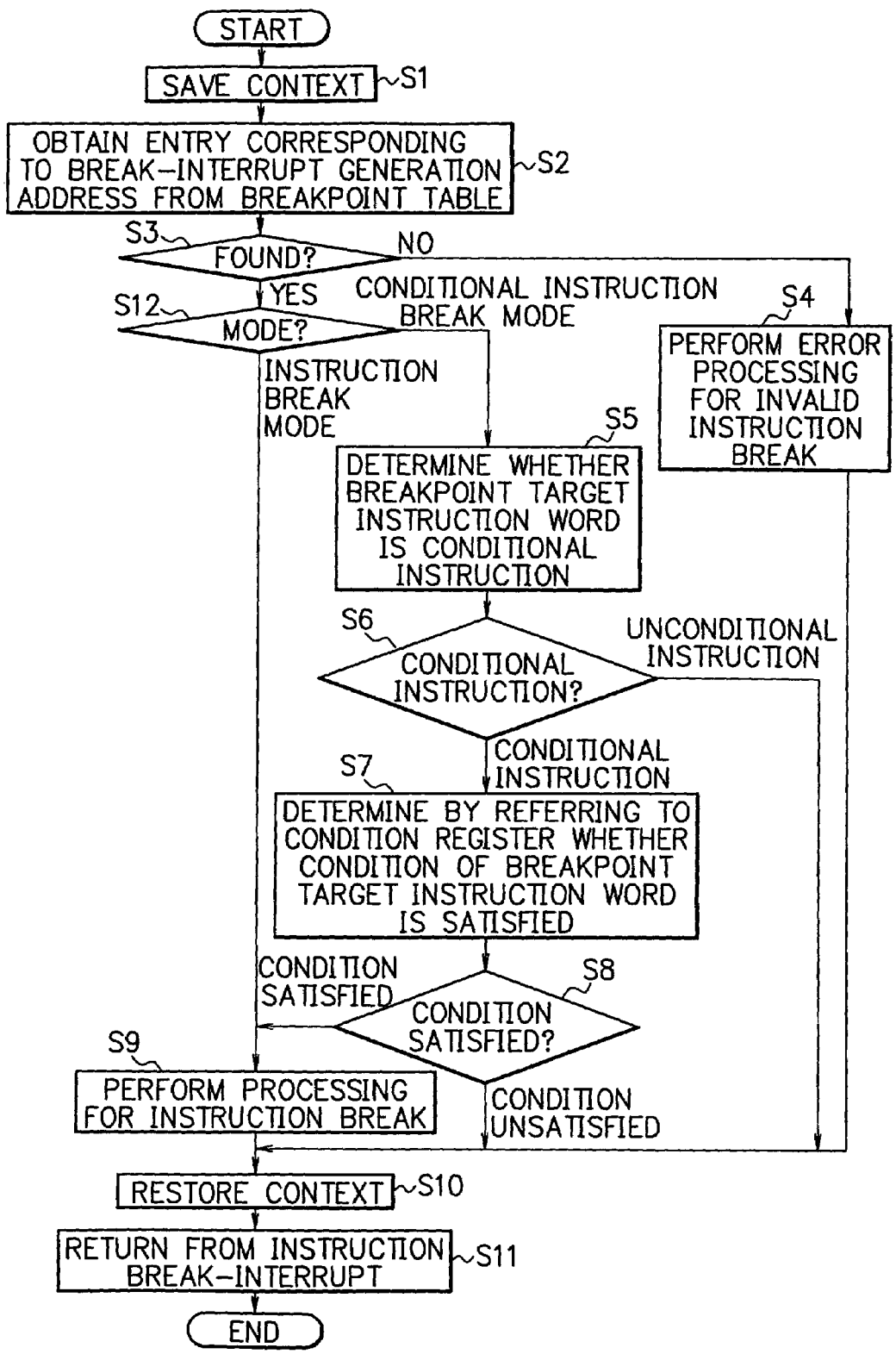
FIG. 54 is a flow chart showing processing by an instruction break-interrupt handler according to the 19th Embodiment.

FIG. 54 is a flow chart showing the processing procedure of an interrupt handler according to the 19th embodiment. In FIG. 54, the same step numbers as in FIG. 47 denote the same processing contents as in FIG. 47.

In the 19th embodiment, interrupt control based on determination of the condition of a conditional instruction, which is done by the hardware mechanism in the processor of the 15th embodiment, is performed by the function of software shown in the flow chart of FIG. 54. More specifically, in this embodiment, a function of switching between an instruction break mode in which an instruction break occurs when the instruction break generation condition is satisfied and a conditional instruction break mode in which an instruction break occurs when both the instruction break generation condition and the condition of the conditional instruction are satisfied is used.

The breakpoint table according to the 19th embodiment has the construction shown in FIG. 55. A column "MODE" is added to the breakpoint table shown in FIG. 48. The column "MODE" holds mode information on instruction break mode or conditional instruction break mode. In the mode information, the value "0" means the instruction break mode, while the value "1" means the conditional instruction break mode.

Referring to FIG. 54, in this embodiment, when it is determined in step S3 that an entry corresponding to the break-interrupt generation address is found in the breakpoint table shown in FIG. 55, the flow advances to step S12. In step S12, it is determined by looking up the breakpoint table shown in FIG. 55 whether the instruction break mode or the conditional instruction break mode is set for the entry.

If the instruction break mode is set, the flow immediately advances to step S9 to execute processing for the instruction break because this mode generates a break-interrupt when the instruction break generation condition is satisfied. If the conditional instruction break mode is set, the flow advances to step S5 because this mode generates a break-interrupt only when the condition of the conditional instruction is also satisfied. Processing in the remaining steps is the same as described above with reference to FIG. 47.

As described above, in the 19th embodiment, whether the instruction break generation condition related to the instruction break address and the flag value is satisfied is determined by each of determination sections $25_{-0}$ to $25_{-n}$. In the instruction break mode, when the instruction break generation condition is satisfied, a break-interrupt occurs. In the conditional instruction break mode, it is also determined by software of the interrupt handler whether the condition of the conditional instruction is satisfied. Only when both conditions are satisfied, a break-interrupt actually occurs.

Thus, like in the 15th embodiment, when the conditional instruction break mode is designated, a break-interrupt can be controlled in accordance with whether the instruction break generation condition and the condition of the conditional instruction are satisfied. In addition, when the instruction break mode is designated, a break-interrupt can be controlled independently of whether the condition of the conditional instruction is satisfied and in accordance with whether the instruction break generation condition is satisfied.

In the example shown in FIG. 54, processing corresponding to each determination section of the scalar processing shown in FIG. 29 is implemented by the function of software. Processing corresponding to each determination section of the VLIW type processor described in each of the embodiments shown in FIGS. 30 and 31 or processing corresponding to each determination section of the parallel processor described in each of the embodiments shown in FIGS. 32 and 33 can also be implemented by the function of software.

For example, to apply the function to the VLIW type processor, processing in steps S5 to S7 in the flow chart of FIG. 54 is replaced by processing in steps S15 to S17 shown in FIG. 49 or processing in steps S25 to S27 shown in FIG. 50. To apply the function to the parallel processor, processing in steps S5 to S7 in the flow chart of FIG. 54 is replaced by processing in steps S35 to S37 shown in FIG. 52 or processing in steps S45 to S47 shown in FIG. 53.

However, when the processing is replaced by processing in steps S25 to S27 shown in FIG. 50 or in steps S45 to S47 in FIG. 53, a breakpoint table shown in FIG. 56 must be used.

20th Embodiment

The 20th embodiment of the present invention will be described next with reference to drawings.

Figure 57:
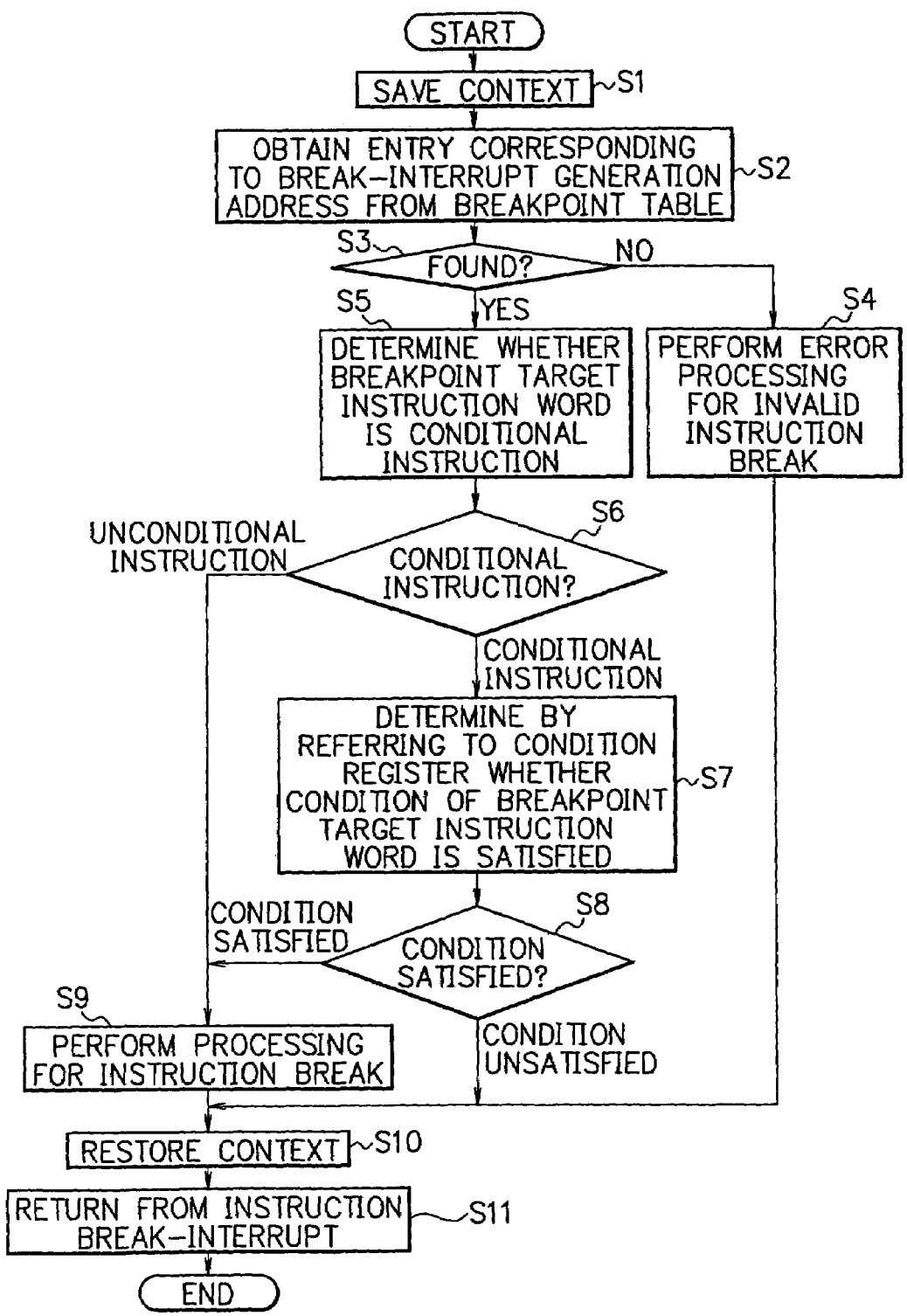
FIG. 57 is a flow chart showing processing by an instruction break-interrupt handler according to the 20th Embodiment.

FIG. 57 is a flow chart showing the processing procedure of an interrupt handler according to the 20th embodiment. In FIG. 57, the same step numbers as in FIG. 47 denote the same processing contents as in FIG. 47. The breakpoint table has the same construction as in FIG. 48.

In the 20th embodiment, interrupt control based on determination of the condition of a conditional instruction, which is done by the hardware mechanism in the processor of the 16th embodiment, is performed by the function of software shown in the flow chart of FIG. 57. More specifically, in this embodiment, a function of generating a break-interrupt not only when the condition of a conditional instruction is satisfied but also when the breakpoint target instruction word is an unconditional instruction.

In the 18th embodiment shown in FIG. 47, if it is determined in step S6 that the breakpoint target instruction word is not a conditional instruction, the flow immediately jumps to step S10 without performing processing for the instruction break in step S9. However, in the 20th embodiment shown in FIG. 57, even when it is determined in step S6 that the breakpoint target instruction word is not a conditional instruction, the flow advances to step S9 to execute processing for the instruction break.

As described above, in the 20th embodiment, whether the instruction break generation condition related to the instruction break address and the flag value is satisfied is determined by each of determination sections $25_{-0}$ to $25_{-n}$. When the condition is satisfied, it is also determined whether the breakpoint target instruction word is a conditional instruction. If the breakpoint target instruction word is an unconditional instruction, a break-interrupt unconditionally occurs. If the breakpoint target instruction word is a conditional instruction, it is further determined by software of the interrupt handler whether the condition of the conditional instruction is satisfied. Only when this condition is satisfied, a break-interrupt actually occurs.

Thus, like in the 16th embodiment, when the supplied instruction word is a conditional instruction, a break-interrupt can be controlled in accordance with whether the instruction break generation condition and the condition of the conditional instruction are satisfied. Even when the supplied instruction word is an unconditional instruction, a break-interrupt can be controlled in accordance with whether the instruction break generation condition is satisfied.

In the example shown in FIG. 57, processing corresponding to each determination section of the scalar processing shown in FIG. 35 is implemented by the function of software. Processing corresponding to each determination section of the VLIW type processor described in each of the embodiments shown in FIGS. 36 and 37 or processing corresponding to each determination section of the parallel processor described in each of the embodiments shown in FIGS. 38 and 39 can also be implemented by the function of software.

For example, to apply the function to the VLIW type processor, processing in steps S5 to S7 in the flow chart of FIG. 57 is replaced by processing in steps S15 to S17 shown in FIG. 49 or processing in steps S25 to S27 shown in FIG. 50. To apply the function to the parallel processor, processing in steps S5 to S7 in the flow chart of FIG. 57 is replaced by processing in steps S35 to S37 shown in FIG. 52 or processing in steps S45 to S47 shown in FIG. 53.

However, when the processing is replaced by processing in steps S25 to S27 shown in FIG. 50 or in steps S45 to S47 in FIG. 53, a breakpoint table shown in FIG. 51 need be used.

21st Embodiment

The 21st embodiment of the present invention will be described next with reference to drawings.

Figure 58:
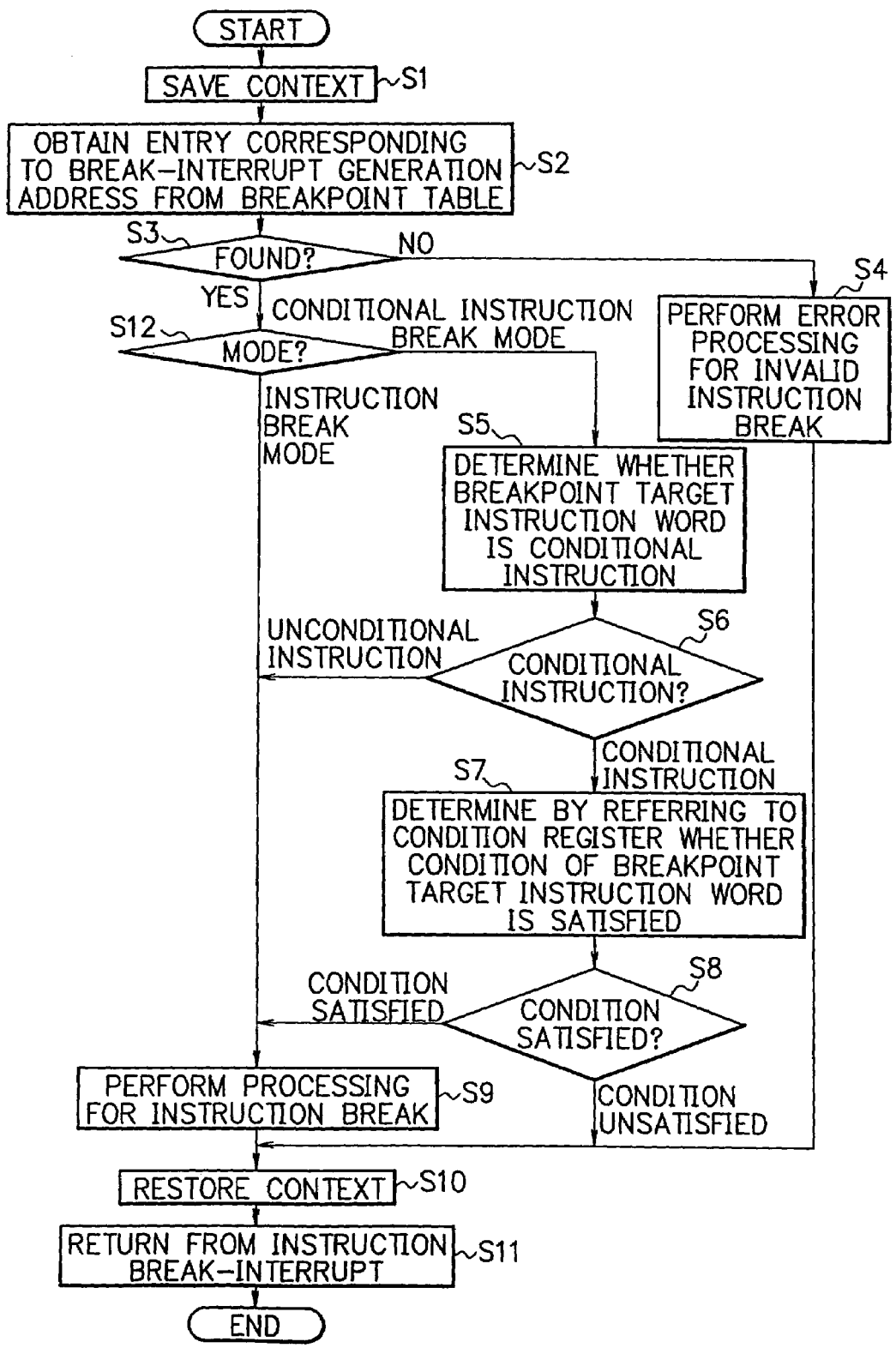
FIG. 58 is a flow chart showing processing by an instruction break-interrupt handler according to the 21st embodiment.

FIG. 58 is a flow chart showing the processing procedure of an interrupt handler according to the 21st embodiment. In FIG. 58, the same step numbers as in FIG. 54 denote the same processing contents as in FIG. 54. The breakpoint table has the same construction as in FIG. 55.

In the 21st embodiment, the 19th embodiment and 20th embodiment are combined. More specifically, in this embodiment, a function of switching between an instruction break mode in which an instruction break occurs when the instruction break generation condition is satisfied and a conditional instruction break mode in which an instruction break occurs when both the instruction break generation condition and the condition of the conditional instruction are satisfied is used. In addition, a function of generating a break-interrupt not only when the condition of a conditional instruction is satisfied but also when the breakpoint target instruction word is an unconditional instruction.

Referring to FIG. 58, when it is determined in step S3 that an entry corresponding to the break-interrupt generation address is found in the breakpoint table shown in FIG. 55, the flow advances to step S12. In step S12, it is determined by looking up the breakpoint table shown in FIG. 55 whether the instruction break mode or the conditional instruction break mode is set for the entry.

If the instruction break mode is set, the flow immediately advances to step S9 to execute processing for the instruction break because this mode generates a break-interrupt when the instruction break generation condition is satisfied. If the conditional instruction break mode is set, the flow advances to step S5 because this mode generates a break-interrupt only when the condition of the conditional instruction is also satisfied.

It is determined in step S5 whether the breakpoint target instruction word is a conditional instruction, and then it is determined in step S6 whether the instruction word is a conditional instruction. If the breakpoint target instruction word is not a conditional instruction, the flow advances to step S9 to execute processing for the instruction break. If the breakpoint target instruction word is a conditional instruction, the flow advances to step S7 to perform the subsequent part of processing. Processing in the remaining steps is the same as described above in FIG. 54.

As described above, according to the 21st embodiment, when the conditional instruction break mode is designated, a break-interrupt can be controlled in accordance with whether the instruction break generation condition and the condition of the conditional instruction are satisfied. Additionally, when the instruction break mode is designated, a break-interrupt can be controlled independently of whether the condition of the conditional instruction is satisfied and in accordance with whether the instruction break generation condition is satisfied.

Furthermore, when the conditional instruction break mode is designated, and the supplied instruction word is a conditional instruction, a break-interrupt can be controlled in accordance with whether the instruction break generation condition and the condition of the conditional instruction are satisfied. Also, even when the supplied instruction word is an unconditional instruction, a break-interrupt can be controlled in accordance with whether the instruction break generation condition is satisfied.

In the example shown in FIG. 58, processing corresponding to each determination section of the scalar processing shown in FIG. 41 is implemented by the function of software. Processing corresponding to each determination section of the VLIW type processor described in each of the embodiments shown in FIGS. 42 and 43 or processing corresponding to each determination section of the parallel processor described in each of the embodiments shown in FIGS. 44 and 45 can also be implemented by the function of software.

For example, to apply the function to the VLIW type processor, processing in steps S5 to S7 in the flow chart of FIG. 58 is replaced by processing in steps S15 to S17 shown in FIG. 49 or processing in steps S25 to S27 shown in FIG. 50. To apply the function to the parallel processor, processing in steps S5 to S7 in the flow chart of FIG. 58 is replaced by processing in steps S35 to S37 shown in FIG. 52 or processing in steps S45 to S47 shown in FIG. 53.

However, when the processing is replaced by processing in steps S25 to S27 shown in FIG. 50 or in steps S45 to S47 in FIG. 53, a breakpoint table shown in FIG. 56 must be used.

22nd Embodiment

The 22nd embodiment of the present invention will be described next with reference to drawings.

In the 18th to 21st embodiments, an application to a so-called instruction breakpoint function has been described, in which the address of an instruction requesting an interrupt is set in a register, and a break-interrupt is generated when the instruction break address set in this register matches the address of the actually executed instruction.

In the 22nd embodiment to be described below, an application to a so-called software breakpoint function will be described, in which an instruction designated at an arbitrary position in a processor is replaced with a breakpoint instruction for an interrupt, and a break-interrupt is generated when the replaced breakpoint instruction is executed during sequential execution of the program.

Figure 4:
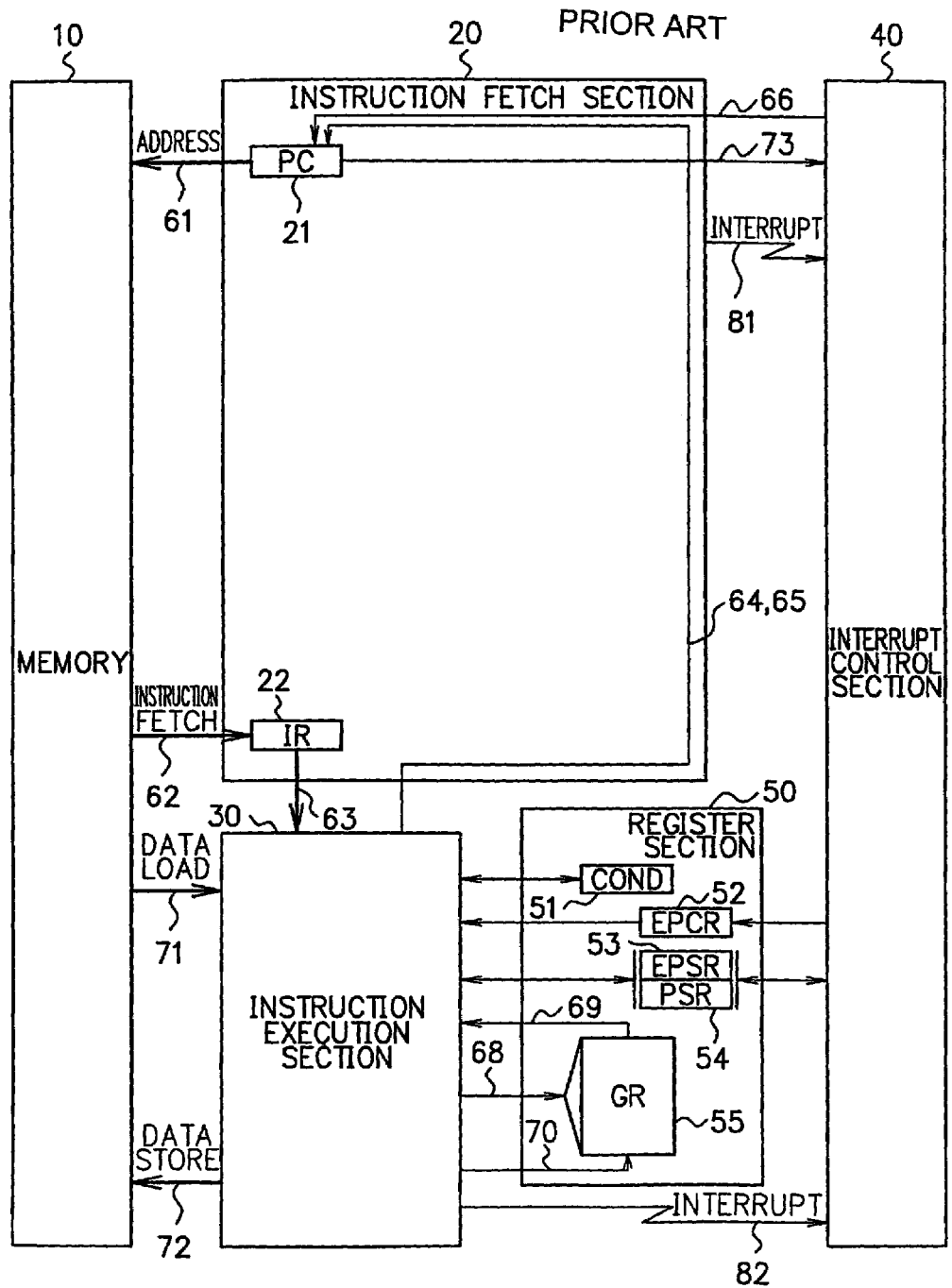
FIG. 4 is a block diagram showing the construction of a processor for implementing the conventional software break scheme.

In the 22nd embodiment, the overall construction of a data processing system (processor) for implementing the software break scheme is the same as that shown in FIG. 4. Referring to FIG. 4, when a breakpoint instruction is supplied in executing an instruction supplied from an instruction fetch section 20 by an instruction execution section 30, the instruction execution section 30 notifies an interrupt control section 40 of the software break-interrupt using an interrupt notification signal 82.

When receiving the interrupt notification signal 82 from the instruction execution section 30, the interrupt control section 40 reads out an instruction address 73 at the time of interrupt from a program counter 21 of the instruction fetch section 20 and writes the instruction address 73 in a return address register 52 of a register section 50. A start address 66 of the interrupt handler for determining the condition of a conditional instruction is supplied to the instruction fetch section 20 and set in the program counter 21. The interrupt control section 40 also writes the processor state before the interrupt in a previous state register 53 and writes, in a present state register 54, the processor state that has transited in accordance with the interrupt. Thus, the processor transits from the user state to the supervisor state.

The processor that has transited to the supervisor state executes processing of the interrupt handler sequentially from the start address 66 of the interrupt handler, which is set in the program counter 21, in accordance with the flow chart shown in FIG. 47, 49, 50, 52, 53, 54, 57, or 58.

In these flow charts, in step S4, not error processing for an invalid instruction break but error processing for an invalid software break is performed. In step S9, not processing for an instruction break but processing for a software break is performed. In step S11, not return processing from an instruction break-interrupt but return processing from a software break-interrupt is performed.

As a breakpoint table used in these processing operations, one of the breakpoint tables shown in FIGS. 5, 59, 60, and 61 is used in accordance with the presence/absence of displacement information (DISP) from the head portion of a long instruction word of a VLIW type processor or a variable-length instruction word of a parallel processor, or the switching function (MODE) between the instruction break mode and the conditional instruction break mode.

In the 22nd embodiment as well, the same effects as described in the 18th to 22nd embodiments can be obtained.

The interrupt control apparatus of each of the above-described embodiments is constructed by a CPU, a MPU, a RAM, or a ROM of a computer and can be implemented by running a program stored in the RAM or ROM. Hence, the apparatus can be implemented by recording a program for causing the computer to execute the above functions on a recording medium such as a CD-ROM and causing the computer to load the program. As a recording medium for recording the program, not a CD-ROM but a floppy disk, a hard disk, a magnetic tape, an optical magnetic disk, or a nonvolatile memory card may be used.

The functions of the above-described embodiments need not always be implemented by causing the computer to execute the supplied program. Such a program is incorporated in the embodiments of the present invention even when the functions of the above-described embodiments are implemented by the program cooperating with the OS (Operating System) or another application software program running on the computer, or the functions of the above-described embodiments are implemented by entirely or partially executing processing of the supplied program by the function expansion board or function expansion unit of the computer.

The above-described embodiments are merely detailed examples for practice of the present invention and do not allow limited interpretation of the technical scope thereof. That is, the present invention may be embodied in various forms without departing from the spirit and scope thereof.

What is claimed is:

1. An interrupt control apparatus applied to a data processing system having a function of executing a conditional instruction that executes a designated data processing when a designated branch condition of the conditional instruction is satisfied, wherein a determination of the branch condition of the conditional instruction and the executed data processing when the branch condition of the conditional instruction is satisfied are indivisible, said apparatus comprising:
- a break detection section for detecting a breakpoint set at an arbitrary position of an instruction sequence;
- a condition determination section for determining whether an instruction of a designated address as an instruction located at an address specified as a break point address is executed as satisfying a branch condition of said conditional instruction; and
- a control section for controlling a break-interrupt based upon a breakpoint detection result from said break detection section and execution of the instruction of the designated address according to a branch condition determination result from said condition determination section.

2. An interrupt control apparatus applied to a data processing system having a function of executing a conditional instruction that executes a designated data processing when a designated branch condition of the conditional instruction is satisfied, wherein a determination of the branch condition of the conditional instruction and the executed data processing when the branch condition of the conditional instruction is satisfied are indivisible, said apparatus comprising:
- an instruction break detection section for detecting an instruction break in accordance with whether an instruction corresponding to an instruction address representing a breakpoint, which is set in a register, is read, and outputting a detection signal representing a detection result;
- a condition determination section for determining whether an instruction of a designated address as an instruction located at an address specified as a break point address is executed as satisfying a branch condition of the conditional instruction, and outputting a branch condition determination signal; and
- a logical operation section for performing an AND operation to said detection signal output from said instruction break detection section and execution of the instruction of the designated address according to said branch condition determination signal output from said condition determination section, and sending a break-interrupt notification in accordance with the AND operation result.

3. An apparatus according to claim 2, wherein
said condition determination section is designed to determine whether an instruction word is said conditional instruction, if said instruction word is said conditional instruction, determine whether the branch condition of the conditional instruction is satisfied, and output the branch condition determination signal, and
when an instruction word corresponding to the instruction address representing said breakpoint is an unconditional instruction or a conditional instruction having an unsatisfied branch condition, said logical operation section does not send the break-interrupt notification, and when said instruction word is the conditional instruction having a satisfied branch condition, said logical operation section sends said break-interrupt notification.

4. An apparatus according to claim 2, wherein
said apparatus further comprises a mode setting section for setting one of a first mode in which said break-interrupt is generated when a generation condition of said instruction break is satisfied, and the branch condition of said conditional instruction is satisfied, and a second mode in which said break-interrupt is generated when said generation condition of said instruction break is satisfied,
said condition determination section is designed to determine whether an instruction word is said conditional instruction, if said instruction word is said conditional instruction, determine whether the branch condition of the conditional instruction is satisfied, and output the branch condition determination signal, and
in said first mode, when an instruction word corresponding to the instruction address representing said breakpoint is an unconditional instruction or a conditional instruction having an unsatisfied branch condition, said logical operation section does not sends the break-interrupt notification, and when said instruction word is the conditional instruction having a satisfied branch condition, said logical operation section sends the break-interrupt notification, and in said second mode, when said instruction word is an instruction word corresponding to the instruction address representing said breakpoint, said logical operation section sends said break-interrupt notification.

5. An apparatus according to claim 2, wherein
said condition determination section is designed to determine whether an instruction word is said conditional instruction, if said instruction word is said conditional instruction, determine whether the branch condition of the conditional instruction is satisfied, and output the branch condition determination signal, and
when an instruction word corresponding to the instruction address representing said breakpoint is a conditional instruction having an unsatisfied branch condition, said logical operation section does not send the break-interrupt notification, and when said instruction word is an unconditional instruction or the conditional instruction having a satisfied branch condition, said logical operation section sends said break-interrupt notification.

6. An apparatus according to claim 2, wherein
said apparatus further comprises a mode setting section for setting one of a first mode in which said break-interrupt is generated when a generation condition of said instruction break is satisfied, and the branch condition of said conditional instruction is satisfied, and a second mode in which said break-interrupt is generated when said generation condition of said instruction break is satisfied,
said condition determination section is designed to determine whether an instruction word is said conditional instruction, if said instruction word is said conditional instruction, determine whether the branch condition of the conditional instruction is satisfied, and output the branch condition determination signal, and
in said first mode, when an instruction word corresponding to the instruction address representing said breakpoint is a conditional instruction having an unsatisfied branch condition, said logical operation section does not send the break-interrupt notification, and when said instruction word is an unconditional instruction or the conditional instruction having a satisfied branch condition, said logical operation section sends the break-interrupt notification, and in said second mode, when said instruction word is an instruction word corresponding to the instruction address representing said breakpoint, said logical operation section sends said break-interrupt notification.

7. An apparatus according to claim 2, wherein said data processing system comprises one of a scalar processor for performing one unit of processing in accordance with one instruction, a long instruction word processor for parallel executing short instructions forming a long instruction word, and a parallel processor for parallel executing at least one basic instruction forming a variable-length instruction word.

8. An interrupt control apparatus applied to a data processing system having a function of executing a conditional instruction that executes a designated data processing when a designated branch condition of the conditional instruction is satisfied, wherein a determination of the branch condition of the conditional instruction and the executed data processing when the branch condition is satisfied are indivisible, said apparatus comprising:

an instruction break detection section for detecting an instruction break in accordance with whether an instruction corresponding to an instruction address representing a breakpoint, which is set in a register, is read, and sending a break-interrupt notification in accordance with the detecting of the instruction break; and a control section for, in an interrupt handler activated in accordance with said break-interrupt notification supplied from said instruction break detection section, determining whether an instruction of a designated address as an instruction located at an address specified as a break point address is executed as satisfying a branch condition of said conditional instruction, and controlling break-interrupt processing in accordance with the determining of execution of the instruction of the designated address as satisfying the branch condition of the conditional instruction.

9. An apparatus according to claim 8, wherein said control section determines, in said interrupt handler, whether an instruction word as an instruction break target is said conditional instruction, and when said instruction word is said conditional instruction, determines whether the branch condition of said conditional instruction is satisfied, and when said instruction word as said instruction break target is an unconditional instruction or a conditional instruction having an unsatisfied branch condition, returns from said interrupt handler, and when said instruction word as said instruction break target is a conditional instruction having a satisfied branch condition, performs said break-interrupt processing.

10. An apparatus according to claim 8, wherein said apparatus further comprises a mode setting section for setting one of a first mode in which said break-interrupt is generated when a generation condition of said instruction break is satisfied, and the condition of the branch of said conditional instruction is satisfied, and a second mode in which said break-interrupt is generated when said generation condition of said instruction break is satisfied, and in said first mode, said control section determines, in said interrupt handler, whether an instruction word as an instruction break target is said conditional instruction, when said instruction word is said conditional instruction, determines whether the condition of the branch of said conditional instruction is satisfied, when said instruction word as said instruction break target is an unconditional instruction or a conditional instruction having an unsatisfied branch condition, returns from said interrupt handler, and when said instruction word as said instruction break target is a conditional instruction having a satisfied branch condition, performs said break-interrupt processing, and in said second mode, said control section performs said break-interrupt processing when receiving said break-interrupt notification.

11. An apparatus according to claim 8, wherein said control section determines, in said interrupt handler, whether an instruction word as an instruction break target is said conditional instruction, when said instruction word is said conditional instruction, determines whether the condition of the branch of said conditional instruction is satisfied, when said instruction word as said instruction break target is a conditional instruction having an unsatisfied branch condition, returns from said interrupt handler, and when said instruction word as said instruction break target is an unconditional instruction or a conditional instruction having a satisfied branch condition, performs said break-interrupt processing.

12. An apparatus according to claim 8, wherein said apparatus further comprises a mode setting section for setting one of a first mode in which said break-interrupt is generated when a generation condition of said instruction break is satisfied, and the condition of the branch of said conditional instruction is satisfied, and a second mode in which said break-interrupt is generated when said generation condition of said instruction break is satisfied, and in said first mode, said control section determines, in said interrupt handler, whether an instruction word as an instruction break target is said conditional instruction, when said instruction word is said conditional instruction, determines whether the condition of the branch of said conditional instruction is satisfied, when said instruction word as said instruction break target is a conditional instruction having an unsatisfied branch condition, returns from said interrupt handler, and when said instruction word as said instruction break target is an unconditional instruction or a conditional instruction having a satisfied branch condition, performs said break-interrupt processing, and in said second mode, said control section performs said break-interrupt processing when receiving said break-interrupt notification.

13. An apparatus according to claim 8, wherein said data processing system comprises one of a scalar processor for performing one unit of processing in accordance with one instruction, a long instruction word processor for parallel executing short instructions forming a long instruction word, and a parallel processor for parallel executing at least one basic instruction forming a variable-length instruction word.

14. An interrupt control apparatus applied to a data processing system having a function of executing a conditional instruction that executes a designated data processing when a designated branch condition of the conditional instruction is satisfied, wherein a determination of the branch condition of the conditional instruction and the executed data processing when the branch condition is satisfied are indivisible, said apparatus comprising:

a software break detection section for detecting a software break in accordance with whether a breakpoint instruction placed at an arbitrary position of an instruction sequence is executed, and sending a break-interrupt notification in accordance with the detection of the software break; and a control section for, in an interrupt handler activated in accordance with said break- interrupt notification supplied from said software break detection section, determining whether an instruction of a designated address as an instruction located at an address specified as a break point address is executed as satisfying a branch condition of said conditional instruction, and controlling break-interrupt processing in accordance with the determining of execution of the instruction of the designated address as satisfying the branch condition of the conditional instruction.

15. An apparatus according to claim 14, wherein said control section determines, in said interrupt handler, whether an instruction word as a software break target is said conditional instruction, and when said instruction word is said conditional instruction, determines whether the branch condition of said conditional instruction is satisfied, and when said instruction word as said software break target is an unconditional instruction or a conditional instruction having an unsatisfied branch condition, returns from said interrupt handler, and when said instruction word as said software break target is a conditional instruction having a satisfied branch condition, performs said break-interrupt processing.

16. An apparatus according to claim 14, wherein
said apparatus further comprises a mode setting section for setting one of a first mode in which said break-interrupt is generated when a generation condition of said software break is satisfied, and the branch condition of said conditional instruction is satisfied, and a second mode in which said break-interrupt is generated when said generation condition of said software break is satisfied, and
in said first mode, said control section determines, in said interrupt handler, whether an instruction word as a software break target is said conditional instruction, when said instruction word is said conditional instruction, determines whether the branch condition of said conditional instruction is satisfied, when said instruction word as said software break target is an unconditional instruction or a conditional instruction having an unsatisfied branch condition, returns from said interrupt handler, and when said instruction word said software break target is a conditional instruction having a satisfied branch condition, performs said break-interrupt processing, and
in said second mode, said control section performs said break-interrupt processing when receiving said break-interrupt notification.

17. An apparatus according to claim 14, wherein
said control section determines, in said interrupt handler, whether an instruction word as a software break target is said conditional instruction, when said instruction word is said conditional instruction, determines whether the branch condition of said conditional instruction is satisfied, when said instruction word as said software break target is a conditional instruction having an unsatisfied branch condition, returns from said interrupt handler, and when said instruction word as said software break target is an unconditional instruction or a conditional instruction having a satisfied branch condition, performs said break-interrupt processing.

18. An apparatus according to claim 14, wherein
said apparatus further comprises a mode setting section for setting one of a first mode in which said break-interrupt is generated when a generation condition of said software break is satisfied, and the branch condition of said conditional instruction is satisfied, and a second mode in which said break-interrupt is generating when said generation condition of said software break is satisfied, and
in said first mode, said control section determines, in said interrupt handler, whether an instruction word as a software break target is said conditional instruction, when said instruction word is said conditional instruction, determines whether the branch condition of said conditional instruction is satisfied, when said instruction word as said software break target is a conditional instruction having an unsatisfied branch condition, returns from said interrupt handler, and when said instruction word as said software break target is an unconditional instruction or a conditional instruction having a satisfied branch condition, performs said break-interrupt processing, and
in said second mode, said control section performs said break-interrupt processing when receiving said break-interrupt notification.

19. An apparatus according to claim 14, wherein said data processing system comprises one of a scalar processor for performing one unit of processing in accordance with one instruction, a long instruction word processor for parallel executing short instructions forming a long instruction word, and a parallel processor for parallel executing at least one basic instruction forming a variable-length instruction word.

20. An interrupt control method for controlling a break-interrupt in a data processing system having a function of executing a conditional instruction that executes a designated data processing when a designated branch condition of the conditional instruction is satisfied, wherein a determination of the branch condition of the conditional instruction and the executed data processing when the branch condition of the conditional instruction is satisfied are indivisible, said method comprising:
detecting a breakpoint set at an arbitrary position of an instruction sequence;
determining whether an instruction of a designated address as an instruction located at an address specified as a break point address is executed as satisfying a branch condition of said conditional instruction; and
controlling the break-interrupt based upon the detecting of said breakpoint and execution of the instruction of the designated address according to the determining of the branch condition of said conditional instruction.

21. An apparatus comprising:
a controller
detecting a breakpoint at an arbitrary position of an instruction sequence;
determining whether execution of an instruction of a designated address as an instruction located at an address specified as a break point address satisfies a branch of an instruction;
controlling a break-interrupt based upon the detecting the breakpoint and the determining of whether the branch of the instruction is satisfied, according to a logical operation of a detection signal from said breakpoint detection and a branch condition determination signal from said branch condition determination of the instruction; and
sending a break-interrupt notification in accordance with the logical operation.

* * * * *

UNITED STATES PATENT AND TRADEMARK OFFICE
CERTIFICATE OF CORRECTION

| | | |
|---|---|---|
| PATENT NO. | : 7,581,090 B2 | Page 1 of 1 |
| APPLICATION NO. | : 10/692800 | |
| DATED | : August 25, 2009 | |
| INVENTOR(S) | : Hideo Miyake et al. | |

It is certified that error appears in the above-identified patent and that said Letters Patent is hereby corrected as shown below:

Title Page, Column 1, under
Item "(65)     Prior Publication Data

US 2004/0088462 A1   May 6, 2004" insert Item (30) and Item (62)
--(30)   Foreign Application Priority Data

Oct. 29, 1999 (JP) ...........................11-309598
Nov. 30, 1999 (JP) ...........................11-341077

Related U.S. Application Data

(62) Division of Application 09/678,732, filed on
Oct. 4, 2000, now Pat. No. 6,681,280--.

Column 64, Line 56, change "break- interrupt" to --break-interrupt--.

Column 65, Line 27, change "handier," to --handler,--.

Column 65, Line 28, change "word said" to --word as said--.

Column 65, Line 35, change "handier," to --handler,--.

Column 65, Line 42, change "handier," to --handler,--.

Column 65, Line 56, change "handier," to --handler,--.

Column 66, Line 6, change "handier," to --handler,--.

Signed and Sealed this

Sixteenth Day of March, 2010

David J. Kappos
*Director of the United States Patent and Trademark Office*